US012574791B2

(12) United States Patent
Paris et al.

(10) Patent No.: US 12,574,791 B2
(45) Date of Patent: Mar. 10, 2026

(54) METHOD AND APPARATUS TO SYNCHRONIZE RADIO BEARERS

(71) Applicant: Nokia Solutions and Networks Oy, Espoo (FI)

(72) Inventors: Stefano Paris, Vanves (FR); Kalle Petteri Kela, Kaarina (FI); Klaus Ingemann Pedersen, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 441 days.

(21) Appl. No.: 18/044,074

(22) PCT Filed: Sep. 4, 2020

(86) PCT No.: PCT/EP2020/074851
§ 371 (c)(1),
(2) Date: Mar. 3, 2023

(87) PCT Pub. No.: WO2022/048773
PCT Pub. Date: Mar. 10, 2022

(65) Prior Publication Data
US 2023/0379747 A1      Nov. 23, 2023

(51) Int. Cl.
*H04W 28/02* (2009.01)

(52) U.S. Cl.
CPC ... *H04W 28/0252* (2013.01); *H04W 28/0236* (2013.01); *H04W 28/0263* (2013.01); *H04W 28/0268* (2013.01)

(58) Field of Classification Search
CPC ......... H04W 28/0236; H04W 28/0263; H04W 28/0268; H04W 28/0252; H04W 76/15; H04W 88/06; H04W 88/10; H04W 88/16
See application file for complete search history.

(56) References Cited

U.S. PATENT DOCUMENTS 11,537,445 B2 * 12/2022 Reeve ................... G06F 9/4881
2017/0078890 A1 3/2017 Zhu et al.
(Continued)

FOREIGN PATENT DOCUMENTS

EP         3703448 A1      9/2020

OTHER PUBLICATIONS

Monserrat et al, "Multi-Radio Dual Connectivity for 5G Small Cells Interworking", IEEE, 2020 (Year: 2020).*
(Continued)

*Primary Examiner* — Omer S Mian

(74) *Attorney, Agent, or Firm* — Carter, DeLuca & Farrell LLP

(57) ABSTRACT

Described herein are methods, apparatuses, and computer program products configured to synchronize radio bearers carrying data flows and/or control flows from a network entity or node within a communication system (e.g., a 5G network), towards user equipment, in order to achieve a desired Quality of Experience (QoE) for applications with multiple data streams and multiple quality of service (QoS) flows whose QoS requirements depend on each other. In some embodiments, two or more data radio bearers (DRBs) for carrying data from a single application, such as extended reality, virtual reality, augmented reality, or the like, e.g. online game streaming, may be synchronized in order to ensure desired QoE for an application with multiple QoS flows.

1 Claim, 29 Drawing Sheets

(56) References Cited

U.S. PATENT DOCUMENTS

| | | | | |
|---|---|---|---|---|
| 2018/0206282 | A1* | 7/2018 | Singh | H04W 76/15 |
| 2018/0367288 | A1 | 12/2018 | Vrzic et al. | |
| 2018/0376366 | A1* | 12/2018 | Singh | H04W 88/08 |
| 2019/0098640 | A1 | 3/2019 | Holakouei et al. | |
| 2021/0243772 | A1* | 8/2021 | Xu | H04W 72/1273 |
| 2021/0351997 | A1* | 11/2021 | Luft | H04L 43/16 |
| 2023/0209406 | A1* | 6/2023 | Hu | H04W 28/24 |
| | | | | 370/229 |
| 2023/0422139 | A1* | 12/2023 | Shimoda | H04W 28/24 |

OTHER PUBLICATIONS

Ferdosian et al, "Fair-QoS Broker Algorithm for Overload-State Downlink Resource Scheduling in LTE Networks", IEEE, 2017 (Year: 2017).*

Communication pursuant to Article 94(3) EPC received for corresponding European Patent Application No. 20771236.5, dated Jun. 3, 2025, 9 pages.

"3rd Generation Partnership Project; Technical Specification Group Radio Access Network; E-UTRA and NR; Service Data Adaptation Protocol (SDAP) specification (Release 16)", 3GPP TS 37.324, V16.0.0, Mar. 2020, pp. 1-16.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NG-RAN; NR user plane protocol (Release 16)", 3GPP TS 38.425, V16.0.0, Mar. 2020, pp. 1-24.

"3rd Generation Partnership Project; Technical Specification Group Services and System Aspects; Service requirements for the 5G system; Stage 1 (Release 17)", 3GPP TS 22.261, V17.3.0, Jul. 2020, pp. 1-83.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"New SID on XR Evaluations for NR", 3GPP TSG RAN Meeting #86, RP-193241, Agenda Item: 9.1.1, Qualcomm, Dec. 9-12, 2019, 6 pages.

"3rd Generation Partnership Project; Technical Specification Group Services and System Aspects; System architecture for the 5G System (5GS); Stage 2 (Release 16)", 3GPP TS 23.501, V16.5.1, Aug. 2020, pp. 1-440.

"IEEE 802.11", Wikipedia, Retrieved on Apr. 23, 2023, Webpage available at : https://en.wikipedia.org/wiki/IEEE_802.11.

"IEEE 802.16", Wikipedia, Retrieved on Apr. 23, 2023, Webpage available at : https://en.wikipedia.org/wiki/IEEE_802.16.

International Search Report and Written Opinion received for corresponding Patent Cooperation Treaty Application No. PCT/EP2020/074851, dated May 4, 2021, 15 pages.

"Enhancements for better XR support over NR", 3GPP TSG RAN WG1 #105-e, R1-2104558, Agenda item: 8.14.4, Nokia, May 19-27, 2021, 6 pages.

"Revised SID on XR Evaluations for NR", 3GPP TSG RAN Meeting #91e, RP-210460, Agenda Item: 9.6.5, Qualcomm, Mar. 16-26, 2021, 6 pages.

"Potential enhancements for better XR support over NR", 3GPP TSG RAN WG1 #104-bis-e, R1-2102830, Agenda item: 8.14.4, Nokia, Apr. 12-20, 2021, 5 pages.

* cited by examiner

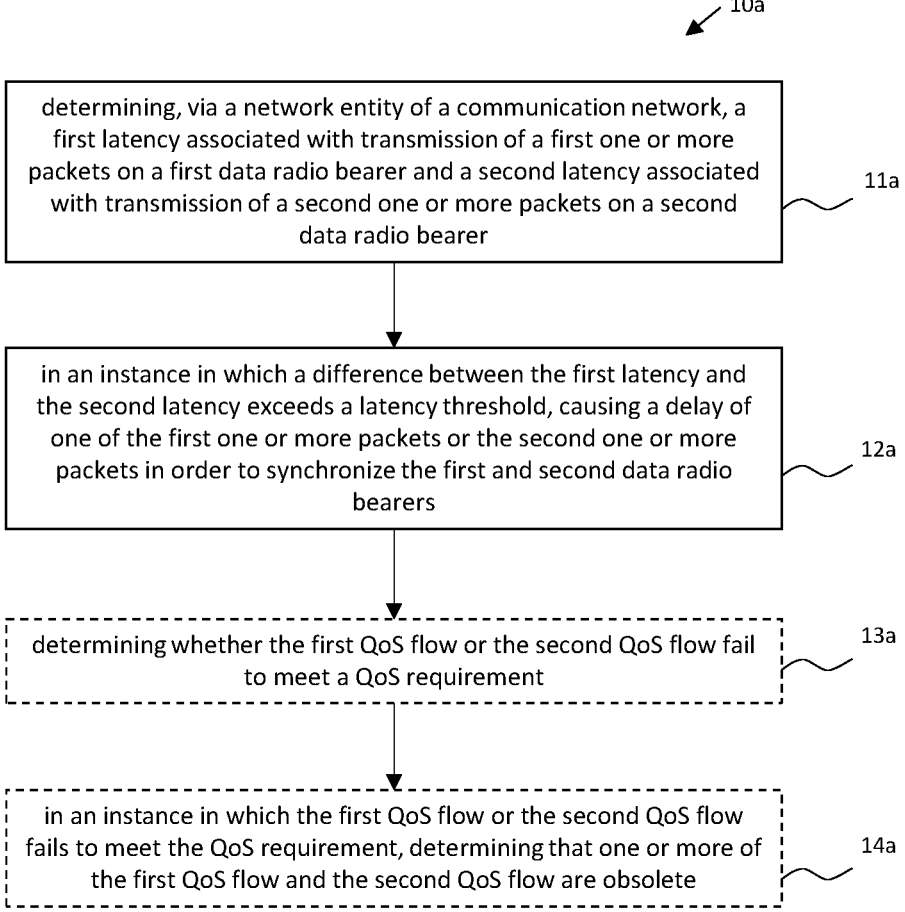

10a determining, via a network entity of a communication network, a first latency associated with transmission of a first one or more packets on a first data radio bearer and a second latency associated with transmission of a second one or more packets on a second data radio bearer 11a in an instance in which a difference between the first latency and the second latency exceeds a latency threshold, causing a delay of one of the first one or more packets or the second one or more packets in order to synchronize the first and second data radio bearers 12a determining whether the first QoS flow or the second QoS flow fail to meet a QoS requirement 13a in an instance in which the first QoS flow or the second QoS flow fails to meet the QoS requirement, determining that one or more of the first QoS flow and the second QoS flow are obsolete 14a

FIG. 14

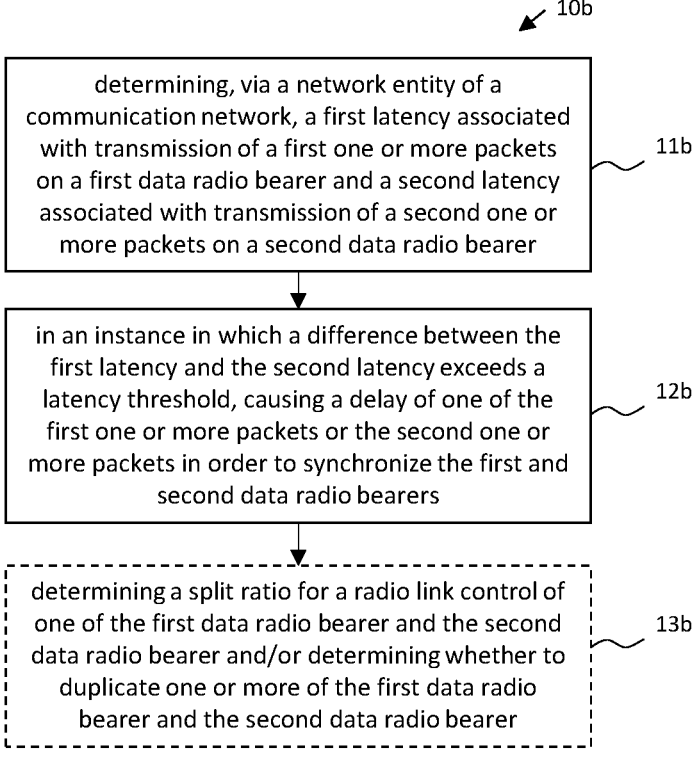

10b determining, via a network entity of a communication network, a first latency associated with transmission of a first one or more packets on a first data radio bearer and a second latency associated with transmission of a second one or more packets on a second data radio bearer 11b in an instance in which a difference between the first latency and the second latency exceeds a latency threshold, causing a delay of one of the first one or more packets or the second one or more packets in order to synchronize the first and second data radio bearers 12b determining a split ratio for a radio link control of one of the first data radio bearer and the second data radio bearer and/or determining whether to duplicate one or more of the first data radio bearer and the second data radio bearer 13b

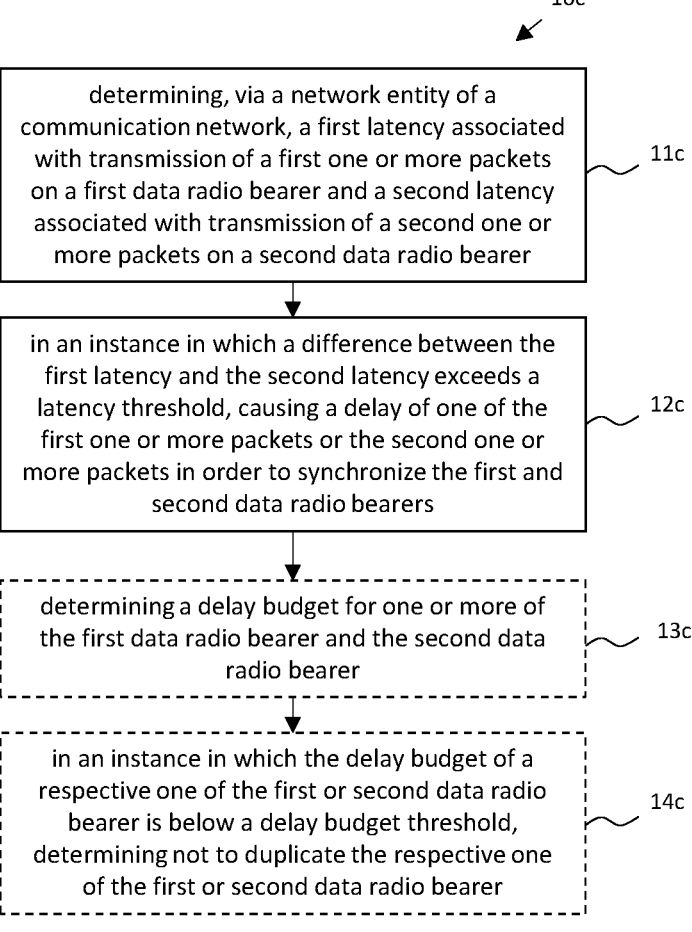

determining, via a network entity of a communication network, a first latency associated with transmission of a first one or more packets on a first data radio bearer and a second latency associated with transmission of a second one or more packets on a second data radio bearer 11c in an instance in which a difference between the first latency and the second latency exceeds a latency threshold, causing a delay of one of the first one or more packets or the second one or more packets in order to synchronize the first and second data radio bearers 12c determining a delay budget for one or more of the first data radio bearer and the second data radio bearer 13c in an instance in which the delay budget of a respective one of the first or second data radio bearer is below a delay budget threshold, determining not to duplicate the respective one of the first or second data radio bearer 14c

FIG. 16

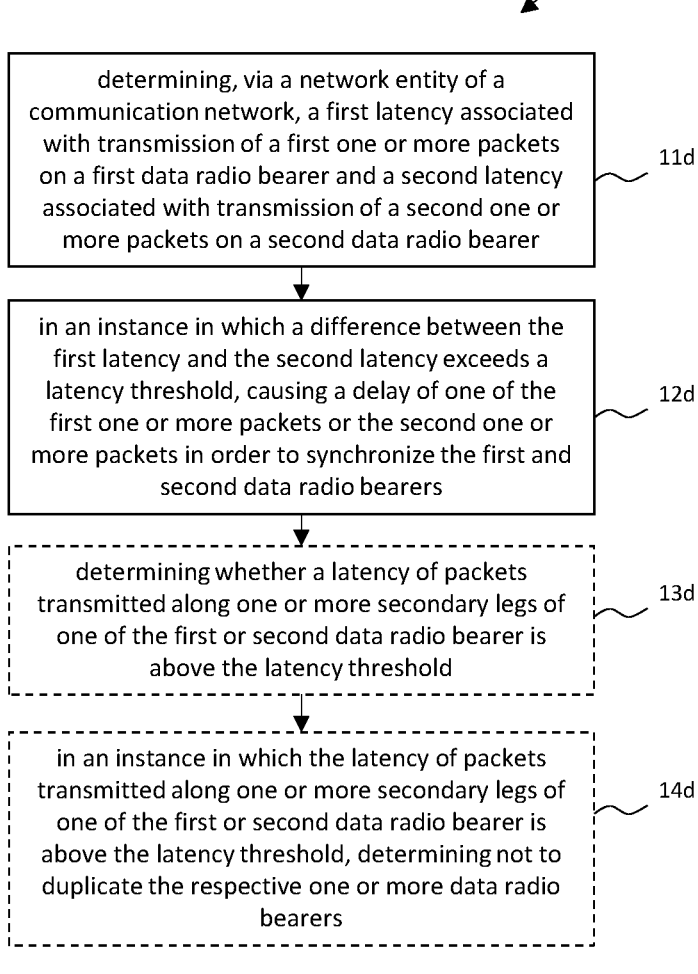

10d determining, via a network entity of a communication network, a first latency associated with transmission of a first one or more packets on a first data radio bearer and a second latency associated with transmission of a second one or more packets on a second data radio bearer 11d in an instance in which a difference between the first latency and the second latency exceeds a latency threshold, causing a delay of one of the first one or more packets or the second one or more packets in order to synchronize the first and second data radio bearers 12d determining whether a latency of packets transmitted along one or more secondary legs of one of the first or second data radio bearer is above the latency threshold 13d in an instance in which the latency of packets transmitted along one or more secondary legs of one of the first or second data radio bearer is above the latency threshold, determining not to duplicate the respective one or more data radio bearers 14d

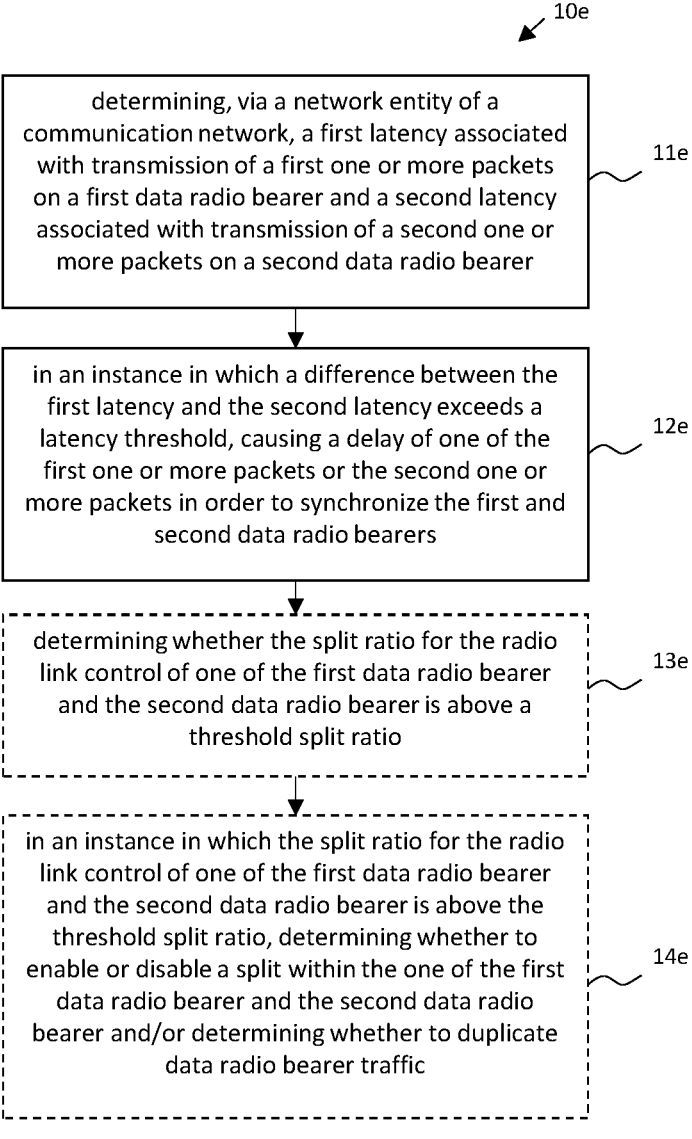

determining, via a network entity of a communication network, a first latency associated with transmission of a first one or more packets on a first data radio bearer and a second latency associated with transmission of a second one or more packets on a second data radio bearer 11e in an instance in which a difference between the first latency and the second latency exceeds a latency threshold, causing a delay of one of the first one or more packets or the second one or more packets in order to synchronize the first and second data radio bearers 12e determining whether the split ratio for the radio link control of one of the first data radio bearer and the second data radio bearer is above a threshold split ratio 13e in an instance in which the split ratio for the radio link control of one of the first data radio bearer and the second data radio bearer is above the threshold split ratio, determining whether to enable or disable a split within the one of the first data radio bearer and the second data radio bearer and/or determining whether to duplicate data radio bearer traffic 14e

FIG. 18

20 in an instance in which at least one data radio bearer of two or more linked data radio bearers in a communications system are using a split bearer configuration, providing, from a hosting node of the communications system, to an assisting node of the communications system, information regarding the two or more linked data radio bearers, said information comprising a maximum delay deviation between the two or more linked data radio bearers

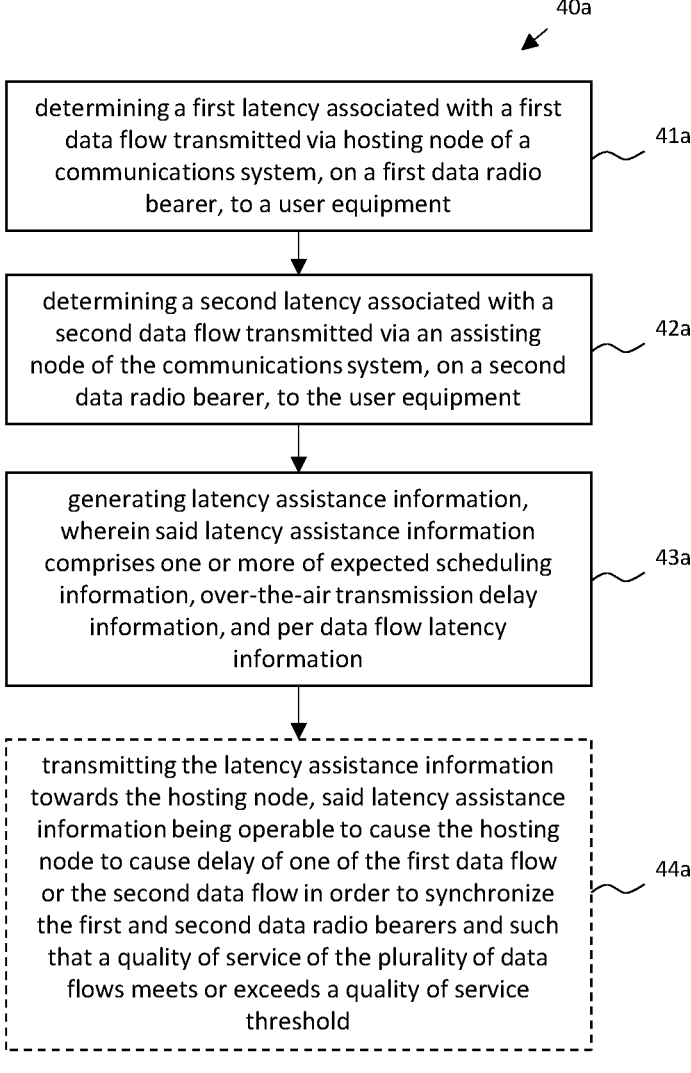

40a determining a first latency associated with a first data flow transmitted via hosting node of a communications system, on a first data radio bearer, to a user equipment
41a determining a second latency associated with a second data flow transmitted via an assisting node of the communications system, on a second data radio bearer, to the user equipment
42a generating latency assistance information, wherein said latency assistance information comprises one or more of expected scheduling information, over-the-air transmission delay information, and per data flow latency information
43a transmitting the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold
44a

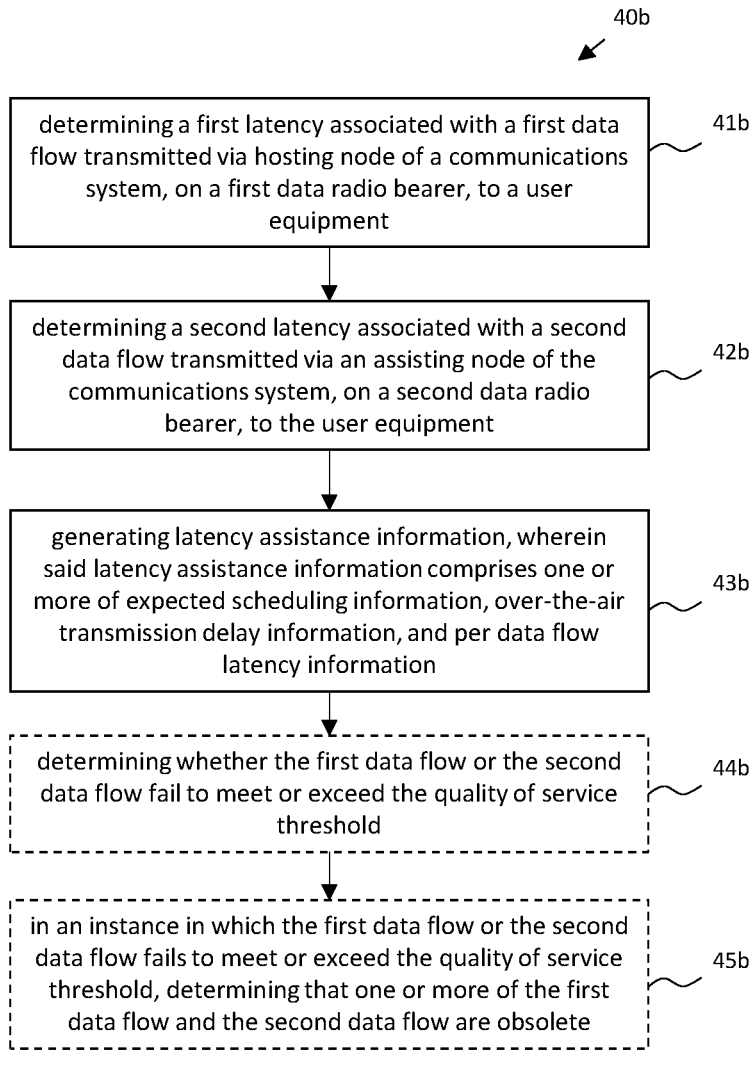

determining a first latency associated with a first data flow transmitted via hosting node of a communications system, on a first data radio bearer, to a user equipment — 41b determining a second latency associated with a second data flow transmitted via an assisting node of the communications system, on a second data radio bearer, to the user equipment — 42b generating latency assistance information, wherein said latency assistance information comprises one or more of expected scheduling information, over-the-air transmission delay information, and per data flow latency information — 43b determining whether the first data flow or the second data flow fail to meet or exceed the quality of service threshold — 44b in an instance in which the first data flow or the second data flow fails to meet or exceed the quality of service threshold, determining that one or more of the first data flow and the second data flow are obsolete — 45b

FIG. 22

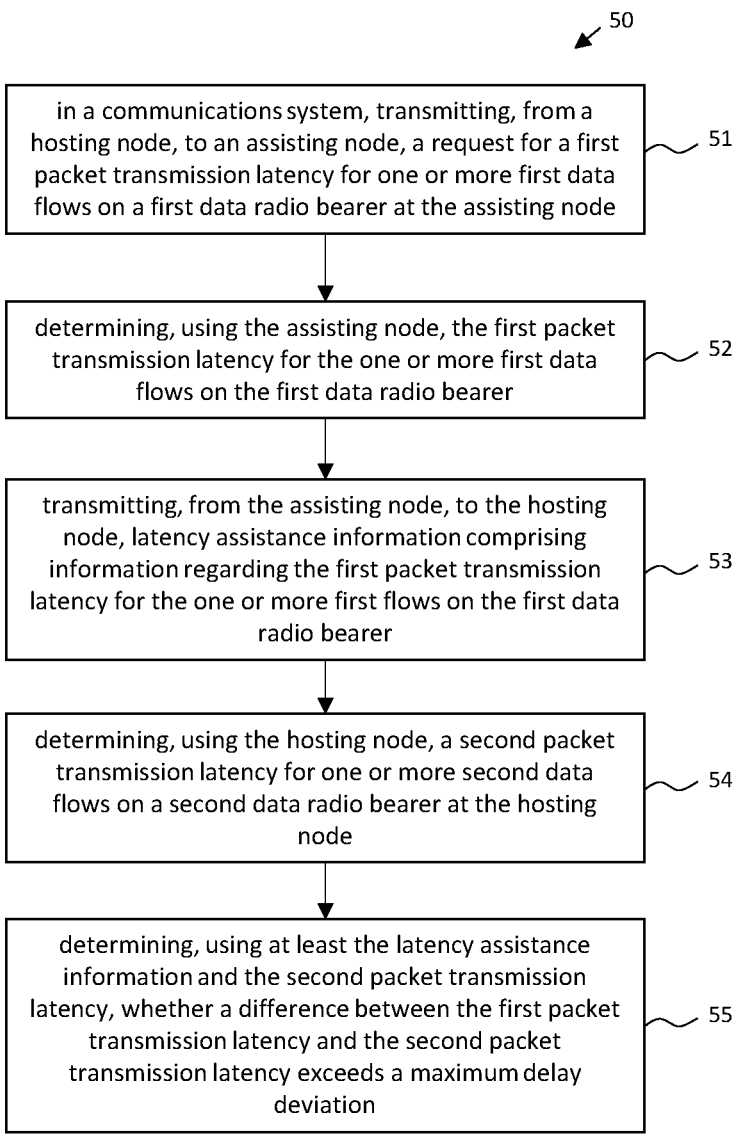

50 in a communications system, transmitting, from a hosting node, to an assisting node, a request for a first packet transmission latency for one or more first data flows on a first data radio bearer at the assisting node — 51 determining, using the assisting node, the first packet transmission latency for the one or more first data flows on the first data radio bearer — 52 transmitting, from the assisting node, to the hosting node, latency assistance information comprising information regarding the first packet transmission latency for the one or more first flows on the first data radio bearer — 53 determining, using the hosting node, a second packet transmission latency for one or more second data flows on a second data radio bearer at the hosting node — 54 determining, using at least the latency assistance information and the second packet transmission latency, whether a difference between the first packet transmission latency and the second packet transmission latency exceeds a maximum delay deviation — 55

FIG. 23

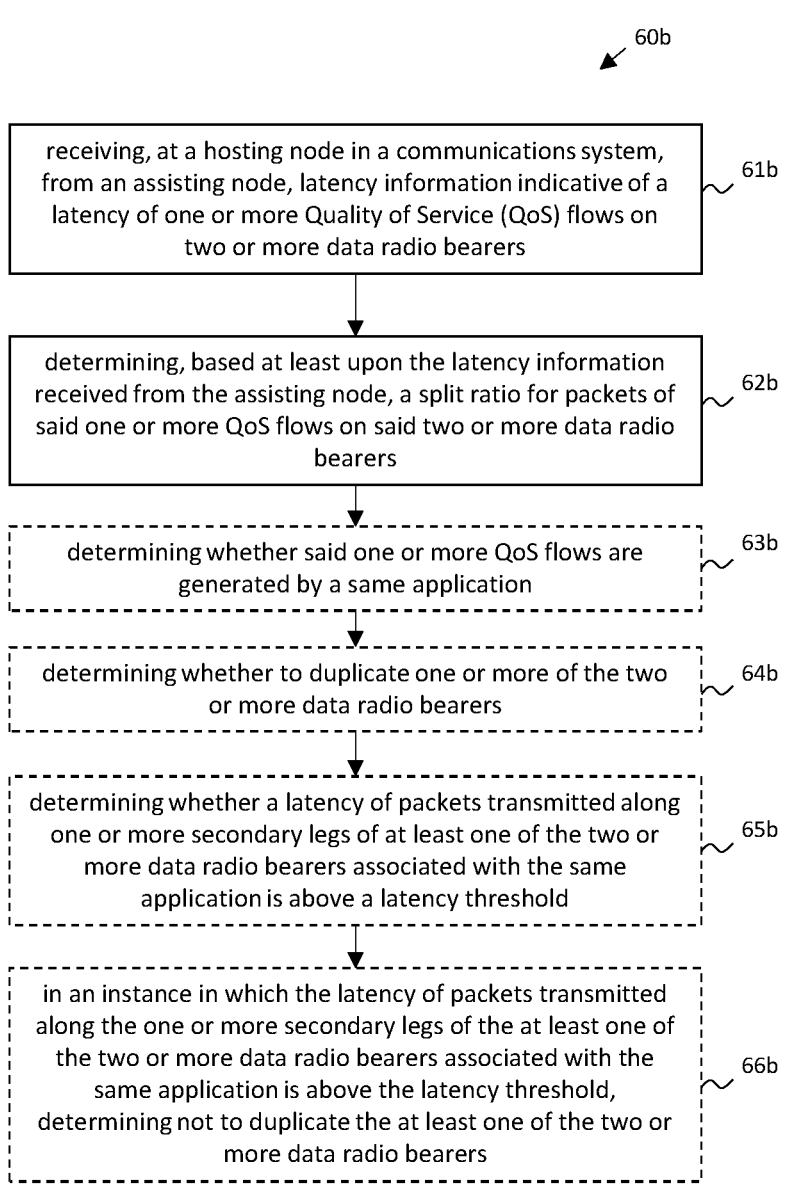

60b receiving, at a hosting node in a communications system, from an assisting node, latency information indicative of a latency of one or more Quality of Service (QoS) flows on two or more data radio bearers 61b determining, based at least upon the latency information received from the assisting node, a split ratio for packets of said one or more QoS flows on said two or more data radio bearers 62b determining whether said one or more QoS flows are generated by a same application 63b determining whether to duplicate one or more of the two or more data radio bearers 64b determining whether a latency of packets transmitted along one or more secondary legs of at least one of the two or more data radio bearers associated with the same application is above a latency threshold 65b in an instance in which the latency of packets transmitted along the one or more secondary legs of the at least one of the two or more data radio bearers associated with the same application is above the latency threshold, determining not to duplicate the at least one of the two or more data radio bearers 66b

FIG. 25

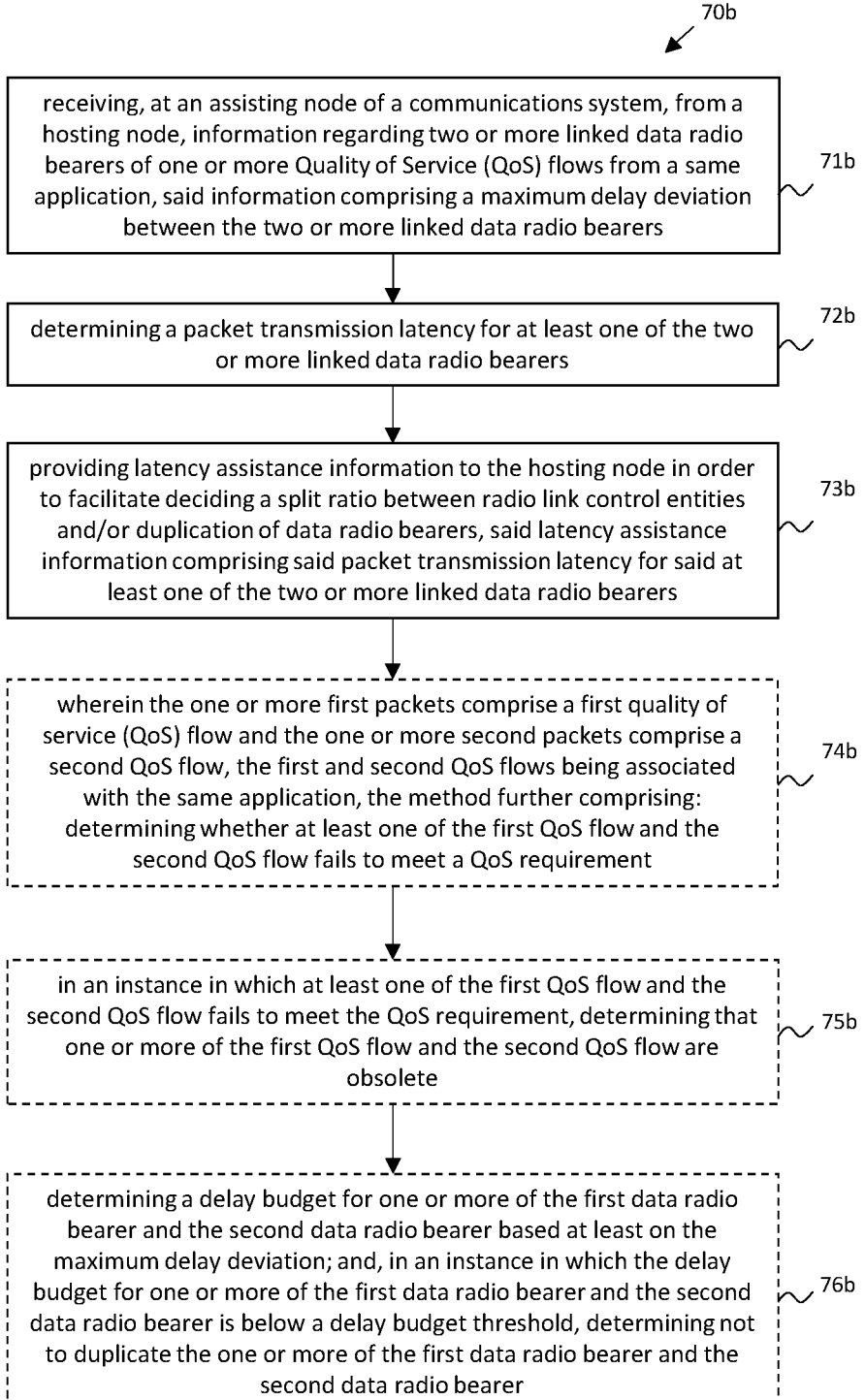

70b receiving, at an assisting node of a communications system, from a hosting node, information regarding two or more linked data radio bearers of one or more Quality of Service (QoS) flows from a same application, said information comprising a maximum delay deviation between the two or more linked data radio bearers 71b determining a packet transmission latency for at least one of the two or more linked data radio bearers 72b providing latency assistance information to the hosting node in order to facilitate deciding a split ratio between radio link control entities and/or duplication of data radio bearers, said latency assistance information comprising said packet transmission latency for said at least one of the two or more linked data radio bearers 73b wherein the one or more first packets comprise a first quality of service (QoS) flow and the one or more second packets comprise a second QoS flow, the first and second QoS flows being associated with the same application, the method further comprising: determining whether at least one of the first QoS flow and the second QoS flow fails to meet a QoS requirement 74b in an instance in which at least one of the first QoS flow and the second QoS flow fails to meet the QoS requirement, determining that one or more of the first QoS flow and the second QoS flow are obsolete 75b determining a delay budget for one or more of the first data radio bearer and the second data radio bearer based at least on the maximum delay deviation; and, in an instance in which the delay budget for one or more of the first data radio bearer and the second data radio bearer is below a delay budget threshold, determining not to duplicate the one or more of the first data radio bearer and the second data radio bearer 76b

FIG. 27

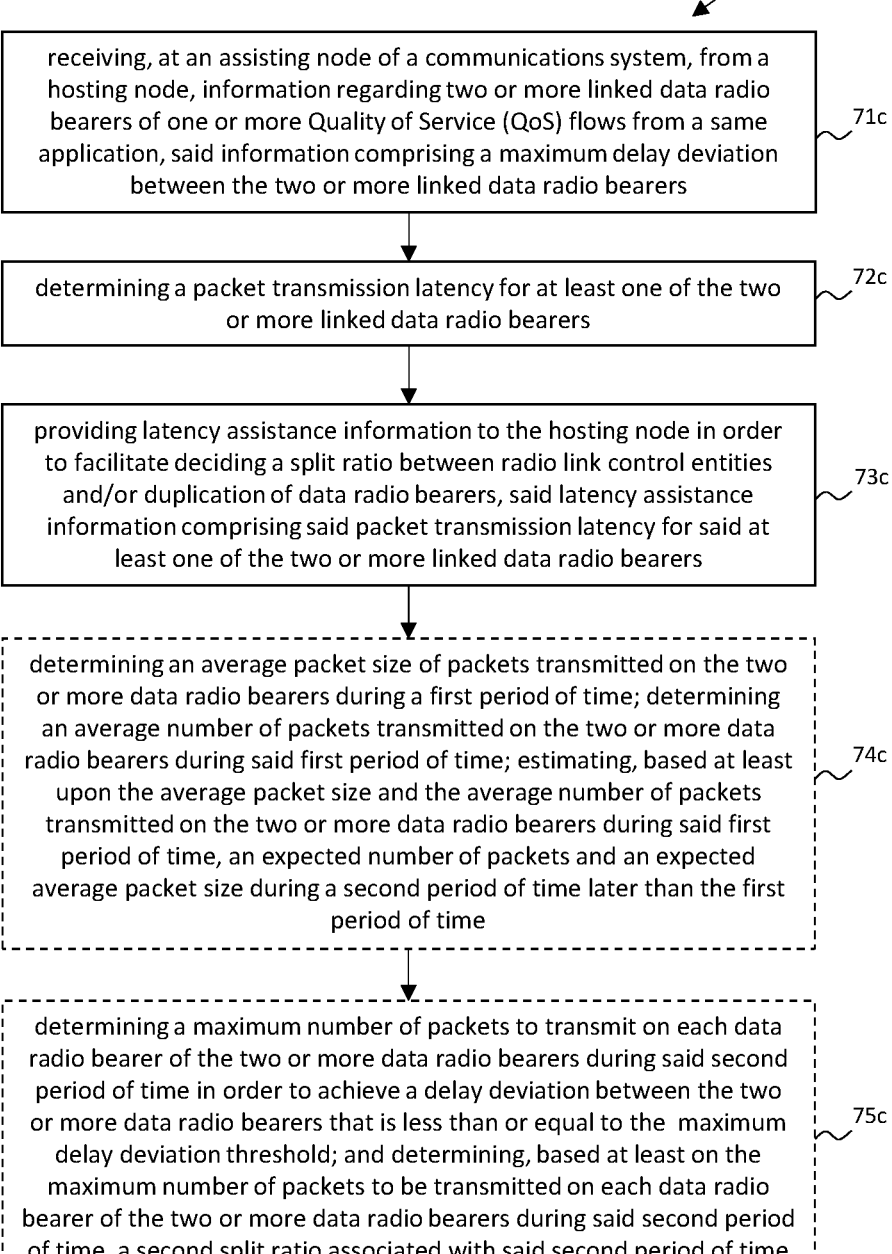

70c receiving, at an assisting node of a communications system, from a hosting node, information regarding two or more linked data radio bearers of one or more Quality of Service (QoS) flows from a same application, said information comprising a maximum delay deviation between the two or more linked data radio bearers 71c determining a packet transmission latency for at least one of the two or more linked data radio bearers 72c providing latency assistance information to the hosting node in order to facilitate deciding a split ratio between radio link control entities and/or duplication of data radio bearers, said latency assistance information comprising said packet transmission latency for said at least one of the two or more linked data radio bearers 73c determining an average packet size of packets transmitted on the two or more data radio bearers during a first period of time; determining an average number of packets transmitted on the two or more data radio bearers during said first period of time; estimating, based at least upon the average packet size and the average number of packets transmitted on the two or more data radio bearers during said first period of time, an expected number of packets and an expected average packet size during a second period of time later than the first period of time 74c determining a maximum number of packets to transmit on each data radio bearer of the two or more data radio bearers during said second period of time in order to achieve a delay deviation between the two or more data radio bearers that is less than or equal to the maximum delay deviation threshold; and determining, based at least on the maximum number of packets to be transmitted on each data radio bearer of the two or more data radio bearers during said second period of time, a second split ratio associated with said second period of time 75c

FIG. 28

METHOD AND APPARATUS TO SYNCHRONIZE RADIO BEARERS

RELATED APPLICATION

This application was originally filed as PCT Application No. PCT/EP2020/074851, filed on Sep. 4, 2020, of which is incorporated herein by reference in its entirety.

TECHNICAL FIELD

An example embodiment of the present disclosure generally relates to data and control streams carried by data radio bearers in a communication system.

BACKGROUND

In communication systems, such as fifth-generation (5G) communication systems, application such as eXtended Reality (XR) or Cloud Gaming may require multiple data streams to be transmitted towards or between various network entities and/or user equipment. Such applications often require lower latency and/or higher bandwidth for some data streams relative to others. However, current network architecture and protocols fail for various reasons to achieve a sufficient Quality of Experience (QoE) while maintaining sufficient latency and bandwidth requirements for the various data streams. As such, a number of issues associated with monitoring and maintaining a suitable QoE for applications in communication systems remain.

BRIEF SUMMARY

A method, apparatus and computer program product are provided in accordance with an example embodiment to synchronize radio bearers carrying data from an entity or application within a communication system (e.g., 5G), towards user equipment, in order to achieve a desired Quality of Experience (QoE) for applications with multiple data streams and multiple quality of service (QoS) flows. In some embodiments, two or more data radio bearers (DRBs) for carrying data from a single application, such as extended reality, virtual reality, augmented reality, or the like, e.g. online game streaming, may be synchronized in order to ensure desired QoE for an application with multiple QoS flows.

In one example embodiment, a method is provided that includes determining, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow. In some embodiments, the method further includes: determining whether the first QoS flow or the second QoS flow fail to meet a QoS requirement; and, in an instance in which the first QoS flow or the second QoS flow fails to meet the QoS requirement, determining that one or more of the first QoS flow and the second QoS flow are obsolete.

In another example embodiment, an apparatus is provided that includes processing circuitry and at least one memory including computer program code for one or more programs with the at least one memory and the computer program code configured to, with the processing circuitry, cause the apparatus at least to determine, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, cause a delay of one of the first one or more packets or the second one or more packets in order to synchronize the first and second data radio bearers. In some embodiments, the first one or more packets comprise a first quality of service (QoS) flow and the second one or more packets comprise a second QoS flow, and wherein the computer executable program code instructions further comprise program code instructions configured, upon execution, to: determine whether the first QoS flow or the second QoS flow fail to meet a QoS requirement; and, in an instance in which the first QoS flow or the second QoS flow fails to meet the QoS requirement, determine that one or more of the first QoS flow and the second QoS flow are obsolete.

In another example embodiment, a computer program product is provided that includes at least one non-transitory computer-readable storage medium having computer executable program code instructions stored therein with the computer executable program code instructions comprising program code instructions configured, upon execution, to determine, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, cause a delay of one of the first one or more packets or the second one or more packets in order to synchronize the first and second data radio bearers. In some embodiments, the first one or more packets comprise a first quality of service (QoS) flow and the second one or more packets comprise a second QoS flow, and wherein the computer executable program code instructions further comprise program code instructions configured, upon execution, to: determine whether the first QoS flow or the second QoS flow fail to meet a QoS requirement; and, in an instance in which the first QoS flow or the second QoS flow fails to meet the QoS requirement, determine that one or more of the first QoS flow and the second QoS flow are obsolete.

In another example embodiment, an apparatus is provided that includes means for determining, via a network entity of a communication network, a first latency associated with transmission of a first one or more packets on a first data radio bearer and a second latency associated with transmission of a second one or more packets on a second data radio bearer; and means for, in an instance in which a difference between the first latency and the second latency exceeds a predetermined threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow, the apparatus further comprising: means for determining whether the first QoS flow or the second QoS flow fail to meet a QoS requirement; and means for, in an instance in which the first QoS flow or the second QoS flow fails to meet the QoS requirement, determining that one or more of the first QoS flow and the second QoS flow are obsolete.

In yet another embodiment, an access node is provided that is part of a communications system. In some embodiments, the access node is configured to host a packet data convergence protocol entity. In some embodiments, the access node comprises processing circuitry and at least one memory including computer program code for one or more programs, the at least one memory and the computer program code configured to, with the processing circuitry, cause the access node at least to: in an instance in which the access node is configured to transmit data packets via multiple data radio bearers using a split bearer, provide information about linked data radio bearers to an assisting node of the communications system. In some embodiments, the information comprises a maximum delay deviation between two or more data radio bearers of the multiple data radio bearers. In some embodiments, the assisting node is configured to: determine a first latency associated with transmission of a first one or more packets on a first data radio bearer of the multiple data radio bearers and a second latency associated with transmission of a second one or more packets on a second data radio bearer of the multiple data radio bearers; and, in an instance in which a difference between the first latency and the second latency exceeds a predetermined threshold, cause a delay of one of the first one or more packets or the second one or more packets in order to synchronize the first and second data radio bearers.

According to still another embodiment, a method can be carried out that comprises, in an instance in which an access node of a communications system is configured to host a packet data convergence protocol entity and further is configured to transmit data packets via multiple data radio bearers using a split bearer, providing information about linked data radio bearers to an assisting node of the communications system. In some embodiments, the information comprises a maximum delay deviation between two or more data radio bearers of the multiple data radio bearers.

According to another embodiment, a computer program product can be provided that comprises at least one non-transitory computer-readable storage medium having computer executable program code instructions stored therein, the computer executable program code instructions comprising program code instructions configured, upon execution, to: in an instance in which an access node of a communications system is configured to host a packet data convergence protocol entity and further is configured to transmit data packets via multiple data radio bearers using a split bearer, provide information about linked data radio bearers to an assisting node of the communications system. In some embodiments, the information comprises a maximum delay deviation between two or more data radio bearers of the multiple data radio bearers.

According to yet another embodiment, an apparatus can be provided that comprises means for, in an instance in which an access node of a communications system is configured to host a packet data convergence protocol entity and further is configured to transmit data packets via multiple data radio bearers using a split bearer, providing information about linked data radio bearers to an assisting node of the communications system. In some embodiments, the information comprises a maximum delay deviation between two or more data radio bearers of the multiple data radio bearers.

According to still another embodiment, a method can be carried out that comprises providing, via an assisting node of a communications system, to a hosting node of the communications system, one or more of latency assistance information and a maximum delay deviation between two or more quality of service (QoS) flows transmitted on one or more data radio bearers; and determining a split ratio for radio link control entities and/or determining whether to duplicate the one or more data radio bearers. In some embodiments, the method can further comprise determining a delay budget of the one or more data radio bearers; and, in an instance in which the respective delay budget of the one or more data radio bearers is below a delay budget threshold, determining not to duplicate the respective one or more data radio bearers. In some embodiments, the method can further comprise determining a latency of one or more secondary legs of the one or more data radio bearers is above a latency threshold, and, in an instance in which the latency of at least one of the one or more secondary legs of the one or data radio bearers is above the latency threshold, determining not to duplicate the respective one or more data radio bearers. In some embodiments, the method can further comprise determining a latency of one or more secondary legs of the one or more data radio bearers is above a latency threshold, and, in an instance in which the latency of at least one of the one or more secondary legs of the one or data radio bearers is above the latency threshold, determining not to duplicate the respective one or more data radio bearers. In some embodiments, the method can further comprise determining whether the split ratio for the radio link control entities is above a threshold split ratio, and, in an instance in which the split ratio for the radio link control entities is above the threshold split ratio, determining whether to enable or disable a split within the radio link control entities and/or determining whether to duplicate data radio bearer traffic.

According to another embodiment, an apparatus can be provided that comprises means for providing, via an assisting node of a communications system, to a hosting node of the communications system, one or more of latency assistance information and a maximum delay deviation between two or more quality of service (QoS) flows transmitted on one or more data radio bearers; and means for determining a split ratio for radio link control entities and/or determining whether to duplicate the one or more data radio bearers. In some embodiments, the apparatus can further comprise means for determining a delay budget of the one or more data radio bearers; and means for, in an instance in which the respective delay budget of the one or more data radio bearers is below a delay budget threshold, determining not to duplicate the respective one or more data radio bearers. In some embodiments, the apparatus can further comprise means for determining a latency of one or more secondary legs of the one or more data radio bearers is above a latency threshold, and means for, in an instance in which the latency of at least one of the one or more secondary legs of the one or data radio bearers is above the latency threshold, determining not to duplicate the respective one or more data radio bearers. In some embodiments, the apparatus can further comprise means for determining a latency of one or more secondary legs of the one or more data radio bearers is above a latency threshold, and means for, in an instance in which the latency of at least one of the one or more secondary legs of the one or data radio bearers is above the latency threshold, determining not to duplicate the respective one or more data radio bearers. In some embodiments, the apparatus can further comprise means for determining whether the split ratio for the radio link control entities is above a threshold split ratio, and means for, in an instance in which the split ratio for the radio link control entities is above the threshold split ratio, determining whether to enable or disable a split within the radio link control entities and/or determining whether to duplicate data radio bearer traffic.

According to still another embodiment, a computer program product can be provided that comprises at least one non-transitory computer-readable storage medium having computer executable program code instructions stored therein, the computer executable program code instructions comprising program code instructions configured, upon execution, to: provide, via an assisting node of a communications system, to a hosting node of the communications system, one or more of latency assistance information and a maximum delay deviation between two or more quality of service (QoS) flows transmitted on one or more data radio bearers; and determine a split ratio for radio link control entities and/or determining whether to duplicate the one or more data radio bearers. In some embodiments, the computer executable program code instructions can further comprise program code instructions configured, upon execution, to: determine a delay budget of the one or more data radio bearers; and, in an instance in which the respective delay budget of the one or more data radio bearers is below a delay budget threshold, determine not to duplicate the respective one or more data radio bearers. In some embodiments, the computer executable program code instructions can further comprise program code instructions configured, upon execution, to: determine a latency of one or more secondary legs of the one or more data radio bearers is above a latency threshold, and, in an instance in which the latency of at least one of the one or more secondary legs of the one or data radio bearers is above the latency threshold, determine not to duplicate the respective one or more data radio bearers. In some embodiments, the computer executable program code instructions can further comprise program code instructions configured, upon execution, to: determine a latency of one or more secondary legs of the one or more data radio bearers is above a latency threshold, and, in an instance in which the latency of at least one of the one or more secondary legs of the one or data radio bearers is above the latency threshold, determine not to duplicate the respective one or more data radio bearers. In some embodiments, the computer executable program code instructions can further comprise program code instructions configured, upon execution, to: determine whether the split ratio for the radio link control entities is above a threshold split ratio, and, in an instance in which the split ratio for the radio link control entities is above the threshold split ratio, determine whether to enable or disable a split within the radio link control entities and/or determine whether to duplicate data radio bearer traffic.

According to yet another embodiment, an apparatus can be provided that comprises means for providing information about linked data radio bearers to an assisting node of the communications system, wherein said information comprises a maximum delay deviation between two or more data radio bearers of the multiple data radio bearers.

According to another embodiment, a method can be carried out that comprises providing information about linked data radio bearers to an assisting node of the communications system, wherein said information comprises a maximum delay deviation between two or more data radio bearers of the multiple data radio bearers.

According to still another embodiment, a computer program product can be provided that comprises at least one non-transitory computer-readable storage medium having computer executable program code instructions stored therein, the computer executable program code instructions comprising program code instructions configured, upon execution, to: provide information about linked data radio bearers to an assisting node of the communications system, wherein said information comprises a maximum delay deviation between two or more data radio bearers of the multiple data radio bearers.

According to yet another embodiment, an apparatus can be provided that comprises means for providing, to a network access node, information about multiple Quality of Service (QoS) flows transmitted on one or more data radio bearers, wherein said information is provided within one or more of user equipment capability information or radio resource control (RRC) messaging, and wherein said information is operable to cause synchronization of said multiple QoS flows.

According to another embodiment, a method can be carried out that comprises providing, from user equipment, to a network access node, information about multiple Quality of Service (QoS) flows transmitted on one or more data radio bearers, wherein said information is provided within one or more of user equipment capability information or radio resource control (RRC) messaging, and wherein said information is operable to cause synchronization of said multiple QoS flows.

According to still another embodiment, a computer program product can be provided that comprises at least one non-transitory computer-readable storage medium having computer executable program code instructions stored therein, the computer executable program code instructions comprising program code instructions configured, upon execution, to: provide, from user equipment, to a network access node, information about multiple Quality of Service (QoS) flows transmitted on one or more data radio bearers, wherein said information is provided within one or more of user equipment capability information or radio resource control (RRC) messaging, and wherein said information is operable to cause synchronization of said multiple QoS flows.

According to yet another embodiment, a method is provided that comprises: determining, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a latency threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow, the method further comprising: determining whether the first QoS flow or the second QoS flow fail to meet a QoS requirement; and, in an instance in which the first QoS flow or the second QoS flow fails to meet the QoS requirement, determining that one or more of the first QoS flow and the second QoS flow are obsolete. In some embodiments, the method can further comprise: determining a split ratio for a radio link control of one of the first data radio bearer and the second data radio bearer and/or determining whether to duplicate one or more of the first data radio bearer and the second data radio bearer. In some embodiments, the method can further comprise: determining a delay budget for one or more of the first data radio bearer and the second data radio bearer; and, in an instance in which the delay budget of a respective one of the first or second data radio bearer is below a delay budget threshold, determining not to duplicate the respective one of the first or second data radio bearer. In some embodiments, the method can further comprise: determining whether a latency of packets transmitted along one or more secondary legs of one of the first or second data radio bearer is above the latency threshold, and, in an instance in which the latency of packets transmitted along one or more secondary legs of one of the first or second data radio bearer is above the latency threshold, determining not to duplicate the respective one or more data radio bearers. In some embodiments, the method can further comprise: determining whether the split ratio for the radio link control of one of the first data radio bearer and the second data radio bearer is above a threshold split ratio, and, in an instance in which the split ratio for the radio link control of one of the first data radio bearer and the second data radio bearer is above the threshold split ratio, determining whether to enable or disable a split within the one of the first data radio bearer and the second data radio bearer and/or determining whether to duplicate data radio bearer traffic.

According to another embodiment, a method can be provided that comprises: in an instance in which at least one data radio bearer of two or more linked data radio bearers in a communications system are using a split bearer configuration, providing, from a hosting node of the communications system, to an assisting node of the communications system, information regarding the two or more linked data radio bearers, said information comprising a maximum delay deviation between the two or more linked data radio bearers.

According to another embodiment, a method can be provided that comprises: receiving, at an assisting node of a communications system, from a hosting node, information regarding two or more linked data radio bearers, said information comprising a maximum delay deviation between the two or more linked data radio bearers; determining a latency of packets on at least one of the two or more linked data radio bearers; and providing latency assistance information to the hosting node in order to facilitate deciding a split ratio between radio link control entities and/or duplication of data radio bearers.

According to still another embodiment, a method can be provided that comprises: determining a first latency associated with a first data flow transmitted via hosting node of a communications system, on a first data radio bearer, to a user equipment; determining a second latency associated with a second data flow transmitted via an assisting node of the communications system, on a second data radio bearer, to the user equipment; and generating latency assistance information, wherein said latency assistance information comprises one or more of expected scheduling information, over-the-air transmission delay information, and per data flow latency information. In some embodiments, the method can further comprise: transmitting the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold. In some embodiments, the method can further comprise: determining whether the first data flow or the second data flow fail to meet or exceed the quality of service threshold; and, in an instance in which the first data flow or the second data flow fails to meet or exceed the quality of service threshold, determining that one or more of the first data flow and the second data flow are obsolete. In some embodiments, the first data flow is transmitted using a first radio link control protocol and the second data flow is transmitted using a second radio link control protocol. In some embodiments, one or more of the first data flow and the second data flow comprise a data stream and a control stream.

According to yet another embodiment, a method can be provided that comprises: in a communications system, transmitting, from a hosting node, to an assisting node, a request for a first packet transmission latency for one or more first data flows on a first data radio bearer at the assisting node; determining, using the assisting node, the first packet transmission latency for the one or more first data flows on the first data radio bearer; transmitting, from the assisting node, to the hosting node, latency assistance information comprising information regarding the first packet transmission latency for the one or more first flows on the first data radio bearer; determining, using the hosting node, a second packet transmission latency for one or more second data flows on a second data radio bearer at the hosting node; and determining, using at least the latency assistance information and the second packet transmission latency, whether a difference between the first packet transmission latency and the second packet transmission latency exceeds a maximum delay deviation. In some embodiments, the method can further comprise: in an instance in which the difference between the first packet transmission latency and the second packet transmission latency exceeds the maximum delay deviation, causing a delay of at least one of the one or more first data flows or the one or more second data flows in order to synchronize the first and second data radio bearers. In some embodiments, the method can further comprise: determining a quality of service of the one or more first data flows; determining the quality of service of the one or more second data flows; and, in an instance in which the quality of service of at least one of the one or more first data flows or the one or more second data flows is lower than a predetermined quality of service threshold, determining that at least one of the one or more first data flows and the one or more second data flows are obsolete.

According to yet another embodiment, an apparatus can be provided that comprises: means for determining, via a network entity of a communication network, a first latency associated with transmission of a first one or more packets on a first data radio bearer and a second latency associated with transmission of a second one or more packets on a second data radio bearer; and means for, in an instance in which a difference between the first latency and the second latency exceeds a predetermined threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow. In some embodiments, the apparatus may further comprise: means for determining whether the first QoS flow or the second QoS flow fail to meet a QoS requirement; and means for, in an instance in which the first QoS flow or the second QoS flow fails to meet the QoS requirement, determining that one or more of the first QoS flow and the second QoS flow are obsolete. In some embodiments, the apparatus may further comprise: means for determining a split ratio for a radio link control of one of the first data radio bearer and the second data radio bearer and/or determining whether to duplicate one or more of the first data radio bearer and the second data radio bearer. In some embodiments, the apparatus may further comprise: means for determining a delay budget for one or more of the first data radio bearer and the second data radio bearer; and means for, in an instance in which the delay budget of a respective one of the first or second data radio bearer is below a delay budget threshold, determining not to duplicate the respective one of the first or second data radio bearer. In some embodiments, the apparatus may further comprise: means for determining whether a latency of packets transmitted along one or more secondary legs of one of the first or second data radio bearer is above the latency threshold, and means for, in an instance in which the latency of packets transmitted along one or more secondary legs of one of the first or second data radio bearer is above the latency threshold, determining not to duplicate the respective one or more data radio bearers. In some embodiments, the apparatus may further comprise: means for determining whether the split ratio for the radio link control of one of the first data radio bearer and the second data radio bearer is above a threshold split ratio; and means for, in an instance in which the split ratio for the radio link control of one of the first data radio bearer and the second data radio bearer is above the threshold split ratio, determining whether to enable or disable a split within the one of the first data radio bearer and the second data radio bearer and/or determining whether to duplicate data radio bearer traffic.

According to another embodiment, an apparatus can be provided that comprises: means for, in an instance in which at least one data radio bearer of two or more linked data radio bearers in a communications system are using a split bearer configuration, providing, from a hosting node of the communications system, to an assisting node of the communications system, information regarding the two or more linked data radio bearers, said information comprising a maximum delay deviation between the two or more linked data radio bearers.

According to yet another embodiment, an apparatus can be provided that comprises: means for receiving, at an assisting node of a communications system, from a hosting node, information regarding two or more linked data radio bearers, said information comprising a maximum delay deviation between the two or more linked data radio bearers; means for determining a latency of packets on at least one of the two or more linked data radio bearers; and means for providing latency assistance information to the hosting node in order to facilitate deciding a split ratio between radio link control entities and/or duplication of data radio bearers.

According to still another embodiment, an apparatus can be provided that comprises: means for determining a first latency associated with a first data flow transmitted via hosting node of a communications system, on a first data radio bearer, to a user equipment; means for determining a second latency associated with a second data flow transmitted via an assisting node of the communications system, on a second data radio bearer, to the user equipment; and means for generating latency assistance information, wherein said latency assistance information comprises one or more of expected scheduling information, over-the-air transmission delay information, and per data flow latency information. In some embodiments, the apparatus may further comprise: means for transmitting the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold. In some embodiments, the apparatus may further comprise: means for determining whether the first data flow or the second data flow fail to meet or exceed the quality of service threshold; and means for, in an instance in which the first data flow or the second data flow fails to meet or exceed the quality of service threshold, determining that one or more of the first data flow and the second data flow are obsolete. In some embodiments, the first data flow is transmitted using a first radio link control protocol and the second data flow is transmitted using a second radio link control protocol. In some embodiments, one or more of the first data flow and the second data flow comprise a data stream and a control stream.

According to another embodiment, an apparatus can be provided that comprises: means for, in a communications system, transmitting, from a hosting node, to an assisting node, a request for a first packet transmission latency for one or more first data flows on a first data radio bearer at the assisting node; means for determining, using the assisting node, the first packet transmission latency for the one or more first data flows on the first data radio bearer; means for transmitting, from the assisting node, to the hosting node, latency assistance information comprising information regarding the first packet transmission latency for the one or more first flows on the first data radio bearer; means for determining, using the hosting node, a second packet transmission latency for one or more second data flows on a second data radio bearer at the hosting node; and means for determining, using at least the latency assistance information and the second packet transmission latency, whether a difference between the first packet transmission latency and the second packet transmission latency exceeds a maximum delay deviation. In some embodiments, the apparatus may further comprise: means for, in an instance in which the difference between the first packet transmission latency and the second packet transmission latency exceeds the maximum delay deviation, causing a delay of at least one of the one or more first data flows or the one or more second data flows in order to synchronize the first and second data radio bearers. In some embodiments, the apparatus may further comprise: means for determining a quality of service of the one or more first data flows; means for determining the quality of service of the one or more second data flows; and means for, in an instance in which the quality of service of at least one of the one or more first data flows or the one or more second data flows is lower than a predetermined quality of service threshold, determining that at least one of the one or more first data flows and the one or more second data flows are obsolete.

According to another embodiment, a computer program product can be provided that comprises at least one non-transitory computer-readable storage medium having computer executable program code instructions stored therein, the computer executable program code instructions comprising program code instructions configured, upon execution, to: determine, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, cause a delay of one of the first one or more packets or the second one or more packets in order to synchronize the first and second data radio bearers. In some embodiments, the first one or more packets comprise a first quality of service (QoS) flow and the second one or more packets comprise a second QoS flow. In some embodiments, the computer executable program code instructions may further comprise program code instructions configured, upon execution, to: determine whether the first QoS flow or the second QoS flow fail to meet a QoS requirement; and, in an instance in which the first QoS flow or the second QoS flow fails to meet the QoS requirement, determine that one or more of the first QoS flow and the second QoS flow are obsolete. In some embodiments, the computer executable program code instructions may further comprise program code instructions configured, upon execution, to: determine a split ratio for a radio link control of one of the first data radio bearer and the second data radio bearer and/or determining whether to duplicate one or more of the first data radio bearer and the second data radio bearer. In some embodiments, the computer executable program code instructions may further comprise program code instructions configured, upon execution, to: determine a delay budget for one or more of the first data radio bearer and the second data radio bearer; and, in an instance in which the delay budget of a respective one of the first or second data radio bearer is below a delay budget threshold, determine not to duplicate the respective one of the first or second data radio bearer. In some embodiments, the computer executable program code instructions may further comprise program code instructions configured, upon execution, to: determine whether a latency of packets transmitted along one or more secondary legs of one of the first or second data radio bearer is above the latency threshold, and, in an instance in which the latency of packets transmitted along one or more secondary legs of one of the first or second data radio bearer is above the latency threshold, determine not to duplicate the respective one or more data radio bearers. In some embodiments, the computer executable program code instructions may further comprise program code instructions configured, upon execution, to: determine whether the split ratio for the radio link control of one of the first data radio bearer and the second data radio bearer is above a threshold split ratio; and, in an instance in which the split ratio for the radio link control of one of the first data radio bearer and the second data radio bearer is above the threshold split ratio, determine whether to enable or disable a split within the one of the first data radio bearer and the second data radio bearer and/or determining whether to duplicate data radio bearer traffic.

According to still another embodiment, a computer program product can be provided that comprises at least one non-transitory computer-readable storage medium having computer executable program code instructions stored therein, the computer executable program code instructions comprising program code instructions configured, upon execution, to: in an instance in which at least one data radio bearer of two or more linked data radio bearers in a communications system are using a split bearer configuration, provide, from a hosting node of the communications system, to an assisting node of the communications system, information regarding the two or more linked data radio bearers, said information comprising a maximum delay deviation between the two or more linked data radio bearers.

According to an embodiment, a computer program product can be provided that comprises at least one non-transitory computer-readable storage medium having computer executable program code instructions stored therein, the computer executable program code instructions comprising program code instructions configured, upon execution, to: receive, at an assisting node of a communications system, from a hosting node, information regarding two or more linked data radio bearers, said information comprising a maximum delay deviation between the two or more linked data radio bearers; determine a latency of packets on at least one of the two or more linked data radio bearers; and provide latency assistance information to the hosting node in order to facilitate deciding a split ratio between radio link control entities and/or duplication of data radio bearers.

According to another embodiment, a computer program product can be provided that comprises at least one non-transitory computer-readable storage medium having computer executable program code instructions stored therein, the computer executable program code instructions comprising program code instructions configured, upon execution, to: determine a first latency associated with a first data flow transmitted via hosting node of a communications system, on a first data radio bearer, to a user equipment; determine a second latency associated with a second data flow transmitted via an assisting node of the communications system, on a second data radio bearer, to the user equipment; and generate latency assistance information, wherein said latency assistance information comprises one or more of expected scheduling information, over-the-air transmission delay information, and per data flow latency information. In some embodiments, the computer executable program code instructions further comprise program code instructions configured, upon execution, to: transmit the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold. In some embodiments, the computer executable program code instructions further comprise program code instructions configured, upon execution, to: determine whether the first data flow or the second data flow fail to meet or exceed the quality of service threshold; and, in an instance in which the first data flow or the second data flow fails to meet or exceed the quality of service threshold, determine that one or more of the first data flow and the second data flow are obsolete. In some embodiments, the first data flow is transmitted using a first radio link control protocol and the second data flow is transmitted using a second radio link control protocol. In some embodiments, one or more of the first data flow and the second data flow comprise a data stream and a control stream.

According to still another embodiment, a computer program product can be provided that comprises at least one non-transitory computer-readable storage medium having computer executable program code instructions stored therein, the computer executable program code instructions comprising program code instructions configured, upon execution, to: in a communications system, transmit, from a hosting node, to an assisting node, a request for a first packet transmission latency for one or more first data flows on a first data radio bearer at the assisting node; determine, using the assisting node, the first packet transmission latency for the one or more first data flows on the first data radio bearer; transmit, from the assisting node, to the hosting node, latency assistance information comprising information regarding the first packet transmission latency for the one or more first flows on the first data radio bearer; determine, using the hosting node, a second packet transmission latency for one or more second data flows on a second data radio bearer at the hosting node; and determine, using at least the latency assistance information and the second packet transmission latency, whether a difference between the first packet transmission latency and the second packet transmission latency exceeds a maximum delay deviation. In some embodiments, the computer executable program code instructions further comprise program code instructions configured, upon execution, to: in an instance in which the difference between the first packet transmission latency and the second packet transmission latency exceeds the maximum delay deviation, cause a delay of at least one of the one or more first data flows or the one or more second data flows in order to synchronize the first and second data radio bearers. In some embodiments, the computer executable program code instructions further comprise program code instructions configured, upon execution, to: determine a quality of service of the one or more first data flows; determine the quality of service of the one or more second data flows; and, in an instance in which the quality of service of at least one of the one or more first data flows or the one or more second data flows is lower than a predetermined quality of service threshold, determine that at least one of the one or more first data flows and the one or more second data flows are obsolete.

According to another embodiment, a method can be provided or carried out, the method comprising: receiving, at a hosting node in a communications system, from an assisting node, latency information indicative of a latency of one or more Quality of Service (QoS) flows on two or more data radio bearers; and determining, based at least upon the latency information received from the assisting node, a split ratio for packets of said one or more QoS flows on said two or more data radio bearers. In some embodiments, the method can further comprise: receiving synchronization information indicative of at least one QoS flow of the one or more QoS flows that need to be synchronized with at least one other QoS flow of the one or more QoS flows; or determining at least one QoS flow of the one or more QoS flows that need to be synchronized with at least one other QoS flow of the one or more QoS flows. In some embodiments, the method can further comprise: determining a maximum latency deviation which indicates the maximum latency difference allowed between the one or more QoS flows; and providing the maximum latency deviation to the assisting node. In some embodiments, the method can further comprise: determining whether said one or more QoS flows are generated by a same application; and determining whether to duplicate one or more of the two or more data radio bearers. In some embodiments, the method can further comprise: determining whether a latency of packets transmitted along one or more secondary legs of at least one of the two or more data radio bearers associated with the same application is above a latency threshold; and, in an instance in which the latency of packets transmitted along the one or more secondary legs of the at least one of the two or more data radio bearers associated with the same application is above the latency threshold, determining not to duplicate the at least one of the two or more data radio bearers. In some embodiments, said split ratio may be operable for radio link control of the two or more data radio bearers. In some embodiments, the method can further comprise: determining whether the split ratio is above a threshold split ratio; and at least one of: in an instance in which the split ratio for the radio link control of the two or more data radio bearers is above the threshold split ratio, determining whether to enable or disable a split within respective data radio bearers of the two or more data radio bearers, and, in an instance in which the split ratio for the radio link control of the two or more data radio bearers is above the threshold split ratio, determining whether to duplicate data radio bearer traffic. In some embodiments, the method can further comprise: providing said split ratio to one or more of the assisting node and user equipment.

According to yet another embodiment, a method can be provided or carried out, the method comprising: receiving, at an assisting node of a communications system, from a hosting node, information regarding two or more linked data radio bearers of one or more Quality of Service (QoS) flows from a same application, said information comprising a maximum delay deviation between the two or more linked data radio bearers; determining a packet transmission latency for at least one of the two or more linked data radio bearers; and providing latency assistance information to the hosting node in order to facilitate deciding a split ratio between radio link control entities and/or duplication of data radio bearers, said latency assistance information comprising said packet transmission latency for said at least one of the two or more linked data radio bearers. In some embodiments, the method can further comprise: determining, via the assisting node, a first packet transmission latency of one or more first packets on a first data radio bearer of the two or more linked data radio bearers and a second packet transmission latency of one or more second packets on a second data radio bearer of the two or more linked data radio bearers, the second packet transmission latency being larger than the first packet transmission latency; and, in an instance in which a difference between the first packet transmission latency and the second packet transmission latency exceeds the maximum delay deviation, executing an action on at least one of the first data radio bearer and the second data radio bearer, said action comprising at least one from among: increasing a scheduling priority of packets of the second data radio bearer, reducing a load of the second data radio bearer, and postponing the transmission of packets of one or more of the first and second data radio bearers in order to synchronize the packet transmission latency of the first and second data radio bearers. In some embodiments, the one or more first packets may comprise a first quality of service (QoS) flow and the one or more second packets comprise a second QoS flow, the first and second QoS flows being associated with the same application. In some embodiments, the method can further comprise: determining whether at least one of the first QoS flow and the second QoS flow fails to meet a QoS requirement; and, in an instance in which at least one of the first QoS flow and the second QoS flow fails to meet the QoS requirement, determining that one or more of the first QoS flow and the second QoS flow are obsolete. In some embodiments, the method can further comprise: determining a delay budget for one or more of the first data radio bearer and the second data radio bearer based at least on the maximum delay deviation; and, in an instance in which the delay budget for one or more of the first data radio bearer and the second data radio bearer is below a delay budget threshold, determining not to duplicate the one or more of the first data radio bearer and the second data radio bearer. In some embodiments, the method can further comprise at least one of: determining an average packet size of packets transmitted on the two or more data radio bearers during a first period of time; determining an average number of packets transmitted on the two or more data radio bearers during said first period of time; and estimating, based at least upon the average packet size and the average number of packets transmitted on the two or more data radio bearers during said first period of time, an expected number of packets and an expected average packet size during a second period of time later than the first period of time. In some embodiments, said second period of time is in the future. In some embodiments, the method can further comprise: determining a maximum number of packets to transmit on each data radio bearer of the two or more data radio bearers during said second period of time in order to achieve a delay deviation between the two or more data radio bearers that is less than or equal to the maximum delay deviation threshold; and determining, based at least on the maximum number of packets to be transmitted on each data radio bearer of the two or more data radio bearers during said second period of time, a second split ratio associated with said second period of time. In some embodiments, the method can further comprise: determining a number of packets to be transmitted on each data radio bearer of the two or more data radio bearers during said second period of time in order to minimize a delay deviation between the two or more data radio bearers during said second period of time; and determining, based at least on the number of packets to be transmitted on each data radio bearer of the two or more data radio bearers during said future period of time, a second split ratio associated with said second period of time.

According to yet another embodiment, an apparatus can be provided that comprises means, such as a processor and memory storing computer program code or the like. In some embodiments, the apparatus can comprise: means for receiving, at a hosting node in a communications system, from an assisting node, latency information indicative of a latency of one or more Quality of Service (QoS) flows on two or more data radio bearers; and means for determining, based at least upon the latency information received from the assisting node, a split ratio for packets of said one or more QoS flows on said two or more data radio bearers. In some embodiments, the apparatus can further comprise: means for receiving synchronization information indicative of at least one QoS flow of the one or more QoS flows that need to be synchronized with at least one other QoS flow of the one or more QoS flows; or means for determining at least one QoS flow of the one or more QoS flows that need to be synchronized with at least one other QoS flow of the one or more QoS flows. In some embodiments, the apparatus can further comprise: means for determining a maximum latency deviation which indicates the maximum latency difference allowed between the one or more QoS flows; and means for providing the maximum latency deviation to the assisting node. In some embodiments, the apparatus can further comprise: means for determining whether said one or more QoS flows are generated by a same application; and means for determining whether to duplicate one or more of the two or more data radio bearers. In some embodiments, the apparatus can further comprise: means for determining whether a latency of packets transmitted along one or more secondary legs of at least one of the two or more data radio bearers associated with the same application is above a latency threshold, and means for, in an instance in which the latency of packets transmitted along the one or more secondary legs of the at least one of the two or more data radio bearers associated with the same application is above the latency threshold, determining not to duplicate the at least one of the two or more data radio bearers. In some embodiments, said split ratio is for radio link control of the two or more data radio bearers. In some embodiments, the apparatus can further comprise: means for determining whether the split ratio is above a threshold split ratio; and at least one of: means for, in an instance in which the split ratio for the radio link control of the two or more data radio bearers is above the threshold split ratio, determining whether to enable or disable a split within respective data radio bearers of the two or more data radio bearers, and means for, in an instance in which the split ratio for the radio link control of the two or more data radio bearers is above the threshold split ratio, determining whether to duplicate data radio bearer traffic. In some embodiments, the apparatus can further comprise: means for providing said split ratio to one or more of the assisting node and user equipment.

According to still another embodiment, an apparatus can be provided that comprises means, such as a processor and a memory storing computer program code. In some embodiments, the apparatus can comprise: means for receiving, at an assisting node of a communications system, from a hosting node, information regarding two or more linked data radio bearers of one or more Quality of Service (QoS) flows from a same application, said information comprising a maximum delay deviation between the two or more linked data radio bearers; means for determining a packet transmission latency for at least one of the two or more linked data radio bearers; and means for providing latency assistance information to the hosting node in order to facilitate deciding a split ratio between radio link control entities and/or duplication of data radio bearers, said latency assistance information comprising said packet transmission latency for said at least one of the two or more linked data radio bearers. In some embodiments, the apparatus can further comprise: means for determining, via the assisting node, a first packet transmission latency of one or more first packets on a first data radio bearer of the two or more linked data radio bearers and a second packet transmission latency of one or more second packets on a second data radio bearer of the two or more linked data radio bearers, the second packet transmission latency being larger than the first packet transmission latency; and means for, in an instance in which a difference between the first packet transmission latency and the second packet transmission latency exceeds the maximum delay deviation, executing an action on at least one of the first data radio bearer and the second data radio bearer, said action comprising at least one from among: increasing a scheduling priority of packets of the second data radio bearer, reducing a load of the second data radio bearer, and postponing the transmission of packets of one or more of the first data radio bearer and second data radio bearers in order to synchronize the packet transmission latency of the first and second data radio bearers. In some embodiments, the one or more first packets comprise a first quality of service (QoS) flow and the one or more second packets comprise a second QoS flow, the first and second QoS flows being associated with the same application. In some embodiments, the apparatus can further comprise: means for determining whether at least one of the first QoS flow and the second QoS flow fails to meet a QoS requirement; and means for, in an instance in which at least one of the first QoS flow and the second QoS flow fails to meet the QoS requirement, determining that one or more of the first QoS flow and the second QoS flow are obsolete. In some embodiments, the apparatus can further comprise: means for determining a delay budget for one or more of the first data radio bearer and the second data radio bearer based at least on the maximum delay deviation; and means for, in an instance in which the delay budget for one or more of the first data radio bearer and the second data radio bearer is below a delay budget threshold, determining not to duplicate the one or more of the first data radio bearer and the second data radio bearer. In some embodiments, the apparatus can further comprise at least one of: means for determining an average packet size of packets transmitted on the two or more data radio bearers during a first period of time; means for determining an average number of packets transmitted on the two or more data radio bearers during said first period of time; and means for estimating, based at least upon the average packet size and the average number of packets transmitted on the two or more data radio bearers during said first period of time, an expected number of packets and an expected average packet size during a second period of time. In some embodiments, said second period of time is in the future. In some embodiments, the apparatus can further comprise: means for determining a maximum number of packets to transmit on each data radio bearer of the two or more data radio bearers during said second period of time in order to achieve a delay deviation between the two or more data radio bearers that is less than or equal to the maximum delay deviation threshold; and means for determining, based at least on the maximum number of packets to be transmitted on each data radio bearer of the two or more data radio bearers during said second period of time, a second split ratio associated with said second period of time. In some embodiments, the apparatus can further comprise: means for determining a number of packets to be transmitted on each data radio bearer of the two or more data radio bearers during said second period of time in order to minimize a delay deviation between the two or more data radio bearers during said second period of time; and means for determining, based at least on the number of packets to be transmitted on each data radio bearer of the two or more data radio bearers during said second period of time, a second split ratio associated with second period of time.

According to another embodiment, a computer program product can be provided that comprises at least one non-transitory computer-readable storage medium having computer executable program code instructions stored therein, the computer executable program code instructions comprising program code instructions configured, upon execution, to: receiving, at a hosting node in a communications system, from an assisting node, latency information indicative of a latency of one or more Quality of Service (QoS) flows on two or more data radio bearers. In some embodiments, the computer executable program code instructions can further comprise program code instructions configured, upon execution, to: determine, based at least upon the latency information received from the assisting node, a split ratio for packets of said one or more QoS flows on said two or more data radio bearers. In some embodiments, the computer executable program code instructions can further comprise program code instructions configured, upon execution, to: receive synchronization information indicative of at least one QoS flow of the one or more QoS flows that need to be synchronized with at least one other QoS flow of the one or more QoS flows; or determine at least one QoS flow of the one or more QoS flows that need to be synchronized with at least one other QoS flow of the one or more QoS flows. In some embodiments, the computer executable program code instructions can further comprise program code instructions configured, upon execution, to: determine a maximum latency deviation which indicates the maximum latency difference allowed between the one or more QoS flows; and provide the maximum latency deviation to the assisting node. In some embodiments, the computer executable program code instructions can further comprise program code instructions configured, upon execution, to: determine whether said one or more QoS flows are generated by a same application; and determine whether to duplicate one or more of the two or more data radio bearers. In some embodiments, the computer executable program code instructions can further comprise program code instructions configured, upon execution, to: determine whether a latency of packets transmitted along one or more secondary legs of at least one of the two or more data radio bearers associated with the same application is above a latency threshold, and, in an instance in which the latency of packets transmitted along the one or more secondary legs of the at least one of the two or more data radio bearers associated with the same application is above the latency threshold, determine not to duplicate the at least one of the two or more data radio bearers. In some embodiments, the split ratio is operable for radio link control of the two or more data radio bearers. In some embodiments, the computer executable program code instructions can further comprise program code instructions configured, upon execution, to: determine whether the split ratio is above a threshold split ratio; and at least one of: in an instance in which the split ratio for the radio link control of the two or more data radio bearers is above the threshold split ratio, determine whether to enable or disable a split within respective data radio bearers of the two or more data radio bearers, and, in an instance in which the split ratio for the radio link control of the two or more data radio bearers is above the threshold split ratio, determine whether to duplicate data radio bearer traffic. In some embodiments, the computer executable program code instructions can further comprise program code instructions configured, upon execution, to: provide said split ratio to one or more of the assisting node and user equipment.

According to yet another embodiment, a computer program product can be provided that comprises at least one non-transitory computer-readable storage medium having computer executable program code instructions stored therein, the computer executable program code instructions comprising program code instructions configured, upon execution, to: receive, at an assisting node of a communications system, from a hosting node, information regarding two or more linked data radio bearers of one or more Quality of Service (QoS) flows from a same application, said information comprising a maximum delay deviation between the two or more linked data radio bearers. In some embodiments, the computer executable program code instructions can further comprise program code instructions configured, upon execution, to: determine a packet transmission latency of packets on at least one of the two or more linked data radio bearers. In some embodiments, the computer executable program code instructions can further comprise program code instructions configured, upon execution, to: provide latency assistance information to the hosting node in order to facilitate deciding a split ratio between radio link control entities and/or duplication of data radio bearers. In some embodiments, the computer executable program code instructions can further comprise program code instructions configured, upon execution, to: determine, via the assisting node, a first packet transmission latency of one or more first packets on a first data radio bearer of the two or more linked data radio bearers and a second packet transmission latency of one or more second packets on a second data radio bearer of the two or more linked data radio bearers, the second packet transmission latency being larger than the first packet transmission latency; and, in an instance in which a difference between the first packet transmission latency and the second packet transmission latency exceeds the maximum delay deviation, execute an action on at least one of the first data radio bearer and the second data radio bearer, said action comprising at least one from among: increasing a scheduling priority of packets of the second data radio bearer, reducing a load of the second data radio bearer, and postponing the transmission of packets of one or more of the first and second data radio bearers in order to synchronize the packet transmission latency of the first and second data radio bearers. In some embodiments, the one or more first packets comprise a first QoS flow and the one or more second packets comprise a second QoS flow. In some embodiments, the first and second QoS flows are associated with the same application. In some embodiments, the computer executable program code instructions can further comprise program code instructions configured, upon execution, to: determine whether at least one of the first QoS flow and the second QoS flow fails to meet a QoS requirement; and, in an instance in which at least one of the first QoS flow and the second QoS flow fails to meet the QoS requirement, determine that one or more of the first QoS flow and the second QoS flow are obsolete. In some embodiments, the computer executable program code instructions can further comprise program code instructions configured, upon execution, to: determine a delay budget for one or more of the first data radio bearer and the second data radio bearer based at least on the maximum delay deviation; and, in an instance in which the delay budget for one or more of the first data radio bearer and the second data radio bearer is below a delay budget threshold, determine not to duplicate the one or more of the first data radio bearer and the second data radio bearer. In some embodiments, the computer executable program code instructions can further comprise program code instructions configured, upon execution, to: determine an average packet size of packets transmitted on the two or more data radio bearers during a first period of time; determine an average number of packets transmitted on the two or more data radio bearers during said first period of time; and estimate, based at least upon the average packet size and the average number of packets transmitted on the two or more data radio bearers during said first period of time, an expected number of packets and an expected average packet size during a second period of time. In some embodiments, the second period of time is in the future. In some embodiments, the computer executable program code instructions can further comprise program code instructions configured, upon execution, to: determine a maximum number of packets to transmit on each data radio bearer of the two or more data radio bearers during said second period of time in order to achieve a delay deviation between the two or more data radio bearers that is less than or equal to the maximum delay deviation threshold; and determine, based at least on the maximum number of packets to be transmitted on each data radio bearer of the two or more data radio bearers during said second period of time, a second split ratio associated with said second period of time. In some embodiments, the computer executable program code instructions can further comprise program code instructions configured, upon execution, to: determine a number of packets to be transmitted on each data radio bearer of the two or more data radio bearers during said second period of time in order to minimize a delay deviation between the two or more data radio bearers during said second period of time; and determine, based at least on the number of packets to be transmitted on each data radio bearer of the two or more data radio bearers during said second period of time, a second split ratio associated with said second period of time.

BRIEF DESCRIPTION OF THE DRAWINGS

Figure 1:
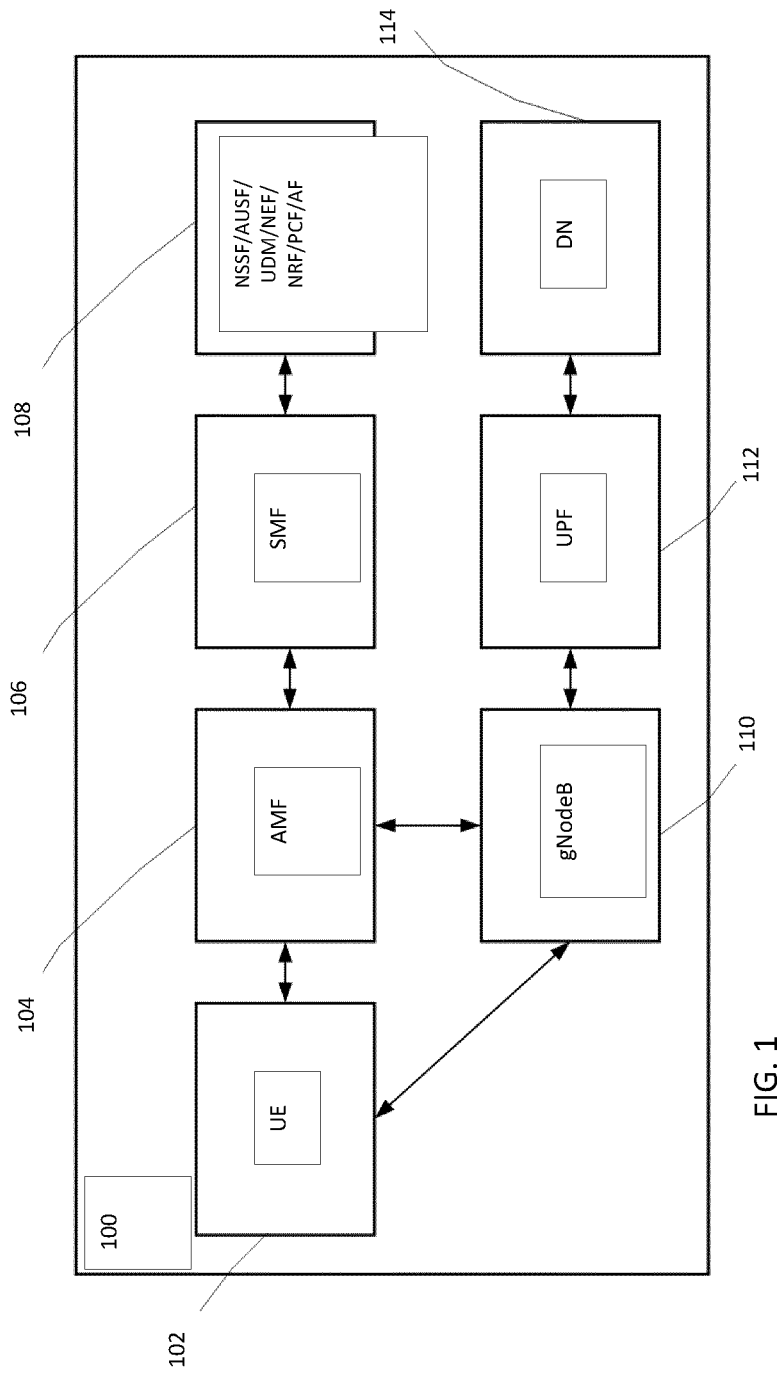
Figure 2:
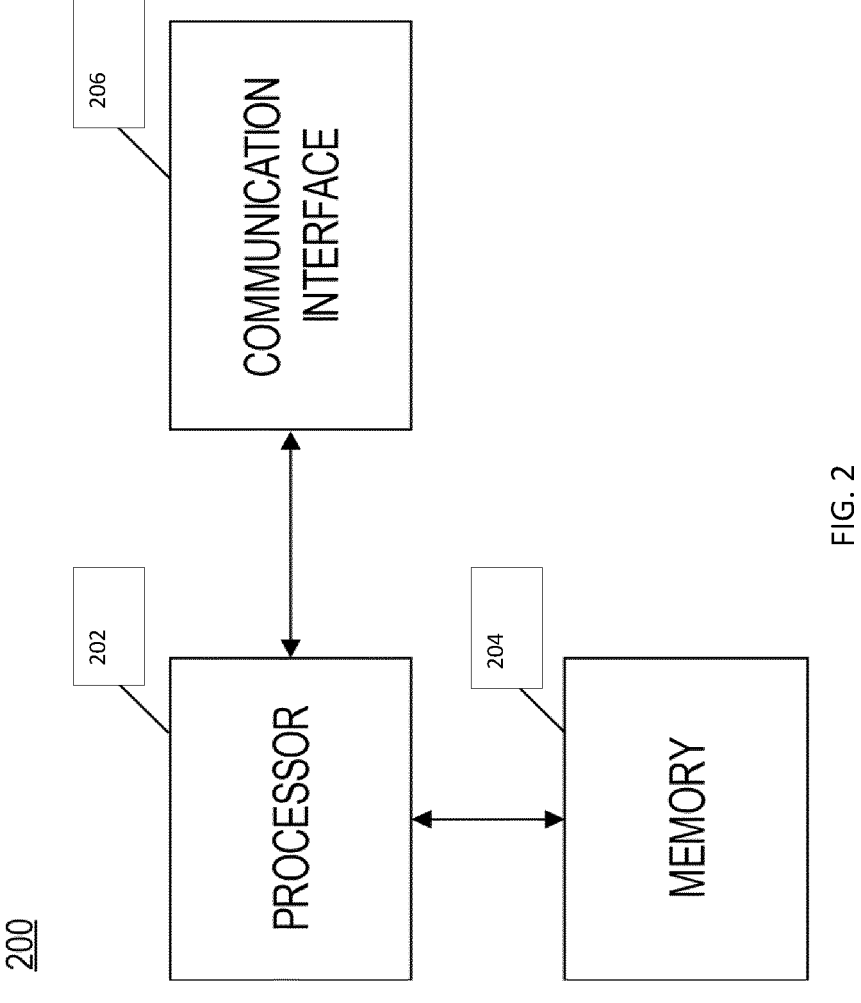
Figure 3:
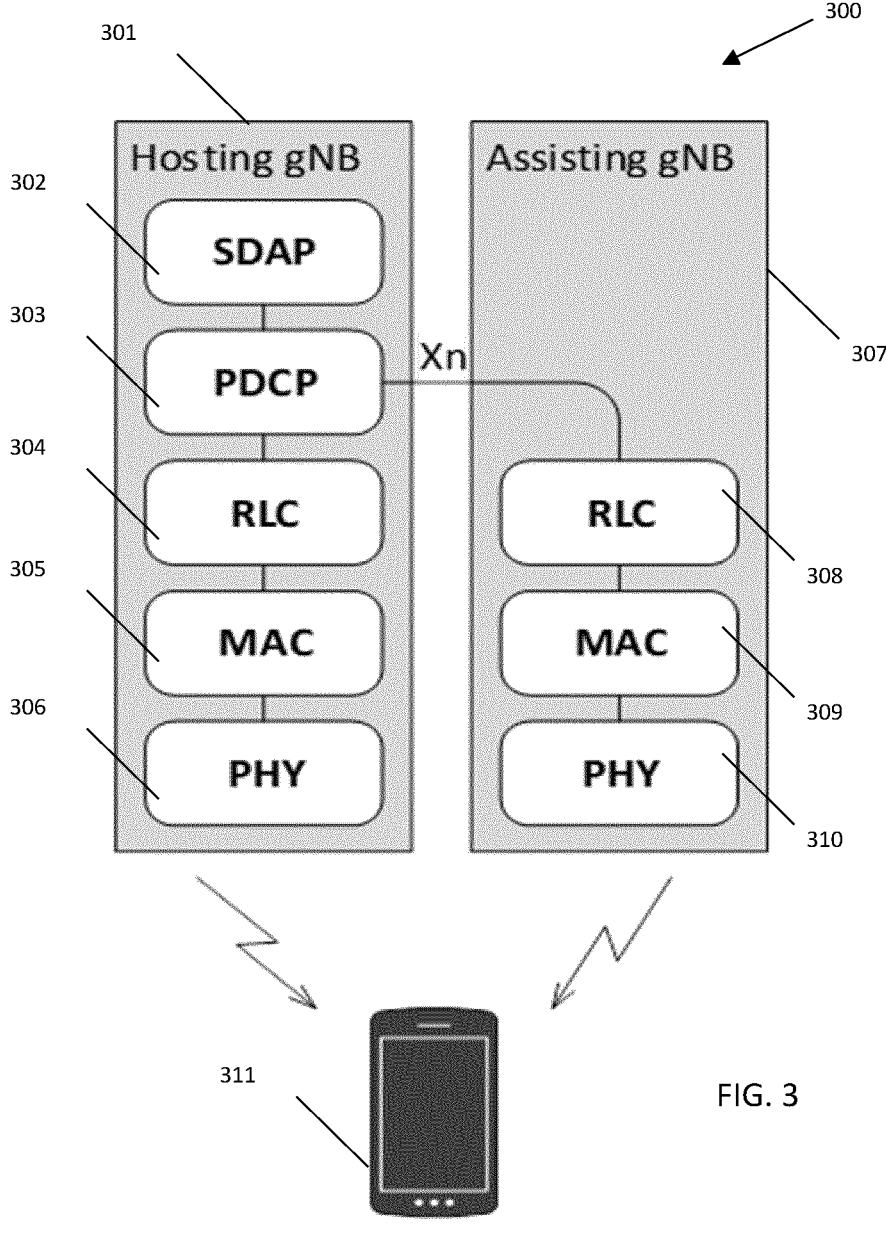
Figure 4:
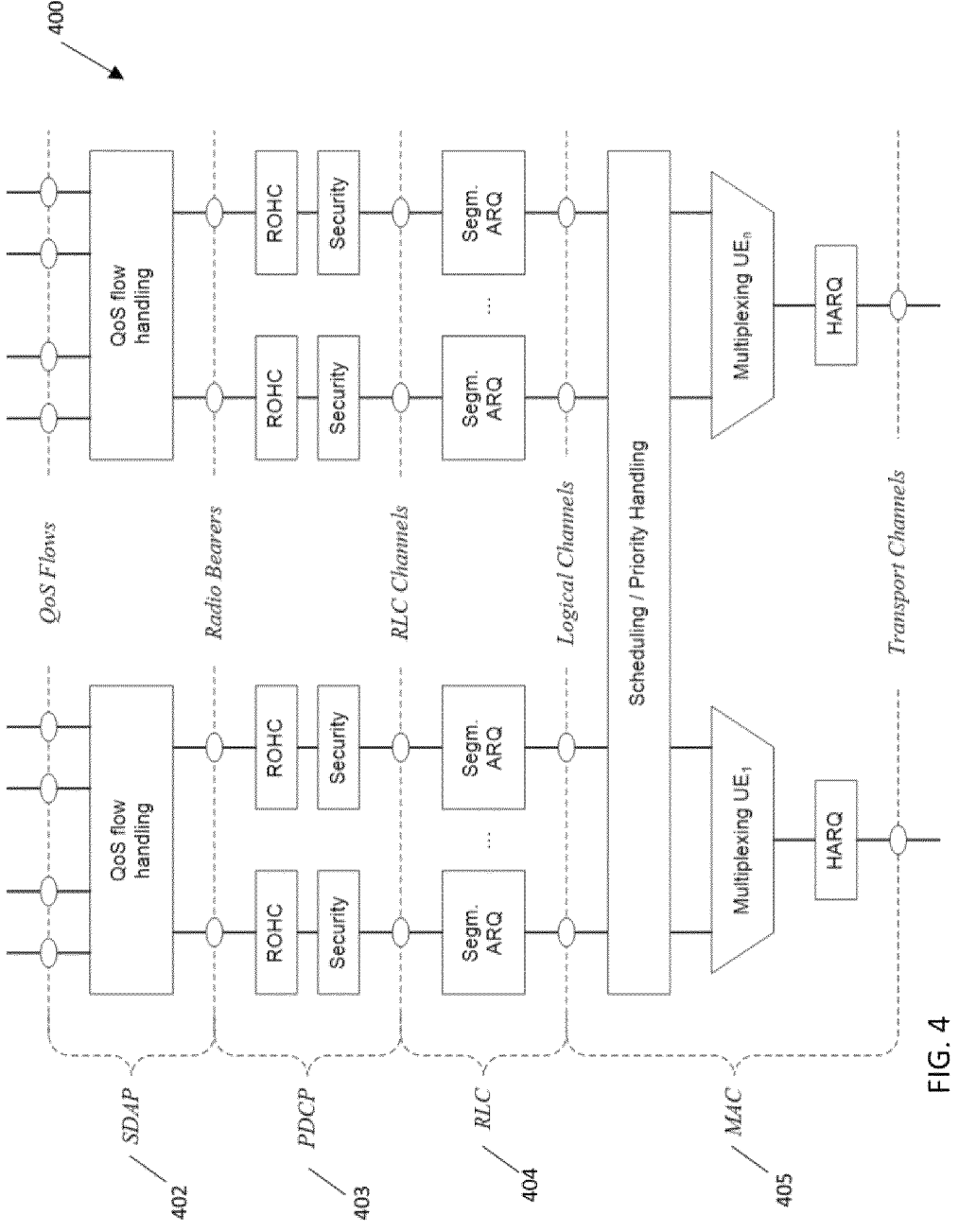
Figure 5:
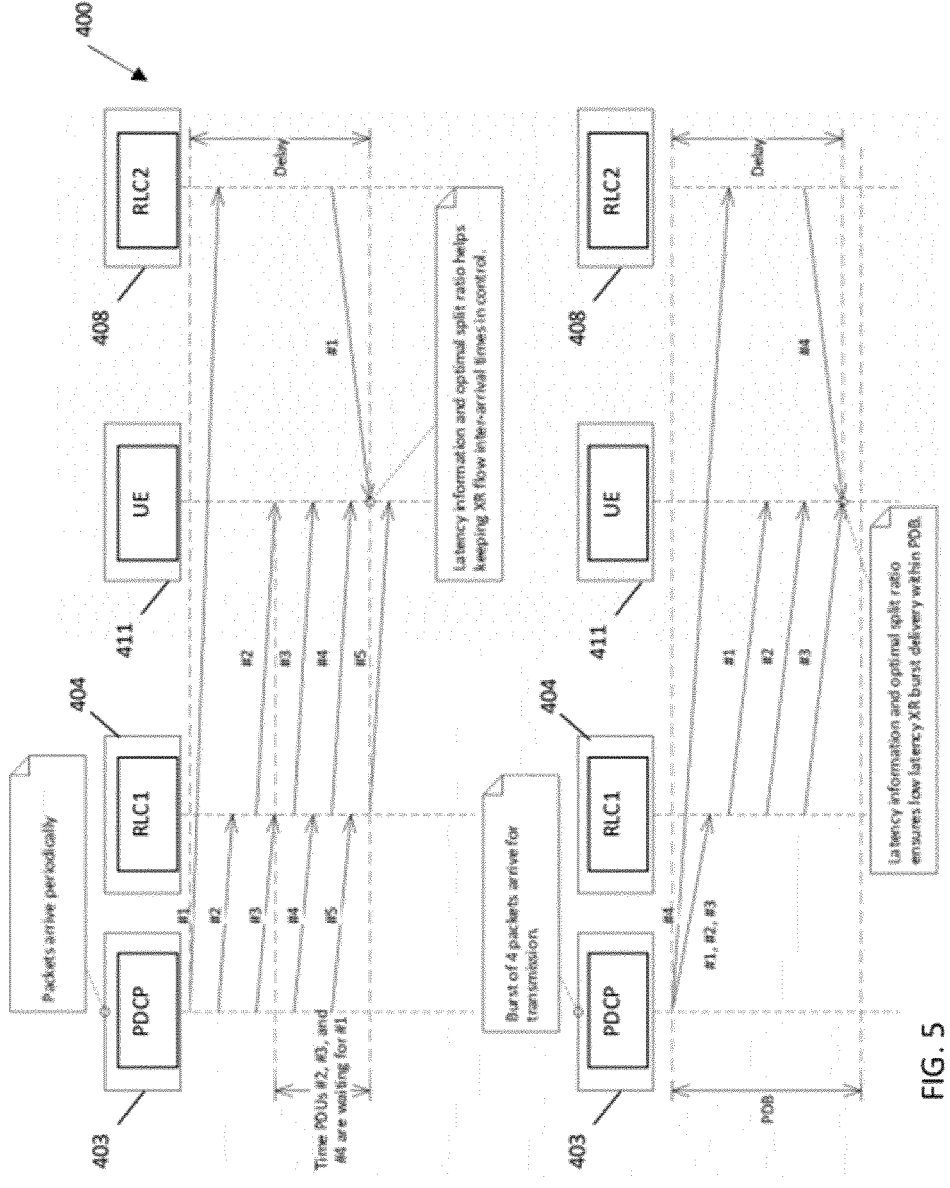
Figure 6:
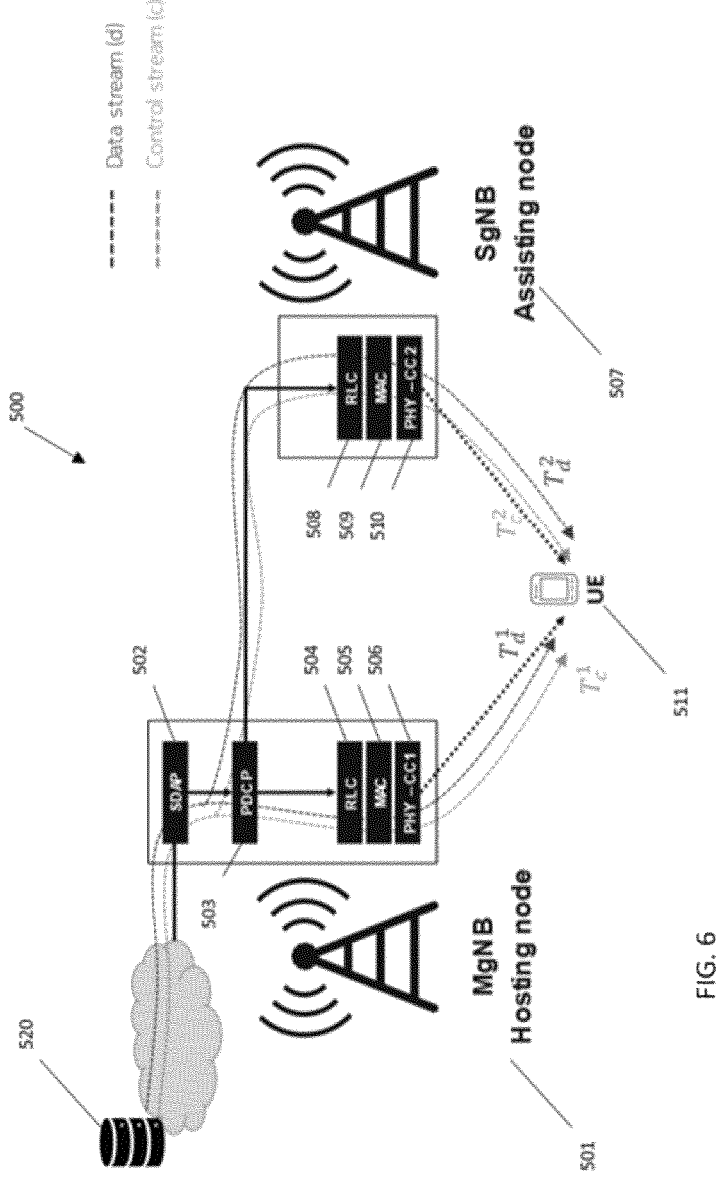
Figure 7:
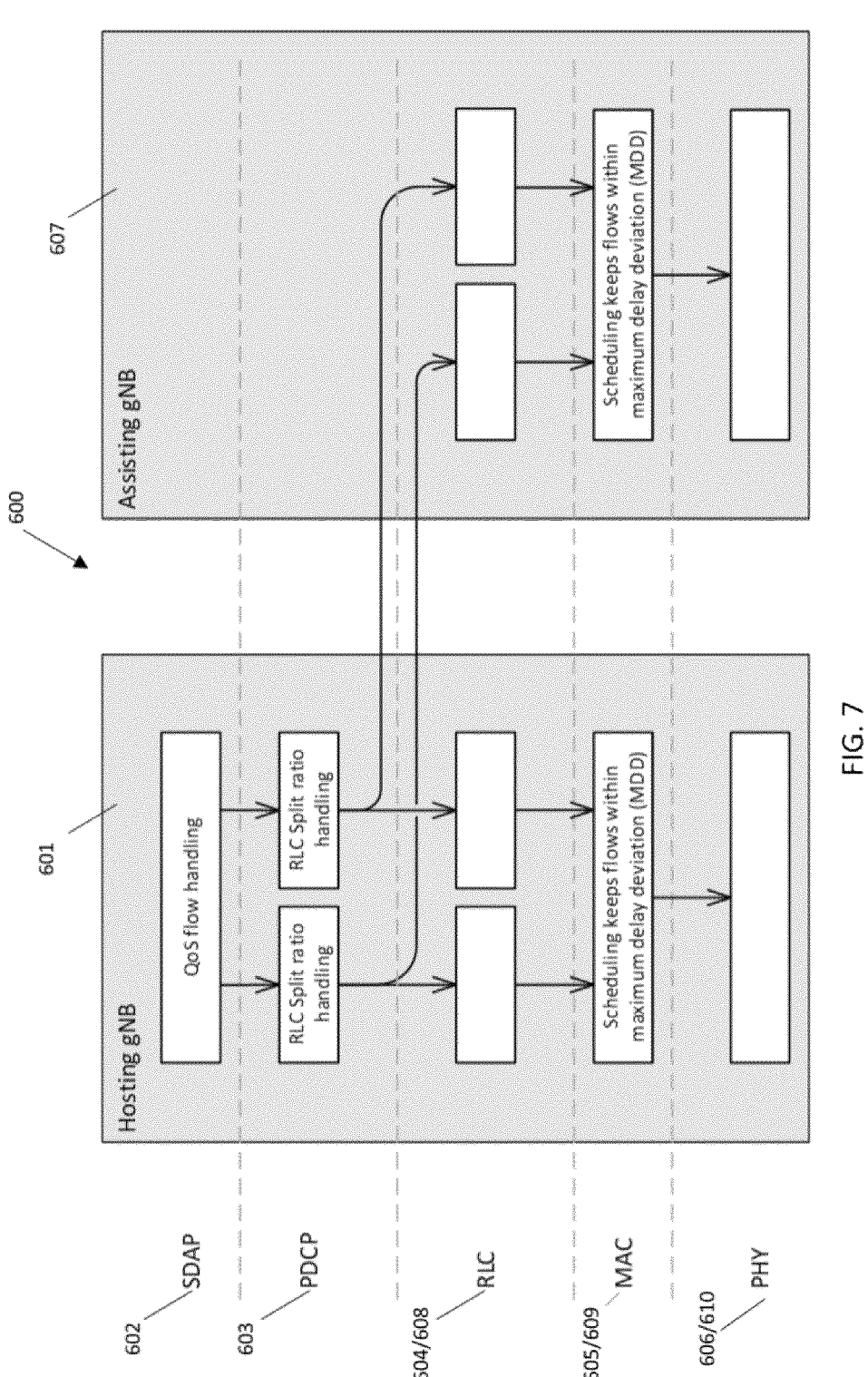
Figure 8:
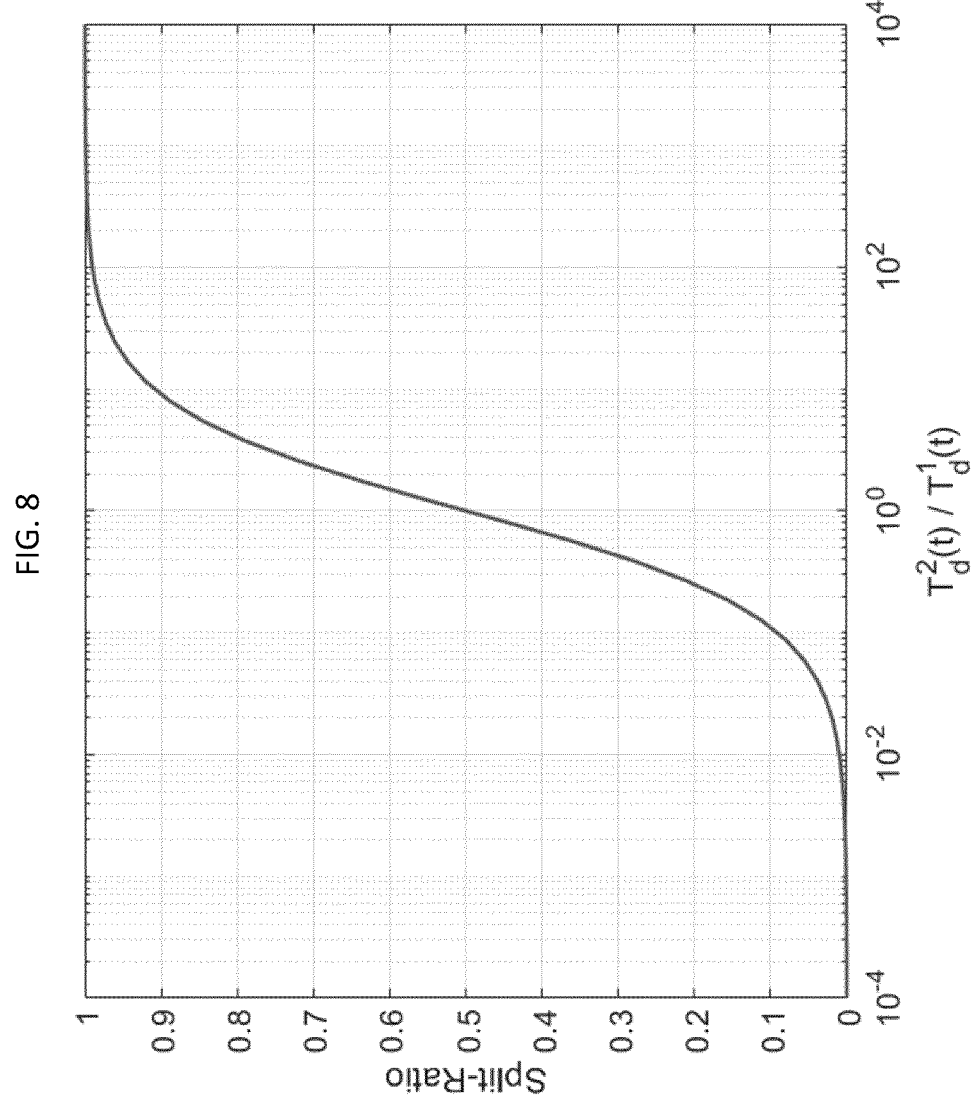
Figure 9:
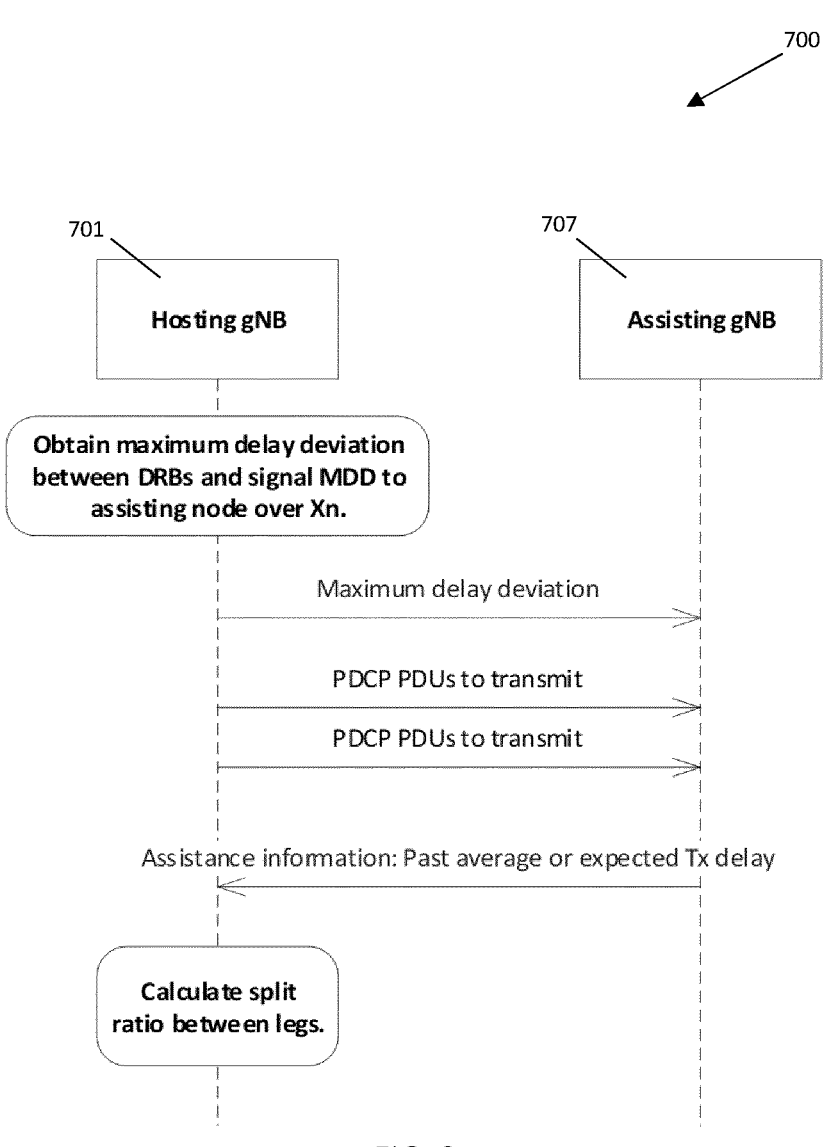
Figure 10:
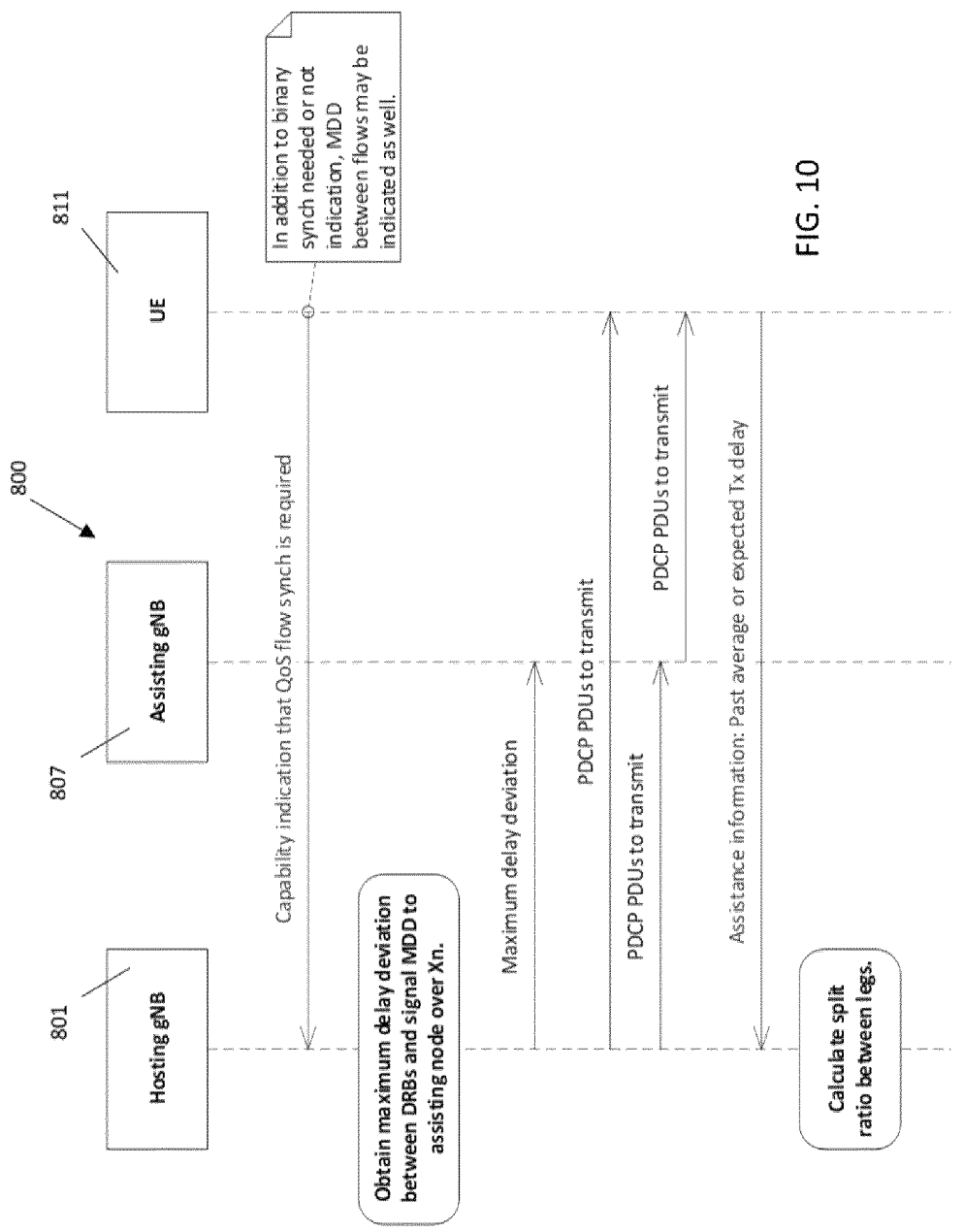
Figure 11:
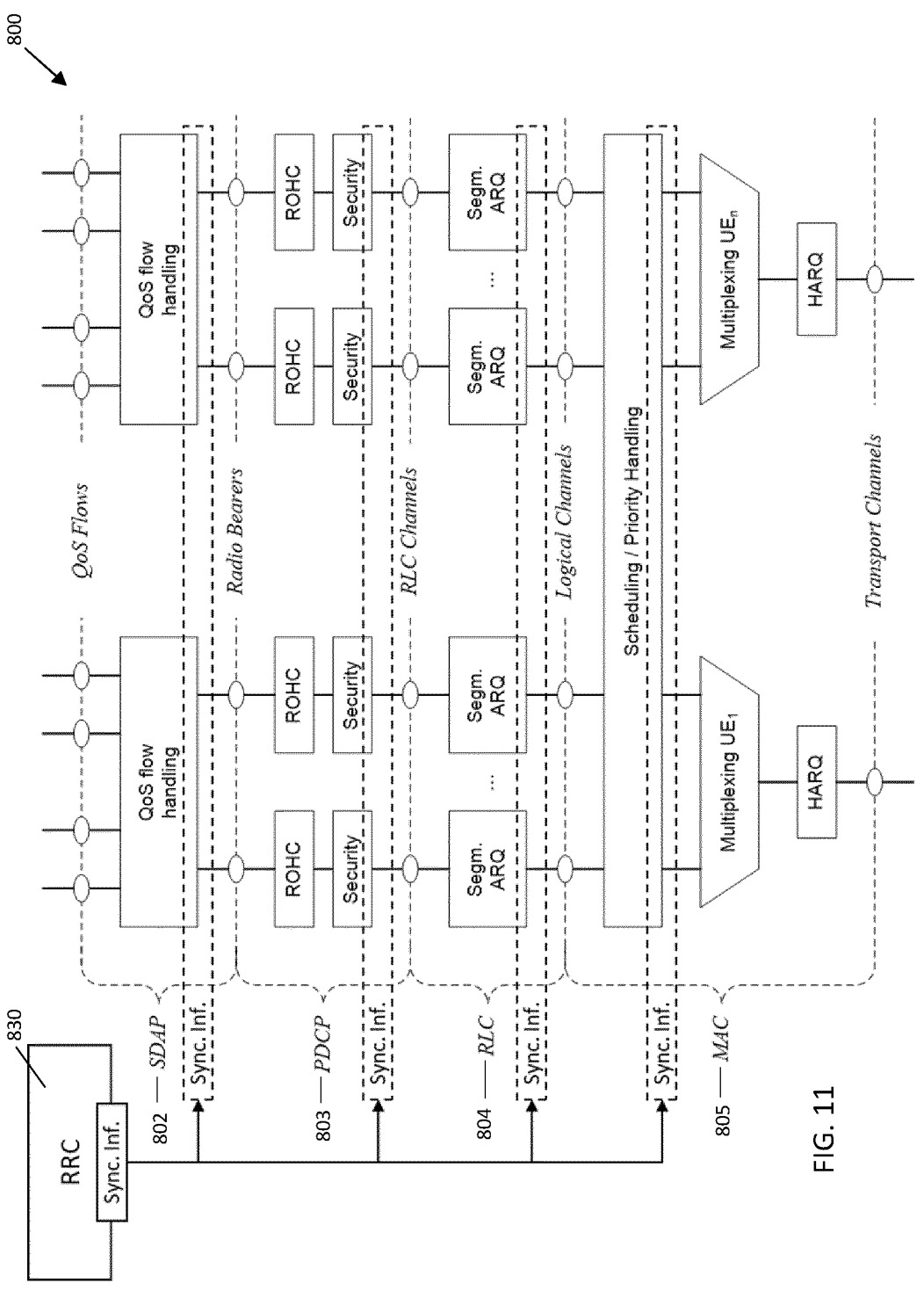
Figure 12:
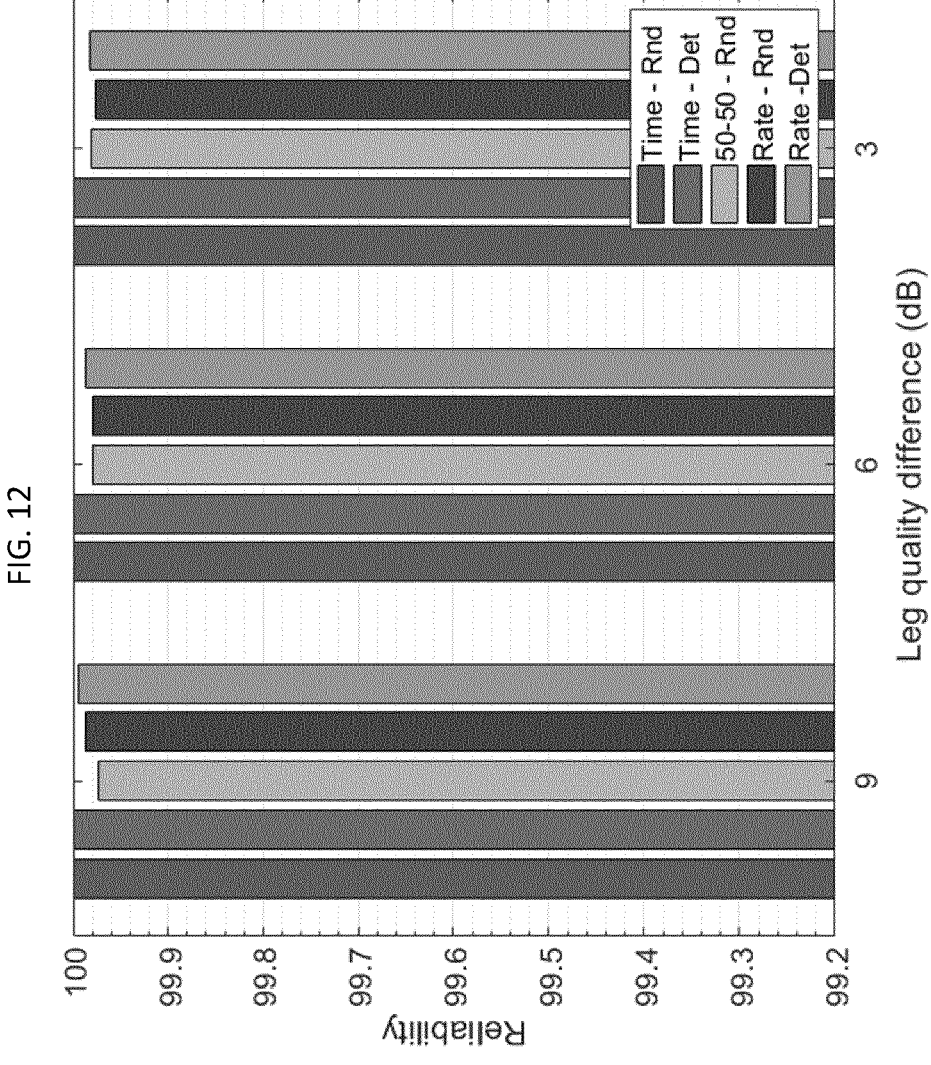
Figure 13:
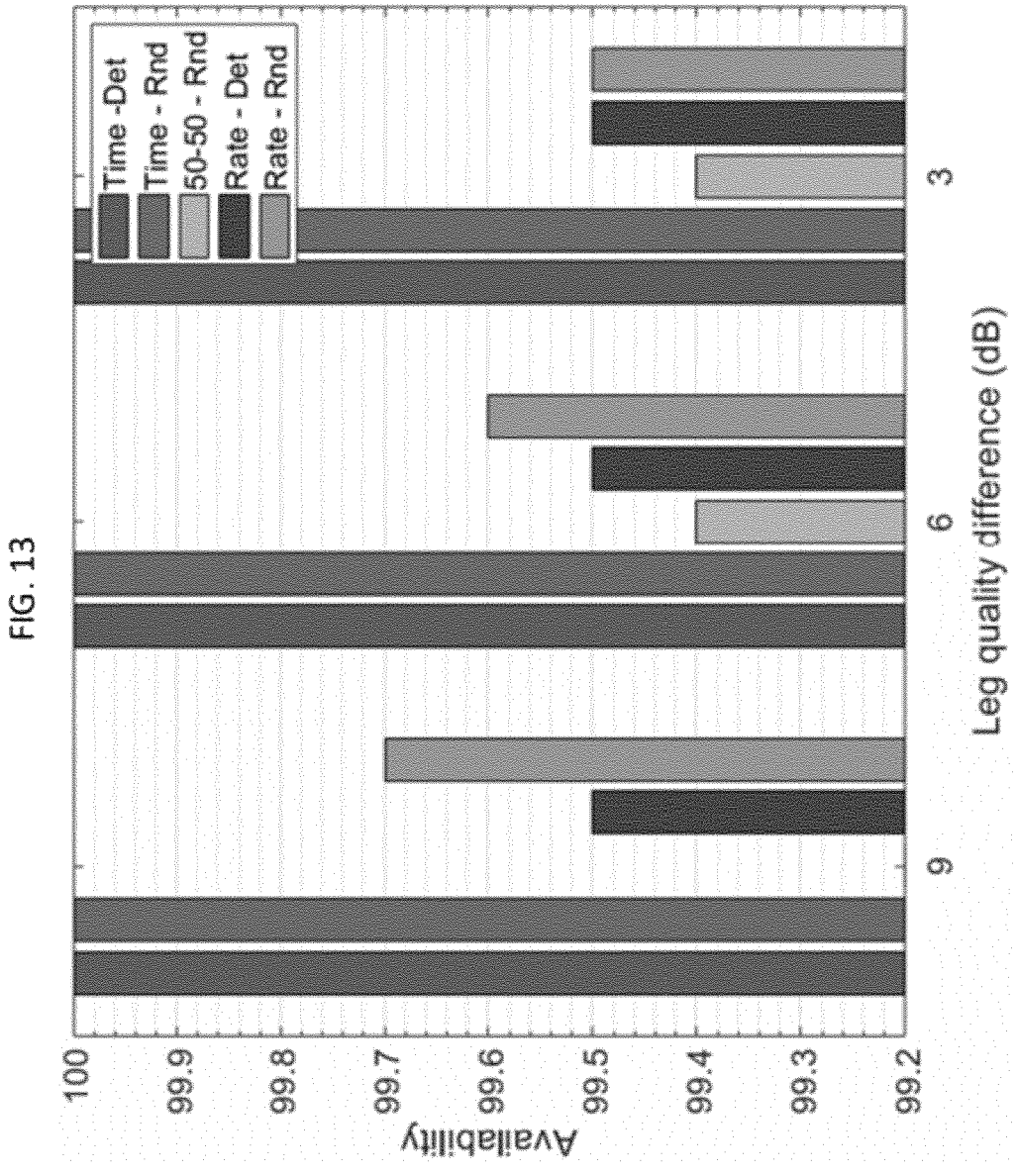
Figure 20:
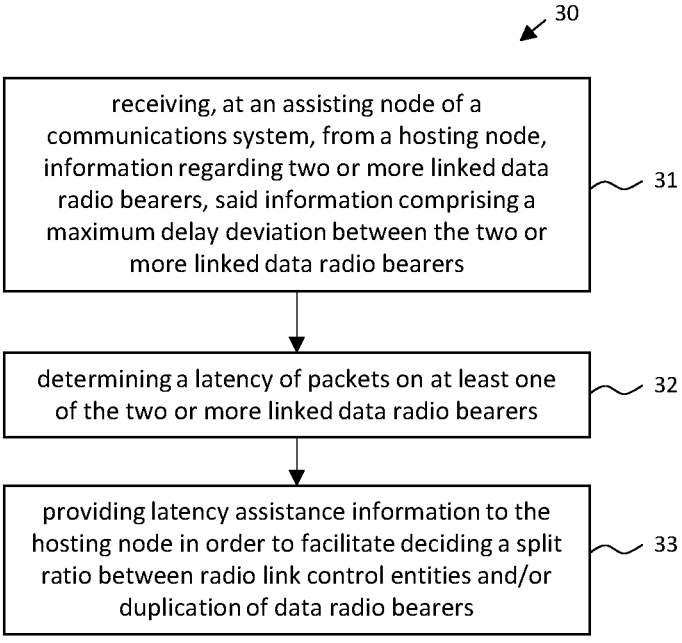
Figure 24:
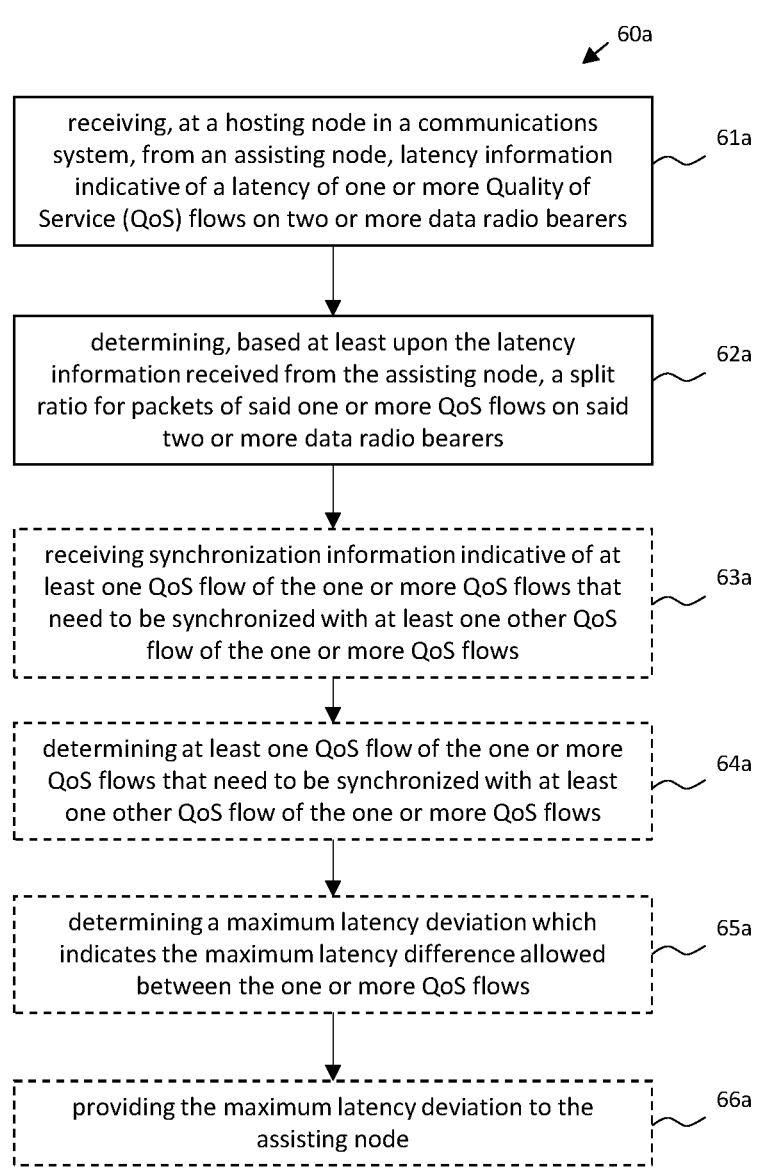
Figure 26:
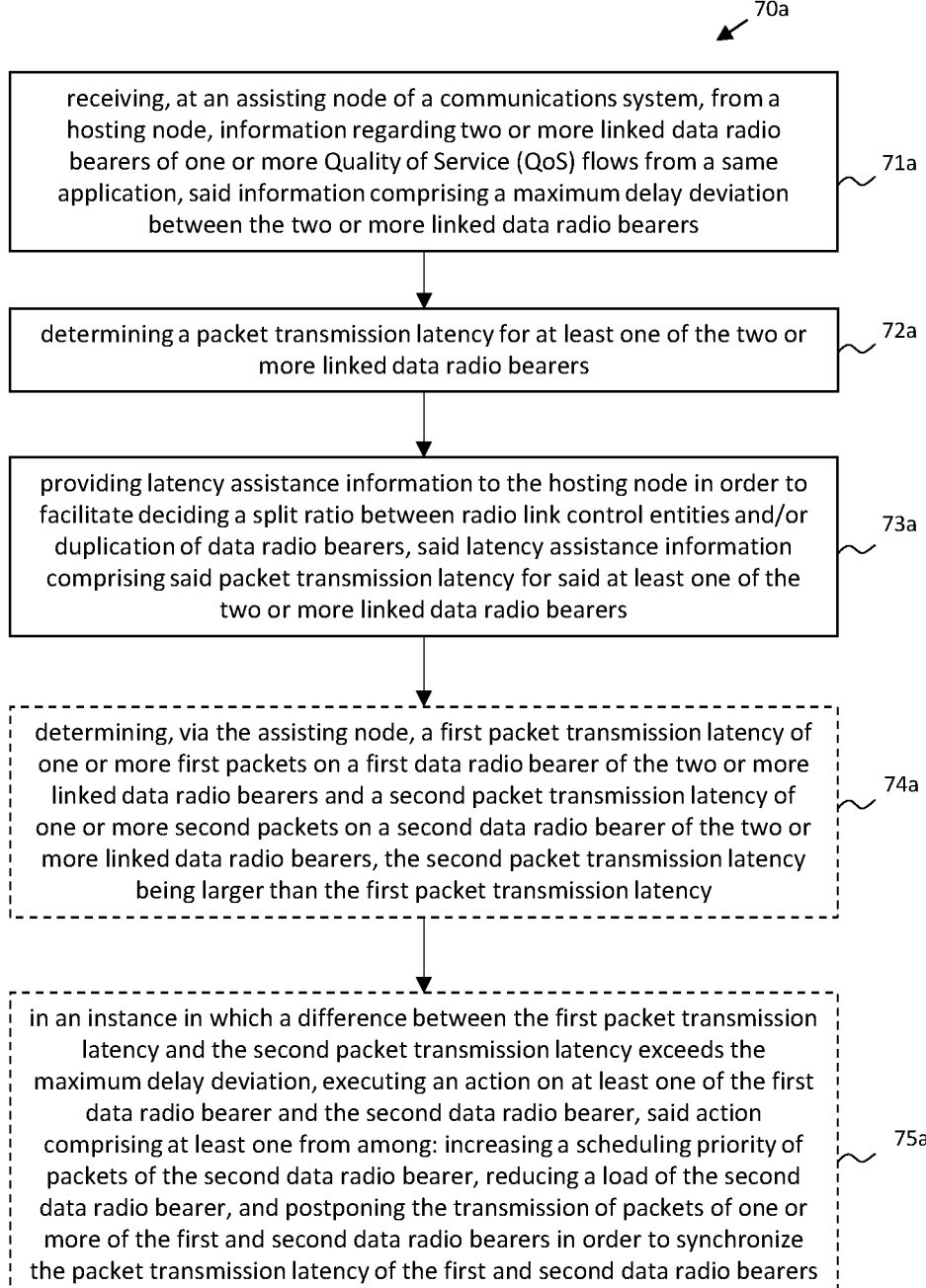
Figure 29:
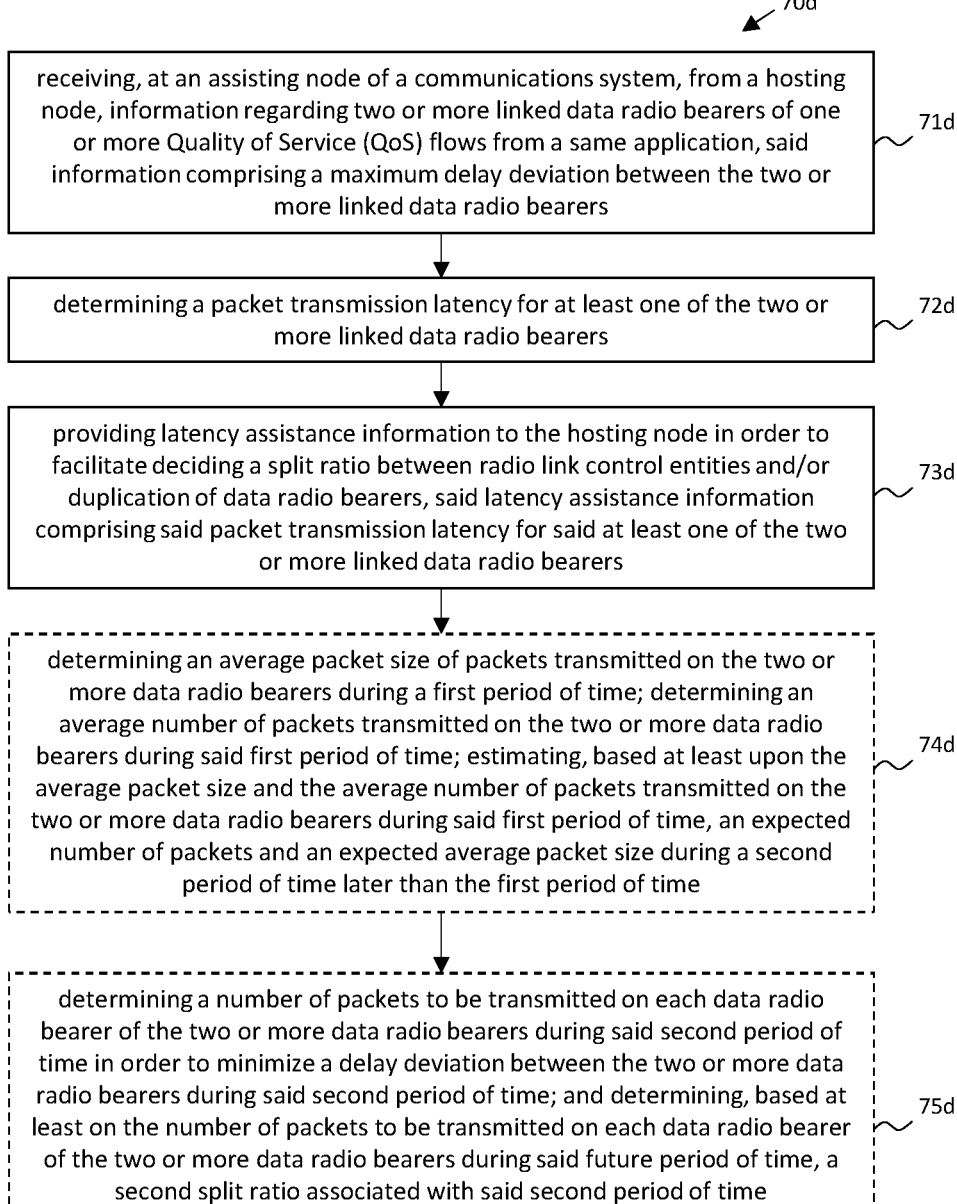

Having thus described certain example embodiments of the present disclosure in general terms, reference will hereinafter be made to the accompanying drawings, which are not necessarily drawn to scale, and wherein:

FIG. 1 is a block diagram of at least a portion of a communications system, in accordance with an example embodiment of the present disclosure;

FIG. 2 is a block diagram of an apparatus that may be specifically configured in accordance with an example embodiment of the present disclosure;

FIG. 3 is a block diagram of an apparatus that may be specifically configured in accordance with an example embodiment of the present disclosure;

FIG. 4 is an example of a downlink protocol stack for 5G-NR;

FIG. 5 is a block diagram of an example communication system and data flows therein, in accordance with an example embodiment of the present disclosure;

FIG. 6 is an illustration of an example communication system and data flows therein, in accordance with an example embodiment of the present disclosure;

FIG. 7 is a messaging flow chart illustrating data flows between entities of an example communication system, in accordance with an example embodiment of the present disclosure;

FIG. 8 is a graph illustrating a ratio of packets to be sent on a second leg as a function of the ratio between the transmission time of a first leg and the second leg, in accordance with an example embodiment of the present disclosure;

FIG. 9 is a flow chart illustrating messaging between a Hosting a New Radio (NR) NodeB (gNB) and an Assisting gNB to signal a maximum delay deviation for two or more flows, in accordance with an example embodiment of the present disclosure;

FIG. 10 is a flow chart illustrating messaging between a Hosting gNB, an Assisting gNB, and user equipment to signal a maximum delay deviation and Quality of Service (QoS) requirements for two or more flows, in accordance with an example embodiment of the present disclosure;

FIG. 11 illustrates an example of assistance information communicated by user equipment during an RRC connection setup procedure and used by the RRC to coordinate decisions of dataplane layers related to DRBs linked to an XR/CG session, in accordance with an example embodiment of the present disclosure;

FIG. 12 is a graphical representation a reliability metric relative to leg quality difference as a fraction of packets received within a deadline, in accordance with example embodiments of the present disclosure;

FIG. 13 is a graphical representation of an availability metric relative to leg quality difference as a number of batches received within a deadline, in accordance with example embodiments of the present disclosure;

FIG. 14 is a flow diagram of an example method in accordance with an example embodiment of the present disclosure;

FIG. 15 is a flow diagram of an example method in accordance with an example embodiment of the present disclosure;

FIG. 16 is a flow diagram of an example method in accordance with an example embodiment of the present disclosure;

FIG. 17 is a flow diagram of an example method in accordance with an example embodiment of the present disclosure;

FIG. 18 is a flow diagram of an example method in accordance with an example embodiment of the present disclosure;

Figure 19:
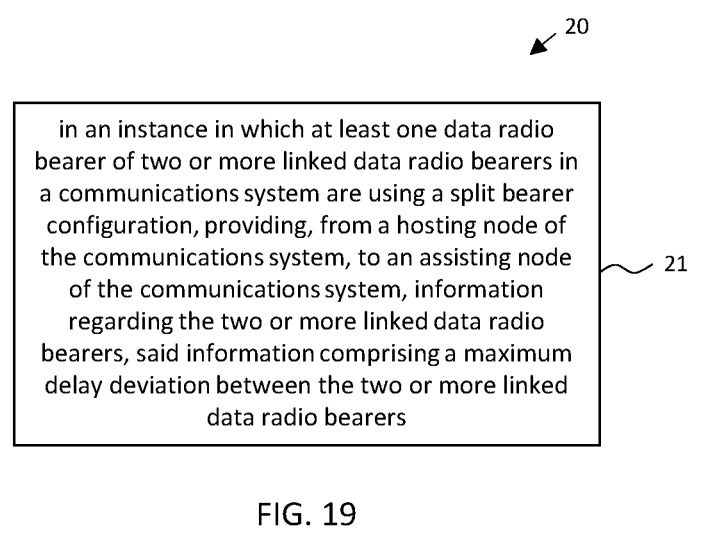

FIG. 19 is a flow diagram of an example method in accordance with an example embodiment of the present disclosure;

FIG. 20 is a flow diagram of an example method in accordance with an example embodiment of the present disclosure;

FIG. 21 is a flow diagram of an example method in accordance with an example embodiment of the present disclosure;

FIG. 22 is a flow diagram of an example method in accordance with an example embodiment of the present disclosure;

FIG. 23 is a flow diagram of an example method in accordance with an example embodiment of the present disclosure;

FIG. 24 is a flow diagram of an example method in accordance with an example embodiment of the present disclosure;

FIG. 25 is a flow diagram of an example method in accordance with an example embodiment of the present disclosure;

FIG. 26 is a flow diagram of an example method in accordance with an example embodiment of the present disclosure;

FIG. 27 is a flow diagram of an example method in accordance with an example embodiment of the present disclosure;

FIG. 28 is a flow diagram of an example method in accordance with an example embodiment of the present disclosure; and FIG. 29 is a flow diagram of an example method in accordance with an example embodiment of the present disclosure.

Throughout the drawings, the same or similar reference numerals represent the same or similar element.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the network device. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the network device on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), head-mounted device (HMD), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a network device via which services can be provided to a terminal device in a communication network. The network device may comprise any suitable device via which a terminal device or UE can access the communication network. Examples of the network devices include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "cell" refers to an area covered and served by a network device in which the network device can provide services. One network device may serve one or more cells. Difference cells may or may not use the same frequency resources such as sub-carriers.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, any described device, pathway, leg, bearer, flow, packet, information element, header, message, signal, transmission, route, node, network entity, network, or the like may be interchangeably described herein in the singular or in the plural, and neither should be construed to limit the scope to only the singular or only the plural. As such, unless expressly stated otherwise, instances of, for example, "a data radio bearer" should be taken to mean both a single data radio bearer and one or more data radio bearers. In addition, instances of "a quality of service flow" should be taken to mean both a single quality of service flow and one or more quality of service flows. Additionally, instances of "a pathway or leg" should be taken to mean both a single pathway or leg and one or more pathways or legs. Further, instances of "a packet" should be taken to mean both a single packet and one or more packets.

Described herein are methods, apparatuses, and computer program products related to communications systems, including but not limited to the 5G communications systems illustrated in FIGS. 1 and 2.

FIG. 1 depicts an example of a portion of a 5G wireless network 100 deployed in accordance with some example embodiments. The 5G wireless network 100 may include a user equipment 102 configured to be wirelessly coupled to a radio access network (RAN) (also called a core network) being served by a wireless access point, such as a gNodeB 110, which may comprise a base station, a wireless local area network access point, a home base station, and/or other types of wireless access points. The user equipment 102 may comprise a Subscriber ID (such as a UICC, SIM, or USIM) which may store information elements related to a mobile subscriber.

The network 100 may include the core network, which may include a core access and mobility management function (AMF) 104. The user equipment 102 may be coupled to the AMF 104 in addition to or instead of the gNodeB 110. The AMF 104 may be used for various network tasks such as registration management, connection management, reachability management, mobility management, and/or other various functions relating to security and access management and authorization. The network 100 and/or core network may further include a session management function (SMF) 106, and various other functions (such as a policy control function, PCF, a network slice selection function, NSSF, an authentication server function, AUSF, a unified data function, UDM, a network exposure function, NEF, a network repository function, NRF, and/or an application function, AF) 108. The network 100 may further comprise a user plane function (UPF) 112 connected to a data network (DN) 114. In some embodiments, the network 100 may comprise a standalone non-public network (SNPN), a public land mobile network (PLMN), and/or the like.

In some embodiments, the network 100 may include devices having functions supporting a home public land mobile network (HPLMN) and corresponding functions for "home" wireless local area network (WLAN) access, offloading, and/or non-3GPP access. These devices may include a UDM module, a unified data repository, an over-the-air function (OTAF) module, and/or other features such as a home session management function (SMF), a home policy control function (PCF), a home network slice selection function (NSSF), an authentication server function (AUSF), an application function (AF), a home user plane function (H-UPF), and a data network (DN).

In the depicted embodiment of FIG. 1, the OTAF, UDR, and/or UDM may be configured within the network 100 to be a standalone network function comprising an integrated secure packet library and to provide configuration service logic and one or more application programming interfaces (APIs). The UDM module and the OTAF module may be configured to access and/or communicate with each other via a NOTAF API. In this regard, the UDM module may access a secure packet library of the over-the-air function module via one or more commands associated with the NOTAF API.

One example of an apparatus 200 that may be configured to function as and/or be embodied by the UE 102, AMF 104, SMF 106, gNodeB 110, UPF 112, DN 114, or other network functions 108 such as the NSSF, AUSF, UDM, NEF, NRF, PCF, AF and/or the like is depicted in FIG. 2. As shown in FIG. 2, the apparatus 200 includes, is associated with or is in communication with processing circuitry 22, a memory 24 and a communication interface 26.

Illustrated in FIG. 2 is one possible example of an apparatus 200 for carrying out the methods, processes, and approaches described herein. It will be appreciated that the apparatus 200 is provided as an example of one embodiment and should not be construed to narrow the scope or spirit of the invention in any way. In this regard, the scope of the disclosure encompasses many potential embodiments in addition to those illustrated and described herein. As such, while FIG. 2 illustrates one example of a configuration of an apparatus for adaptive paging of multi-SIM devices in a wireless communication system, such as a 5G system, other configurations may also be used to implement certain embodiments of the present disclosure.

The apparatus 200 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In some example embodiments, the apparatus 200 is embodied as a mobile computing device, such as mobile telephones, mobile computers, personal digital assistants (PDAs), pagers, laptop computers, desktop computers, gaming devices, televisions, e-papers, and other types of electronic systems, which may employ various embodiments of the invention.

The apparatus 200 can comprise a processor 22, e.g., processing circuitry, and storage or a memory device 24, such as a non-volatile memory and/or volatile memory. In some embodiments, the processor 22 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 22 comprises a plurality of processors. These signals sent and received by the processor 22 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, fifth-generation (5G), Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of oper- ating in accordance with 2.5G wireless communication protocols General Packet Radio Service (GPRS), Enhanced Data GSM Environment (EDGE), and/or the like. Further, for example, the mobile terminal may be capable of oper- ating in accordance with 3G wireless communication pro- tocols such as Universal Mobile Telecommunications Sys- tem (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accor- dance with 3.9G wireless communication protocols such as Long Term Evolution (LTE) or Evolved Universal Terres- trial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from an embodi- ment of this invention, as should dual or higher mode phones (e.g., digital/analog or TDMA/CDMA/analog phones). Additionally, the apparatus 200 or a component thereof may be capable of operating according to Wi-Fi or Worldwide Interoperability for Microwave Access (WiMAX) protocols.

It is understood that the processor 22 may comprise circuitry for implementing audio/video and logic functions of the apparatus 200. For example, the processor 22 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC), an internal data modem (DM), and/or the like. Further, the processor may comprise functionality to operate one or more software programs, which may be stored in memory. For example, the processor 22 may be capable of operating a connectivity program, such as a web browser. The con- nectivity program may allow the apparatus 200 to transmit and receive web content, such as location-based content, according to a protocol, such as Wireless Application Pro- tocol (WAP), hypertext transfer protocol (HTTP), and/or the like. The apparatus 200 may be capable of using a Trans- mission Control Protocol/Internet Protocol (TCP/IP) to transmit and receive web content across the internet or other networks.

The apparatus 200 may comprise memory 24, such as the non-volatile memory and/or the volatile memory, such as RAM, read only memory (ROM), non-volatile RAM (NVRAM), a subscriber identity module (SIM), a removable user identity module (R-UIM), and/or the like. In addition to the memory, the apparatus 200 may comprise other remov- able and/or fixed memory. In some embodiments, the vola- tile memory may include Random Access Memory (RAM) including dynamic and/or static RAM, on-chip or off-chip cache memory, and/or the like. In some embodiments, the non-volatile memory, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like the volatile memory, the non-volatile memory may include a cache area for tempo- rary storage of data. The memory 24 may store one or more software programs, instructions, pieces of information, data, and/or the like which may be used by the mobile terminal for performing functions of the mobile terminal. For example, the memories may comprise an identifier, such as an inter- national mobile equipment identification (IMEI) code, capable of uniquely identifying the apparatus 200.

The apparatus 200 may also comprise a communication interface 26 including, for example, an earphone, speaker, a ringer, a microphone, a user display, a user input interface, and/or the like, which may be operationally coupled to the processor 22. In this regard, the processor 22 may comprise user interface circuitry configured to control at least some functions of one or more elements of the user interface, such as, for example, the speaker, the ringer, the microphone, the display, and/or the like. The processor 22 and/or user inter- face circuitry comprising the processor 22 may be config- ured to control one or more functions of one or more elements of the user interface through computer program instructions (e.g., software and/or firmware) stored on a memory 24 accessible to the processor 22 (e.g., non-volatile memory, volatile memory, and/or the like). Although not shown, the apparatus 200 may comprise a battery for pow- ering various circuits related to the apparatus 200, for example, a circuit to provide mechanical vibration as a detectable output. The apparatus 200 can further comprise a display. In some embodiments, the display may be of any type appropriate for the electronic device in question with some examples including a plasma display panel (PDP), a liquid crystal display (LCD), a light-emitting diode (LED), an organic light-emitting diode display (OLED), a projector, a holographic display, or the like. The user interface 26 may comprise devices allowing the apparatus 200 to receive data, such as a keypad, a touch display (e.g., some example embodiments wherein the display is configured as a touch display), a joystick (not shown), and/or other input device. In embodiments including a keypad, the keypad may com- prise numeric (0-9) and related keys (#, *), and/or other keys for operating the apparatus 100.

In some embodiments, the communication interface 26 may be embodied as any device or means embodied in circuitry, hardware, a computer program product comprising computer readable program instructions stored on a com- puter readable medium (e.g., the memory 24) and executed by a processing device (e.g., the processor 22), or a com- bination thereof that is configured to receive and/or transmit data from/to another computing device. In some example embodiments, the communication interface 26 is at least partially embodied as or otherwise controlled by the pro- cessor 22. In this regard, the communication interface 26 may be in communication with the processor 22, such as via a bus. The communication interface 26 may include, for example, an antenna, a transmitter, a receiver, a transceiver and/or supporting hardware or software for enabling com- munications with one or more remote computing devices. In embodiments wherein the apparatus 200 is embodied as an apparatus 200, the communication interface 26 may be embodied as or comprise the transmitter and the receiver. The communication interface 26 may be configured to receive and/or transmit data using any protocol that may be used for communications between computing devices. In this regard, the communication interface 26 may be config- ured to receive and/or transmit data using any protocol that may be used for transmission of data over a wireless network, wireline network, some combination thereof, or the like by which the apparatus 200 and one or more computing devices may be in communication. As an example, the communication interface 26 may be configured to receive and/or otherwise access content (e.g., web page content, streaming media content, and/or the like) over a network from a server or other content source. The communication interface 26 may additionally be in communication with the memory 24 and/or the processor 22, such as via a bus.

Returning to FIG. 2, in an example embodiment, the apparatus 200 includes various means for performing the various functions herein described. These means may comprise one or more of the processor 22, the memory 24, and the communication interface 26. The means of the apparatus 200 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium 24 that is executable by a suitably configured processing device (e.g., the processor 22), or some combination thereof.

In some example embodiments, one or more of the means illustrated in FIG. 2 may be embodied as a chip or chip set. In other words, the apparatus 200 may comprise one or more physical packages (e.g., chips) including materials, components and/or wires on a structural assembly (e.g., a base-board). The structural assembly may provide physical strength, conservation of size, and/or limitation of electrical interaction for component circuitry included thereon. In this regard, the processor 22, the memory 24, and/or the communication interface 26 may be embodied as a chip or chip set. The apparatus 200 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein.

The processor 22 may be embodied as various means, such as circuitry, hardware, a computer program product comprising computer readable program instructions stored on a computer readable medium (e.g., the memory 24) and executed by a processing device (e.g., the processor 22), or some combination thereof and, in some embodiments, is embodied as or otherwise controlled by the processor 22. The processor 22 may further be in communication with one or more of the memory 24, or communication interface 26, such as via a bus.

The processor 22 may be configured to receive a user input from the communication interface 26, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the processor 22 may determine an element/instruction/command that corresponds with a key, or image, displayed on the touch display user interface at the determined position or within a predefined proximity (e.g., within a predefined tolerance range) of the determined position. The processor 22 may be further configured to perform a function or action related to the key corresponding to the element/instruction/command determined by the processor 22 based on the position of the touch or other user input.

In an embodiment in which the apparatus 200 is a mobile device, such as a smartphone, the apparatus 200 can be configured to be operably coupled (e.g., wirelessly coupled) to a network, such as the network 100. The apparatus 200 can comprise means, such as the processor 22 and computer-readable instructions stored on the memory 24, for carrying out one or more of the methods, protocols, approaches, or processes described herein. In some embodiments, the apparatus 200 can comprise a mobile device, such as a smart-phone or the like, e.g., configured to be operably coupled (e.g., wirelessly coupled) to a network, such as the network 100. In some embodiments, the apparatus 200 can comprise means, such as the processor 22 and computer-readable instructions stored on the memory 24, for operably communicating with the network 100 or the like. In some embodiments, the apparatus 200 can further comprise means, such as the processor 22 or a transmitter-transponder or the like, for transmitting messages, signals, data streams, control streams, or the like between one or more network entities and/or user equipment.

In an embodiment in which the apparatus 200 is a network entity, such as the AMF 104, SMF 106, gNB 110, and/or the like of said network 100, the apparatus 200 can be config-ured to be operably coupled (e.g., wirelessly coupled) to a user device, such as a mobile phone. The apparatus 200 can comprise means, such as the processor 22 and computer-readable instructions stored on the memory 24, for sending and/or receiving messages, signals, data streams, control streams, or the like between one or more network entities and/or user equipment. In some embodiments, means can comprise at least one processor and at least one memory including computer program code with the at least one memory and the computer program code configured to, with the at least one processor, cause the apparatus to carry out a method or portions thereof, such as described herein.

In some embodiments, computer-readable instructions can comprise a computer program product comprising a non-transitory computer readable storage medium having program code portions stored thereon, with the program code portions configured, upon execution, to carry out any of the methods or approaches described herein.

As described, 5G communication systems may aim to support Ultra-Reliable Low-Latency Communication (URLLC). To provide such URLLC services, in 5G com-munication systems, end to end (E2E) stringent QoS requirements include very low latency and very high reli-ability. This poses some challenges to the 5G System as several factors could affect the E2E QoS performance such as wireless coverage, 3GPP network node (User Plane Function (UPF)/Radio Access Network (RAN)/User Equip-ment (UE)) resources, and the transport network. In order to achieve requirements of URLLC services, solutions for the specific UE with URLLC services to improve the monitor-ing of the QoS, such as packet delay, jitter and packet error rate, and identify the relevant Network Functions (NFs) and entities that need to be developed. In addition, techniques to better control the monitoring of the QoS for URLLC, e.g., techniques for determining whether or not to trigger the above solution(s), need to be developed.

Various applications, such as eXtended Reality (XR) and Cloud Gaming (CG) applications, may be enabled or enhanced due to the low latency packet error rates achiev-able within the proposed 5G systems and core networks. However, XR and CG applications often require various network characteristics, such as a maximum allowed end-to-end latency of about 5 ms for up to between 0.1-10 Gbit/s service bit rate with a reliability requirement of about 99.99%.

By way of example only, such uses of low latency network configurations and protocols may include "Fovial 360 streaming" that likely involves having different priorities for different data requests and transmissions. For example, center FOV image high quality tiles could have a higher priority and a higher reliability than edge or low quality 360 tiles. Another example may include directional surround sound. Another example may include flawless center field-of-view (FOV) video, which may be more important than flawless surround sound if, e.g., a scheduler has to prioritize transmissions. For example, in many applications, data and control streams may have different reliabilities, different data rates, and/or different latency requirements. In some embodiments, such streams should be synchronized to at least a certain extent and/or to the extent possible.

In some examples, applications, such as XR applications or the like, typically use one or more data and control streams. In some embodiments, such control streams may typically have much lower data rate requirements, but tighter latency and reliability requirements, than data streams. As such, as noted above, such streams may be synchronized to a certain extent.

In some instances, the QoS for different data streams, control streams, and/or types of data/control streams, e.g., for an AR/VR stream, may be differentiated and/or synchronized. For example, for a single application, different QoS flows may be created for different traffic streams based on different view port identifications. In some examples, one QoS flow may be created for traffic streams, but view port identification may be provided as part of Packet Detection Rules (PDRs) to the User Plane Function (UPF). Then, in some examples, the UPF may use this view port information in the PDRs to mark the traffic accordingly in the General Packet Radio Services (GPRS) Tunneling Protocol User Plane (GTP-U) header or the like. In some embodiments, a Service Data Adaptation Protocol (SDAP) may map different streams to different Data Radio Bearers (DRBs). In some embodiments, a protocol described herein for mapping different streams to different DRBs may include new mechanisms for the SDAP to further guide the Packet Data Convergence Protocol (PDCP) on dual connectivity (DC) decisions, e.g., indicating which DRBs are transmitted or operated via which nodes, and usage of DRB split and/or duplication processes. In some examples, the SDAP mapping of different streams to different DRBs may further guide a Medium Access Control (MAC) QoS-aware scheduler to take synchronization requirements between DRBs into account. In some examples, such as in a case of DC, e.g., using two separate MACs, with data-split, some new "QoS parameter translations" may be provided to guide each of the MAC-schedulers.

For example, different flows may have different 5G QoS Identifiers (5QI) values that define QoS characteristics (defined below) for that flow. According to some embodiments, new QoS parameter translations may comprise, e.g., information about which 5QIs should be synchronized for certain UE. According to some alternative embodiments, new 5QI values may be defined that are specified to be synchronized with some other 5QI(s). In some embodiments, new 5QI(s) may have, e.g., different priority level or packet error rate requirements than 5QI(s) to which they are to be synchronized. Additionally, in some embodiments, information about maximum delay deviation (MDD) may be specified for 5QI(s) that are to be synchronized. In some embodiments, by having, providing, receiving, and/or using information such as that described herein (e.g., 5Q is or new 5QI translations), a MAC scheduler may avoid exceeding MDD for flows that have different QoS characteristics.

Currently QoS parameters are defined in 3GPP TS 23.501 roughly as follows:

5QI is a scalar that is used as a reference to 5G QoS characteristics. Such characteristics are:

Resource type (Guaranteed Bit Rate (GBR), Delay critical GBR, or Non-GBR)

Priority level

Packet delay budget

Packet error rate

Averaging window (for both GBR types only)

Maximum data burst volume (for Delay Critical GBR only)

In some embodiments, information such as an Allocation and Retention Priority (ARP) may define the relative importance of a QoS Flow. In some embodiments, the range of the ARP priority level is 1 to 15 with 1 as the highest level of priority. In some embodiments, the QoS parameter ARP contains information about the priority level, the pre-emption capability and the pre-emption vulnerability. In some embodiments, this may allow for deciding whether a QoS Flow establishment/modification/handover may be accepted or needs to be rejected in the case of resource limitations (typically used for admission control of GBR traffic). In some embodiments, the ARP may also be used to decide which existing QoS Flow to pre-empt during resource limitations, i.e. which QoS Flow to release to free up resources.

In some embodiments, the Reflective QoS Attribute (RQA) is an optional parameter which indicates that certain traffic (not necessarily all) carried on this QoS Flow is subject to Reflective QoS. In some embodiments, the Reflective QoS may enable the UE to map uplink (UL) User Plane traffic to QoS Flows without the session management function (SMF) providing QoS rules and may allow the UE or SMF to apply for IP PDU Sessions and/or Ethernet PDU Sessions. In some embodiments, this may be achieved by creating UE derived QoS rules in the UE based on the received DL traffic.

In some examples, synchronization in a Radio Access Network (RAN) for applications such as XR may present particular difficulties with regard to synchronization and optimization of QoS and/or QoE across traffic streams and data/control flows. In some examples, a user equipment (UE) may be configured for DC, which may lead to questions regarding how to control which streams are sent from which network nodes. Likewise, issues may arise with regard to whether streams are split or duplicated at PDCP. In some embodiments, e.g., when a communications system is provided that has a central unit (CU)/distributed unit (DU) network architecture, enhancements over the current 3GPP protocol may be provided for E1/F1 interfaces. For instance, according to the current 3GPP New Radio (NR) standard, the PDCP protocol may decide if a DRB is sent via one node, or in case of DC, using, e.g., a data-split or data duplication approach. In some examples, e.g., in DC scenarios, the DRB identity may be unique within the scope of the UE. For example, in some embodiments, a Master Cell Group (MCG) DRB typically cannot use the same value as a split DRB. In some examples, a split DRB may use the same identity for the MCG and Secondary Cell Group (SCG) parts of the configuration. By way of example only, a PDCP- Config information element (IE) may contain more information or instructions related to DRB splitting and/or duplication. In some examples, duplicating (or data splitting) may be enabled at a Radio Resource Controller (RRC) and/or by using a MAC control element (e.g., for controlling DRBs at a MAC).

For instance, an example of a split DRB 300 is illustrated in FIG. 3. As illustrated in FIG. 3, the split DRB 300 may comprise a hosting gNB 301 comprising a SDAP 302, a PDCP 303, a first RLC 304, a first MAC 305, and a first physical layer (PHY) 306. In some embodiments, the assisting gNB 307 may comprise a second RLC 308, a second MAC 309, and a second PHY 310. As such, in some embodiments, both the MCG and SCG may comprise an RLC entity. In some embodiments, the hosting gNB 301 may be in communication with a user equipment (UE) 311. In some embodiments, the hosting gNB 301 may be in communication with the assisting gNB 307. In some embodiments, the PDCP 303 of the hosting gNB 301 may be in communication with the second RLC 308, e.g., via an air interface (Xn). In some embodiments, one or both of the hosting gNB 301 and the assisting gNB 307 may be in communication with the user equipment 311. In some embodiments, in order to meet the latency and synchronizations targets of high volume XR and Cloud gaming traffic, the PDCP 303 split bearer may be needed to ensure enough bandwidth for all users.

As mentioned above, many applications, such as the XR applications discussed herein, may have multiple data streams (e.g., such as data and control streams) that are mapped to multiple QoS flows to satisfy their different QoS requirements. In some example applications, multiple data streams may be mapped to multiple QoS flows, the control flow may have a lower data rate, tighter latency requirements, and/or a lower Packet Error Rate (PER) requirement. In some example applications, different types of foveal image tiles or directional sound streams may have separate QoS flows. For example, tiles in the central/near, mid and far peripheral field of view of the user may have different bitrate requirements and/or different packet error rate requirements given their importance for the final rendered image. In some embodiments, the delivery times of different streams may be synchronized to a certain extent in order to maintain a Quality of Experience (QoE) for such applications, such as above a QoE above a QoE threshold. In some embodiments, such as for online game streaming applications over 5G-NR, different streams may be synchronized by reducing or minimizing a difference between latencies of the different streams. For example, in some examples, packets of video and audio streams may be delivered to the application within the same deadline to avoid jitter between video and audio that affect user QoE. Similarly, tiles of a 3D video stream carried in separate QoS flows need to be delivered within the same deadline, since the rendering function needs all tiles to proceed with its execution.

Typically, the SDAP 302 may map different QoS flows to different DRBs, however, the PDCP layer 303 (handling split bearer) and the MAC layer 305 (scheduling data to physical resources from multiple DRBs) may not be able to ensure that data from different bearers are transmitted in a fully synchronized manner. As such, if one DRB cannot reach its QoS requirements, then other linked DRBs (including data from the same application) may become obsolete.

Additionally, in instances in which the gNB/DRB is/are configured for dual connectivity (DC), possible delay differences between multiple legs may affect the end-to-end latency. For example, path with higher delay (greater latency) may become a bottleneck for reordering by the PDCP 303. Additionally, in instances of bursty traffic, minimizing the transmission latency of the whole burst may call for improved mechanisms to reach optimal split ratio of packets between RLC entities 304, 308 (e.g., as legs).

Referring now to FIG. 4, a 3GPP NR user plane protocol stack 400 is illustrated. An SDAP 402 may be configured or responsible for, among other things, mapping QoS flows to DRBs and marking a QoS Flow ID and/or a QoS which applies to the packet in the packet header. Additionally or alternatively, the SDAP 402 may be configured or responsible for determining which packets are available at the radio buffers for scheduling as well as it sets the QoS parameters visible to the MAC scheduler. Additionally or alternatively, the SDAP 402 may be configured or responsible for determining queue management by enforcing QoS/QoE policies, e.g., traffic shaping of lower priority traffic to allow that the traffic of high priority applications with higher demand are delivered faster to lower layers (QoS/QoE management).

In some embodiments, a PDCP layer 403 may be configured or responsible for, among other things, deciding whether a DRB is sent via one node, or in case of DC, using data-split or data duplication. In some embodiments, in an instance in the case of DC, the DRB identity may be unique within the scope of the UE. In some embodiments, an MCG DRB may not use the same DRB identity value as a split DRB. However, in some embodiments, a split DRB may use the same DRB identity value for the MCG and SCG parts of the configuration. In some embodiments, a PDCP-Config information element (IE) may comprise information related to split DRB and duplication. In some embodiments, duplication and/or data splitting may be enabled or controlled at/by the radio resource controller (RRC). In some embodiments, duplication and/or data splitting may be enabled or controlled, for DRBs controlled at the MAC 405, at/by means of a MAC control element.

Referring now to FIG. 5, a New Radio (NR) user plane protocol stack is illustrated in which an SDAP can be configured for mapping QoS flow(s) to DRBs. In some examples, to do so, the SDAP may include one or more QoS Flow IDs and one or more minimum or expected QoS values for that packet into a packet header for the packets of data being transmitted as part of a flow. In some embodiments, the SDAP may be configured to determine which packets are available at the radio buffers for scheduling, and/or may set the QoS parameters visible to the MAC scheduler. In some embodiments, the SDAP may determine queue management by enforcing QoS/QoE policies including traffic shaping of lower priority traffic, e.g., to ensure that the traffic of high priority applications with higher demand are delivered faster to lower layers (QoS/QoE management). In some embodiments, a PDCP layer 403 may be configured to decide if a DRB is sent via one node, or in case of DC, whether the DRB is using data-split or data duplication. In the case of DC, the DRB identity may be unique within the scope of the UE, e.g., an MCG DRB typically will not use the same value as a split DRB while the same identity will be used for a split DRB for the MCG and SCG parts of the configuration.

In some embodiments, a PDCP-Config information element (IE) may contain more information related to split DRB and duplication. In some embodiments, duplication (or data splitting) may be enabled at the RRC. In some embodiments, for DRBs controlled at MAC, duplication (or data splitting) may be enabled by means of a MAC control element.

As illustrated in FIG. 5, one or more first packets or messages may be transmitted from the first gNB (PDCP 403)

to RLC1 404 and from the RLC1 404 to the UE 411 while one or more second packets or messages may be transmitted from the first gNB (PDCP 403) to the RLC2 408 of the second gNB and then from the RLC2 408 to the UE 411. The duration of time between the PDCP 403 of the first gNB and the UE 411 may be described in some embodiments as the packet transmittance latency or latency of a pathway. In some embodiments, the difference between the latency for the one or more first packets or messages on a first pathway or leg, the one or more second packets or messages on a second pathway or leg, and other packets or messages on other pathways or legs may illustrate a maximum delay between the various pathways (e.g., MCG and SCG). In some embodiments, one or more network nodes may dictate a maximum delay such that the UE 411 does not receive a data stream and then have to cache or self-delay the utilization or processing of that data stream while waiting for the control stream, for instance. One approach is to delay packets or messages transmitted via a faster leg or pathway (often the MCG route) such that packets transmitted via the pathway with a higher latency (often the SCG route) arrive at about the same time as the last packet or message arriving via the faster leg or pathway. However, the strategy of delaying the packets received vie the faster leg or pathway introduces reordering and extra delay in the delivery process that hamper the performance of higher layer protocols. Likewise, the hosting gNB or assisting gNB may then need to determine an optimal split ratio between the MCG and SCG routes. In some embodiments, a MNC (MN/SN PDCP) may be used for a bearer if it supports both E-PDCP and NR-PDCP, however the SCG bearer may terminate at a SN node, such as a gNB. In some embodiments, since the MCG bearer may oftentimes be configured for E-PDCP or NR-PDCP, the MCG bearer may be a suitable bearer for a hosting gNB while the SCG bearer may be a suitable bearer for an assisting gNB; however, in some embodiments, the SCG bearer may be used for the hosting gNB and the MCG bearer may be used for the assisting gNB.

Referring now to FIG. 6, a system 500 is provided that is configured to reduce the maximum delay between two or more pathways or "legs." In some embodiments, the system 500 can be configured such that two or more DRBs (carrying data from an application such as an XR application; e.g., online game streaming) can be synchronized in order to maintain a desired QoE for an application with multiple QoS flows. In some embodiments, a single gNB (e.g., a MgNB hosting node 501) can be configured to synchronize two or more DRBs such that the delay difference/deviation between packets on different DRBs does not exceed a certain threshold. In some embodiments, if one or more QoS flows fail to meet the QoS requirements for each QoS flow, the single gNB may be configured to make other QoS flows obsolete (e.g., all other QoS flows of the same application fail as well).

In some embodiments, when multiple DRBs are using a split bearer (e.g., configured for a MCG split and/or a SCG split), the hosting node 501 that is hosting a PDCP entity may be configured to provide information about linked DRBs to assisting node. Said information may include maximum delay deviation between DRBs. In some embodiments, a SgNB assisting node 507 may be configured to handle DRBs as described above. In some embodiments, the SgNB assisting node 507 may be configured to provide latency assistance information to or for the MgNB Hosting node 501 node hosting the PDCP entity 503.

In some embodiments, maximum delay deviation and latency assistance information can be used by the MgNB Hosting node 501 or an entity thereof to determine an appropriate or optimized split-ratio between RLC 504, 508 entities and/or duplication of DRBs. For example, in some embodiments, the MgNB Hosting node 501 may determine that a DRB with very low delay budget and slow secondary legs should not be duplicated. Similarly, in some embodiments, threshold-based policies on the value of split-ratios can be used to enable/disable the split and the duplication of the DRB traffic.

In some embodiments, the UE 511 may be configured to receive the data stream and/or control stream from the MgNB Hosting node 501 and SgNB Assisting node 507, and to determine the latency of these various streams or QoS flows. In some embodiments, the UE 511 may be configured to generate and provide latency assistance information (e.g., as described above) to or for the MgNB Hosting node 501.

In some embodiments, the UE 511 may be configured for providing information to a gNB about the QoS flows that need to be synchronized. For example, a XR UE or online game streaming device (e.g., 511) may be configured to provide such information to the gNB. In some embodiments, the latency assistance information may be provided by the UE in any suitable manner, such as within UE capability information, more dynamically within other RRC messaging, or the like.

By way of example only, delay differences may affect delivery of periodical or bursty packets, as depicted in FIG. 6, by causing a first data stream $T^1_d$ and first control stream $T^1_c$ to arrive at the UE 511 before a second data stream $T^2_d$ and second control stream $T^2_c$. In such an instance, in some embodiments, the hosting PDCP entity 503 can be configured to, for each DRB, forward PDCP PDUs to the multiple RLC entities 504, 508 to indicate a certain split ratio (e.g., transmitting every $n^{th}$ packet over the RLC entity 508 that has higher latency). In some embodiments, the split ratio may be calculated in a way that causes the delay difference between consecutive packets to not exceed the desired maximum delay difference.

In some embodiments, the hosting PDCP entity 503 may take delay differences into account when deciding how many packets should be transmitted through each of the different RLC entities 504, 508. In some embodiments, if packets arrive in bursts, then the packets that have higher PDCP sequence number (SN) may be delivered over the leg that has a higher latency in order to reduce PDCP reordering delay at the receiver end (e.g., the UE 511). Without wishing to be bound by any particular theory, by sharing a burst of packets optimally between multiple RLC entities 504, 508, the aggregate latency of the whole burst may be minimized. In some embodiments, minimizing the overall latency of a burst in a manner that applies for the whole burst may optimize the packet delay budget (PDB) and/or satisfy QoS/QoE requirements more fully.

In some embodiments, delay differences may be obtained by an assisting node (e.g., SgNB Assisting node 507). In some embodiments, the SgNB Assisting node 507 may provide latency information for PDCP PDUs that are provided by the PDCP entity 503 of the MgNB Hosting node 503, e.g., over an Xn interface. In some embodiments, latency information may comprise an expected Xn delay, a queuing delay, a scheduling delay, and/or an over-the-air transmission delay. In some embodiments, the latency information for PDCP PDUs may comprise expected scheduling and over-the-air transmission delays and may be provided to the SgNB Assisting node 507 by the UE 511.

Referring now to FIG. 7, a system 600 is provided that has a proper system architecture and which is programmatically configured to avoid a relatively high delay deviation between transmission and delivery times (T) of multiple QoS flows (e.g., XR data and XR control streams) that may be transmitted through different DRBs as well as RLC entities 604, 608. In some embodiments, a Maximum Delay Deviation (MDD) may be obtained across different RLC channels 604, 608 and/or data or control streams/flows (e.g., XR data flows) that may have different QoS parameters.

Synchronization of Multiple DRBs

In some embodiments, the MDD between different DRBs may be valuable or critical information for MAC scheduling. As illustrated in FIG. 7, a MAC (e.g., 605, 608) may be configured to schedule packets from different DRBs such that the MDD between different DRBs is not exceeded. As illustrated, the split-ratio may be mapped against the latency for two different data streams via two different legs of a split DRB or two different DRBs. In some embodiments, higher layers may indicate that certain flows belong to the same DRB group. In case of transmitting packets of two or more DRBs through assisting node, the hosting node may signal the MDD between flows to the assisting node.

In some embodiments, the delay deviation between RLC entities may be helpful or necessary information for a PDCP entity when packets are being split between multiple RLC entities. In some embodiments, the assisting node may signal delay for its legs in such an instance in which the latency of packets transmitted via the assisting node is greater than the latency of packets transmitted via the hosting node. In some embodiments, this imposed delay can be, e.g., determined based upon past average delay of packets, an estimated delay, or the like. In some embodiments, the delay may be estimated based on an expected Xn latency, a queuing delay, a scheduling delay, and/or an over-the-air transmission delay.

According to some embodiments, one or more methods can be provided for deciding the split-ratio of multiple DRBs associated with the same session where the goal for decision-making is to keep the multiple DRBs synchronized within a certain threshold. First, let X refer to a set of DRBs, $\mathcal{L}$ represent a set of legs, $T_d^i(t)$ refer to a transmission time of packets on DRB $d \in \mathcal{D}$ on leg $i \in \mathcal{L}$ during a generic decision time t. Given an amount of packets $B_d(t)$ expected in a certain time window t, the packet size $S_d$, and the transmission rate $R_d^i(t)$ at which this information is possibly served on a leg $i \in \mathcal{L}$, the transmission time can be computed as $$T_d^i(t) = \frac{B_d(t)S_d}{R_d^i(t)}.$$

In some embodiments, the Delay Deviation (DD) of two DRBs can be represented as $(k,h) \in \mathcal{D}^2$ on two legs $(i,j) \in \mathcal{L}^2$ as $\delta_{kh}^{ij}(t) = |T_k^i(t) - T_h^j(t)|$ and the Maximum Delay Deviation (MDD) can be represented as $$\delta(t) = \max_{(k,h) \in \mathcal{D}^2, (i,j) \in \mathcal{L}^2} \delta_{kh}^{ij}(t).$$

In some embodiments, synchronization of the flows associated with the DRBs of the same XR/CG session may comprise deciding the split-ratio across different legs so that the MDD is minimized. In some embodiments, to this end, for each DRB $k \in \mathcal{D}$ and each leg $i \in \mathcal{L}$, a real variable $X_{k,i} \in [0;1]$ can be defined. In some embodiments, a Split-Ratio Decision Problem (SRDP) can be formulated as follows:

$$\min \delta(t)$$

$$\delta_{kh}^{ij}(t) = |T_k^i(t) - T_h^i(t)| \forall (k, h) \in D^2, (i, j) \in L^2$$

$$\delta_{kh}^{ij}(t) \le \delta(t) \forall (k, h) \in D, (i, j) \in L^2$$

$$T_k^i(t) = \frac{B_k(t)S_k}{R_k^i(t)} X_{k,i} \forall k \in \mathcal{D}, i \in \mathcal{L}$$

$$\sum_{i \in L} X_{k,i} = 1 \forall k \in D$$

In some embodiments, the SRDP can be solved by the hosting node that is hosting the PDCP layer, at the beginning of every time window, for which a packet transmission length or a packet transmission duration has been opportunely configured (e.g., the period equivalent to the minimum arrival interval of packets across all DRBs of the same session). In some embodiments, the SRDP may be observed to be linear. Without wishing to be bound by any particular theory, SRDP may be linear according to some embodiments because constraints that define DD can be linearized using classical techniques and all other constraints may be linear. Therefore, in some embodiments, SRDP can be solved using algorithms like a simplex algorithm or an ellipsoid algorithm.

In some embodiments, in an instance in which there is only one DRB and two or more legs or pathways, the SRDP may admit, allow, or result in a closed form solution. According to some embodiments, one can define $T_d^1(t)$ and $T_d^2(t)$ as the transmission of time on the two legs. In some embodiments, the ratio of packets to be transmitted on the slowest leg can be computed as follows:

$$X = \frac{T_d^2(t)/T_d^1(t)}{1 + T_d^2(t)/T_d^1(t)} \tag{1}$$

FIG. 8 shows the ratio of packets to be send on leg 2 as a function of the ratio between the transmission time of the two legs $T_d^2(t)/T_d^1(t)$. In some embodiments, when one of the two legs is faster (e.g., much faster) than the other, the DRB packets may be transmitted on the faster leg to maintain the delay due to reordering at the minimum. In some embodiments, by transmitting more DRB packets via a much faster leg, the much faster leg may be overloaded, thereby causing a higher latency for packets transmitted via that leg and effectively synchronizing the two legs.

In some embodiments, the optimization of computed split ratios may or may not be achievable in practice due to the discrete nature of the burst size. In some embodiments, the minimum granularity may be the PDCP PDU since flow can be split only by forwarding the PDUs to different legs. Said otherwise, there is not an effective way in which to subdivide PDCP PDUs to achieve a more optimized split between two legs—therefore a decision will often need to be made as to whether to slightly overload the first leg or the second leg (e.g., by one packet or the like). As such, in some embodiments, a best approximation of the split ratio given a certain number of legs may by calculated rather than a true, fractional split.

In some embodiments, given a DRB d∈ $\mathcal{D}$ and a split-ratio X computed by solving SRDP, the set of activated legs may be defined as the subset of legs that are partially used, namely $\mathcal{L}_d=\{i\in \mathcal{L}: X_{d,i}>0\}$. In some embodiments, let $N_d=|L_d|$ be the size of this set (e.g., the number of active legs). In some embodiments, the approximation of the split ratio can be computed by solving the following equations for each DRB d∈ $\mathcal{D}$:

$$\min_{K_d\in\mathbb{N}^{N_d}}\left\|\frac{K_d}{B_d}-X\right\|_p$$

$$\sum_{i\in L_d}K_{k,i}=B_d$$

where $K_d$ is the vector of discrete decision variables that approximate the vector of real variables $X_d$. In some embodiments, the objective function may be to minimize a p-norm $\|.\|_p$ that intuitively measures the distance between the approximated and optimal split-ratios.

Assistance Information and MDD Signaling Over Xn

In some embodiments, since it is often desirable to synchronize flows, the gNB hosting the PDCP entity may be configured to maintain a delay between legs or DRBs via the hosting gNB and legs or DRBs via the assisting gNB in order to satisfy the maximum delay deviation threshold. In some embodiments, in an instance in which multiple DRBs are used, the hosting gNB may also indicate to the assisting gNB (or vice versa) which DRBs are linked together. In some embodiments, the assisting gNB may provide a statistical basis for calculating a suitable delay, e.g., based upon a past average or an expected transmission (Tx) delay, to the hosting gNB. In some embodiments, such statistical basis may be provided in the form of assistance information. In some embodiments, such assistance information may be used by the hosting gNB to calculate an optimal split ratio between RLC entities for each DRB. In some embodiments, MAC entities of both gNBs may be configured to take MDD into account when scheduling one or more DRBs.

Referring now to FIG. 9, an example process 700 is illustrated between a hosting gNB 701 and an assisting gNB 707 in which the hosting gNB 701 obtains a maximum delay deviation (MDD) between DRBs and signals the MDD to the assisting gNB 707, e.g., over an Xn interface. In some embodiments, the hosting gNB 701 may then decide or determine which and how many PDCP PDUs to transmit to the UE via the assisting gNB 707, and transmits these PDCP PDUs to the assisting gNB 707. In some embodiments, the assisting gNB 707 may then, at some future time, on some suitable interval, or at the request of the hosting gNB 701, calculate the statistical basis for the latency of PDCP PDUs transmitted via the assisting gNB 707, and provide updated assistance information, e.g., based upon a past average or expected transmission (Tx) delay data, to the hosting gNB 701. The hosting gNB 701 may then recalculate the split ratios between the different legs.

UE Assistance and Capability Signaling

In some embodiments, in order to recognize which QoS flows need such DRB synchronization at a RAN (gNB), UEs 811 (e.g., XR UEs or online game streaming UEs for example) may indicate in their capability signaling that their data streams need to be linked and time synchronized, as shown in FIG. 10. In some embodiments, this may allow the network to coordinate the resource allocation decisions of all QoS flows linked to the same UE application session (e.g., XR or CG session). In some embodiments, the UE 811 may be configured to transmit, to the hosting gNB 801 a capability indication regarding what QoS flow synchronization is required by the UE 811 based upon application-specific requirements. The hosting gNB 801 may then determine an initial maximum delay deviation (MDD) between linked DRBs and signal the MDD to the assisting node over the Xn interface. The hosting gNB 801 may then transmit a first set of PDCP PDUs directly to the UE 811 and a second set of PDCP PDUs to the assisting gNB 807, and the assisting gNB 807 may then transmit the second set of PDCP PDUs on to the UE 811 via the second leg. The UE 811 may then consider the synchronization of the first and second sets of PDCP PDUs received from, respectively, the hosting gNB 801 directly and by way of the assisting gNB 807. Synchronization may be considered by the UE 811 based upon, for instance, a past average or an expected/predicted transmission delay. In some embodiments, based at least upon the synchronization consideration by the UE 811, the UE 811 may then prepare and transmit assistance information to the hosting gNB 801. Based at least upon the assistance information provided by the UE 811, the hosting gNB 801 may then recalculate split ratio between legs and/or consider whether one or more of the sets of PDCP PDUs are obsolete based upon the QoS/QoE reported by the UE 811 and/or the packet transmission delay difference experienced by the first and second sets of PDCP PDUs transmitted on the first and second bearers.

In some embodiments, regardless of the different QoS requirements of different QoS flows to that particular UE 811, the hosting gNB 801 and/or assisting gNB 807 may be configured to ensure that all flows are nevertheless delivered within the maximum delay deviation (MDD) and/or if one QoS flow is failing to meet the delay requirements, that QoS flow becomes obsolete and other QoS flows become obsolete as well. For example, a scheduler in a gNB may decide to reduce the resources allocated to all DRBs linked to the same application session (e.g., CG/XR session) if the capacity is saturated instead of reducing proportionally the resources to all flows. To this end, the assistance information communicated by the UE 811, for example during the RRC connection setup procedure, may be used by the RRC 830 to coordinate the decisions of the data plane layers related to DRBs linked to the same application session (e.g., XR/CG session), as illustrated in FIG. 11. As illustrated in FIG. 11, Sync Inf may indicate the information shared across the layers related to the DRBs that is to be synchronized.

In addition to or alternative to assisting node assistance information, the UE 811 may be also the one reporting delay deviation between RLC entities in split bearer operation. For example, the UE 811 may be configured to report the delay differences between consecutive packets arriving through different RLCs (e.g., the RLC entity of the hosting gNB and the RLC entity of the assisting gNB, among others).

In some embodiments, the decision-making mechanisms described herein may be evaluated numerically to compute the optimal split-ratio based on the assistance information. In an example scenario, one UE is connected to a Hosting gNB (MgNB) and an Assisting gNB (SgNB) with 2 independent legs. Continuing with this example scenario, the latency of the Xn interface connecting MgNB and SgNB may be equal to about 2 ms, packets containing the tiles may have a size of about 1200 bytes, packets may have an interarrival time that is equal to about 0.2 ms, and packets may be split into batches of 10 packets that need to be delivered within a deadline of about 2.2 ms from the arrival of the first packet in the batch (e.g., before the next batch of packet arrives)—in such a scenario, the MDD may be calculated as being equal to about 2.2 ms. In some embodiments, the quality of the two legs may be randomly drawn from a uniform distribution within a range of about 3 dB. In this example scenario, a Link Adaptation (LA) algorithm for each leg may be used to select the highest Modulation and Coding Scheme (MCS) so that the block-error probability (BLEP) is or is approximately $<10^{-3}$.

According to the provided example scenario, at least some of the described decision-making strategies were used for deciding the split ratio and the packet to be forwarded. When using a random policy with delivery time (Time–Rnd), the split ratio was computed using the delivery time of the packets using the two legs according to equation (1). The decision of the leg used to transmit the packet was random with a probability equal to the split-ratio. Alternatively, when using a deterministic policy with delivery time (Time–Det), the split ratio was computed using the delivery time of the packets using the two legs according to equation (1), the first packets in the batch were transmitted using the slowest leg while the remaining were transmitted on the fastest leg, and the proportion of packets on the fastest leg was maintained in line with the prescribed split-ratio. Alternatively, when using a random policy (50-50–Rnd), the split ratio was fixed to 0.5 and the transmission leg was decided randomly. Alternatively, when using a random policy with transmission rate (Rate–Rnd), the split ratio was computed using the inverse of the transmission rate of the packets using the two legs according to equation (1), $T_d^i(t)$ was replaced by the inverse of the transmission rate, and the decision of the leg used to transmit the packet was random with probability equal to the split-ratio. Alternatively, when using a deterministic policy with transmission rate (Rate–Det), the split ratio was computed using the inverse of transmission rate of the packets using the two legs according to equation (1), $T_d^i(t)$ was replaced by the inverse of the transmission rate, the first packets in the batch were transmitted using the slowest leg while the remaining packets were transmitted on the fastest leg, and the proportion of packets on the fastest leg was maintained in line with the prescribed split-ratio.

These different decision-making policies and examples were evaluated by varying the difference between the two legs of their average quality in the set {3,6,9} dB. Said otherwise, on average the best leg is 3 dB higher than the worst leg. To analyze performance, performance metrics were considered. Those performance metrics included: reliability measured as the fraction of overall number of packets that miss the deadline, and availability measured as the fraction of batches that miss the deadline. More specifically, if one packet in the batch misses the deadline, all 10 packets in the batch are considered lost. This more accurately simulates the rendering delay, since the rendering cannot be executed if even one packet is missing. While reliability was analyzed as a measure of the network level reliability, availability was analyzed as a measure of the application-level reliability, which may be as or more important for evaluating protocol suitability for some applications, e.g., XR services.

As illustrated in FIGS. 12 and 13, while packet reliability is higher than 99.9% for all policies analyzed, including those not discussed in this disclosure, (99.9% being the reliability target for VR service as indicated in 3GPP TS 22.261), a batch reliability of 99.9% was fulfilled only by the policies presented in this disclosure. In some cases, more than 1% of the batches were delivered too late (latency was too high) for various policies and protocols not described in detail herein, which may result in no, improper, or late rendering and display of 3D video or the like, thus resulting in a loss of QoE for the UE.

Referring now to FIG. 14, a method 10a is illustrated that can be carried out by an apparatus, such as the apparatus 200 or the like. In some embodiments, the method 10a can comprise: determining, via a network entity of a communication network, a first latency associated with transmission of a first one or more packets on a first data radio bearer and a second latency associated with transmission of a second one or more packets on a second data radio bearer, at block 11a. In some embodiments, the method 10a can further comprise: in an instance in which a difference between the first latency and the second latency exceeds a latency threshold, causing a delay of one of the first one or more packets or the second one or more packets in order to synchronize the first and second data radio bearers, at block 12a. In some embodiments, the method 10a can, optionally, further comprise: determining whether the first QoS flow or the second QoS flow fail to meet a QoS requirement, at block 13a. In some embodiments, the method 10a can, optionally, further comprise: in an instance in which the first QoS flow or the second QoS flow fails to meet the QoS requirement, determining that one or more of the first QoS flow and the second QoS flow are obsolete, at block 14a.

Referring now to FIG. 15, an alternative method 10b is illustrated that can be carried out by an apparatus, such as the apparatus 200 or the like. In some embodiments, the method 10b can comprise: determining, via a network entity of a communication network, a first latency associated with transmission of a first one or more packets on a first data radio bearer and a second latency associated with transmission of a second one or more packets on a second data radio bearer, at block 11b. In some embodiments, the method 10b can further comprise: in an instance in which a difference between the first latency and the second latency exceeds a latency threshold, causing a delay of one of the first one or more packets or the second one or more packets in order to synchronize the first and second data radio bearers, at block 12b. In some embodiments, the method 10b can, optionally, further comprise: determining a split ratio for a radio link control of one of the first data radio bearer and the second data radio bearer and/or determining whether to duplicate one or more of the first data radio bearer and the second data radio bearer, at block 13b.

Referring now to FIG. 16, an alternative method 10c is illustrated that can be carried out by an apparatus, such as the apparatus 200 or the like. In some embodiments, the method 10c can comprise: determining, via a network entity of a communication network, a first latency associated with transmission of a first one or more packets on a first data radio bearer and a second latency associated with transmission of a second one or more packets on a second data radio bearer, at block 11c. In some embodiments, the method 10c can further comprise: in an instance in which a difference between the first latency and the second latency exceeds a latency threshold, causing a delay of one of the first one or more packets or the second one or more packets in order to synchronize the first and second data radio bearers, at block 12c. In some embodiments, the method 10c can, optionally, further comprise: determining a delay budget for one or more of the first data radio bearer and the second data radio bearer, at block 13c. In some embodiments, the method 10c can, optionally, further comprise: in an instance in which the delay budget of a respective one of the first or second data radio bearer is below a delay budget threshold, determining not to duplicate the respective one of the first or second data radio bearer, at block 14*c*.

Referring now to FIG. 17, an alternative method 10*d* is illustrated that can be carried out by an apparatus, such as the apparatus 200 or the like. In some embodiments, the method 10*d* can comprise: determining, via a network entity of a communication network, a first latency associated with transmission of a first one or more packets on a first data radio bearer and a second latency associated with transmission of a second one or more packets on a second data radio bearer, at block 11*d*. In some embodiments, the method 10*d* can further comprise: in an instance in which a difference between the first latency and the second latency exceeds a latency threshold, causing a delay of one of the first one or more packets or the second one or more packets in order to synchronize the first and second data radio bearers, at block 12*d*. In some embodiments, the method 10*d* can, optionally, further comprise: determining whether a latency of packets transmitted along one or more secondary legs of one of the first or second data radio bearer is above the latency threshold, at block 13*d*. In some embodiments, the method 10*d* can, optionally, further comprise: in an instance in which the latency of packets transmitted along one or more secondary legs of one of the first or second data radio bearer is above the latency threshold, determining not to duplicate the respective one or more data radio bearers, at block 14*d*.

Referring now to FIG. 18, an alternative method 10*e* is illustrated that can be carried out by an apparatus, such as the apparatus 200 or the like. In some embodiments, the method 10*e* can comprise: determining, via a network entity of a communication network, a first latency associated with transmission of a first one or more packets on a first data radio bearer and a second latency associated with transmission of a second one or more packets on a second data radio bearer, at block 11*e*. In some embodiments, the method 10*e* can further comprise: in an instance in which a difference between the first latency and the second latency exceeds a latency threshold, causing a delay of one of the first one or more packets or the second one or more packets in order to synchronize the first and second data radio bearers, at block 12*e*. In some embodiments, the method 10*e* can, optionally, further comprise: determining whether the split ratio for the radio link control of one of the first data radio bearer and the second data radio bearer is above a threshold split ratio, at block 13*e*. In some embodiments, the method 10*e* can, optionally, further comprise: in an instance in which the split ratio for the radio link control of one of the first data radio bearer and the second data radio bearer is above the threshold split ratio, determining whether to enable or disable a split within the one of the first data radio bearer and the second data radio bearer and/or determining whether to duplicate data radio bearer traffic, at block 14*e*.

Referring now to FIG. 19, a method 20 is illustrated that can be carried out by an apparatus, such as the apparatus 200 or the like. In some embodiments, the method 20 can comprise: in an instance in which at least one data radio bearer of two or more linked data radio bearers in a communications system are using a split bearer configuration, providing, from a hosting node of the communications system, to an assisting node of the communications system, information regarding the two or more linked data radio bearers, said information comprising a maximum delay deviation between the two or more linked data radio bearers, at block 21.

Referring now to FIG. 20, a method 30 is illustrated that can be carried out by an apparatus, such as the apparatus 200 or the like. In some embodiments, the method 30 can comprise: receiving, at an assisting node of a communications system, from a hosting node, information regarding two or more linked data radio bearers, said information comprising a maximum delay deviation between the two or more linked data radio bearers, at block 31. In some embodiments, the method 30 can further comprise: determining a latency of packets on at least one of the two or more linked data radio bearers, at block 32. In some embodiments, the method 30 can further comprise: providing latency assistance information to the hosting node in order to facilitate deciding a split ratio between radio link control entities and/or duplication of data radio bearers, at block 33.

Referring now to FIG. 21, a method 40*a* is illustrated that can be carried out by an apparatus, such as the apparatus 200 or the like. In some embodiments, the method 40*a* can comprise: determining a first latency associated with a first data flow transmitted via hosting node of a communications system, on a first data radio bearer, to a user equipment, at block 41*a*. In some embodiments, the method 40*a* can further comprise: determining a second latency associated with a second data flow transmitted via an assisting node of the communications system, on a second data radio bearer, to the user equipment, at block 42*a*. In some embodiments, the method 40*a* can further comprise: generating latency assistance information, wherein said latency assistance information comprises one or more of expected scheduling information, over-the-air transmission delay information, and per data flow latency information, at block 43*a*. In some embodiments, the method 40*a* can, optionally, further comprise: transmitting the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold, at block 44*a*.

Referring now to FIG. 22, a method 40*b* is illustrated that can be carried out by an apparatus, such as the apparatus 200 or the like. In some embodiments, the method 40*b* can comprise: determining a first latency associated with a first data flow transmitted via hosting node of a communications system, on a first data radio bearer, to a user equipment, at block 41*b*. In some embodiments, the method 40*b* can further comprise: determining a second latency associated with a second data flow transmitted via an assisting node of the communications system, on a second data radio bearer, to the user equipment, at block 42*b*. In some embodiments, the method 40*b* can further comprise: generating latency assistance information, wherein said latency assistance information comprises one or more of expected scheduling information, over-the-air transmission delay information, and per data flow latency information, at block 43*b*. In some embodiments, the method 40*b* can, optionally, further comprise: determining whether the first data flow or the second data flow fail to meet or exceed the quality of service threshold, at block 44*b*. In some embodiments, the method 40*b* can, optionally, further comprise: in an instance in which the first data flow or the second data flow fails to meet or exceed the quality of service threshold, determining that one or more of the first data flow and the second data flow are obsolete, at block 45*b*.

Referring now to FIG. 23, a method 50 is illustrated that can be carried out by an apparatus, such as the apparatus 200 or the like. In some embodiments, the method 50 can comprise: in a communications system, transmitting, from a hosting node, to an assisting node, a request for a first packet transmission latency for one or more first data flows on a first data radio bearer at the assisting node, at block 51. In some embodiments, the method 50 can further comprise: determining, using the assisting node, the first packet transmission latency for the one or more first data flows on the first data radio bearer, at block 52. In some embodiments, the method 50 can further comprise: transmitting, from the assisting node, to the hosting node, latency assistance information comprising information regarding the first packet transmission latency for the one or more first flows on the first data radio bearer, at block 53. In some embodiments, the method 50 can further comprise: determining, using the hosting node, a second packet transmission latency for one or more second data flows on a second data radio bearer at the hosting node, at block 54. In some embodiments, the method 50 can further comprise: determining, using at least the latency assistance information and the second packet transmission latency, whether a difference between the first packet transmission latency and the second packet transmission latency exceeds a maximum delay deviation, at block 55.

Referring now to FIG. 24, a method 60*a* is illustrated that can be carried out by an apparatus, such as the apparatus 200 or the like. In some embodiments, the method 60*a* can comprise: receiving, at a hosting node in a communications system, from an assisting node, latency information indicative of a latency of one or more Quality of Service (QoS) flows on two or more data radio bearers, at block 61*a*. In some embodiments, the method 60*a* can further comprise: determining, based at least upon the latency information received from the assisting node, a split ratio for packets of said one or more QoS flows on said two or more data radio bearers, at block 62*a*. In some embodiments, the method 60*a* can, optionally, further comprise: receiving synchronization information indicative of at least one QoS flow of the one or more QoS flows that need to be synchronized with at least one other QoS flow of the one or more QoS flows, at block 63*a*. In some embodiments, the method 60*a* can, optionally, further comprise: determining at least one QoS flow of the one or more QoS flows that need to be synchronized with at least one other QoS flow of the one or more QoS flows, at block 64*a*. In some embodiments, the method 60*a* can, optionally, further comprise: determining a maximum latency deviation which indicates the maximum latency difference allowed between the one or more QoS flows, at block 65*a*. In some embodiments, the method 60*a* can, optionally, further comprise: providing the maximum latency deviation to the assisting node, at block 66*a*.

Referring now to FIG. 25, a method 60*b* is illustrated that can be carried out by an apparatus, such as the apparatus 200 or the like. In some embodiments, the method 60*b* can comprise: receiving, at a hosting node in a communications system, from an assisting node, latency information indicative of a latency of one or more Quality of Service (QoS) flows on two or more data radio bearers, at block 61*b*. In some embodiments, the method 60*b* can further comprise: determining, based at least upon the latency information received from the assisting node, a split ratio for packets of said one or more QoS flows on said two or more data radio bearers, at block 62*b*. In some embodiments, the method 60*b* can, optionally, further comprise: determining whether said one or more QoS flows are generated by a same application, at block 63*b*. In some embodiments, the method 60*b* can, optionally, further comprise: determining whether to duplicate one or more of the two or more data radio bearers, at block 64*b*. In some embodiments, the method 60*b* can, optionally, further comprise: determining whether a latency of packets transmitted along one or more secondary legs of at least one of the two or more data radio bearers associated with the same application is above a latency threshold, at block 65*b*. In some embodiments, the method 60*b* can, optionally, further comprise: in an instance in which the latency of packets transmitted along the one or more secondary legs of the at least one of the two or more data radio bearers associated with the same application is above the latency threshold, determining not to duplicate the at least one of the two or more data radio bearers, at block 66*b*.

Referring now to FIG. 26, a method 70*a* is illustrated that can be carried out by an apparatus, such as the apparatus 200 or the like. In some embodiments, the method 70*a* can comprise: receiving, at an assisting node of a communications system, from a hosting node, information regarding two or more linked data radio bearers of one or more Quality of Service (QoS) flows from a same application, said information comprising a maximum delay deviation between the two or more linked data radio bearers, at block 71*a*. In some embodiments, the method 70*a* can further comprise: determining a packet transmission latency for at least one of the two or more linked data radio bearers, at block 72*a*. In some embodiments, the method 70*a* can further comprise: providing latency assistance information to the hosting node in order to facilitate deciding a split ratio between radio link control entities and/or duplication of data radio bearers, said latency assistance information comprising said packet transmission latency for said at least one of the two or more linked data radio bearers, at block 73*a*. In some embodiments, the method 70*a* can, optionally, further comprise: determining, via the assisting node, a first packet transmission latency of one or more first packets on a first data radio bearer of the two or more linked data radio bearers and a second packet transmission latency of one or more second packets on a second data radio bearer of the two or more linked data radio bearers, the second packet transmission latency being larger than the first packet transmission latency, at block 74*a*. In some embodiments, the method 70*a* can, optionally, further comprise: in an instance in which a difference between the first packet transmission latency and the second packet transmission latency exceeds the maximum delay deviation, executing an action on at least one of the first data radio bearer and the second data radio bearer, said action comprising at least one from among: increasing a scheduling priority of packets of the second data radio bearer, reducing a load of the second data radio bearer, and postponing the transmission of packets of one or more of the first and second data radio bearers in order to synchronize the packet transmission latency of the first and second data radio bearers, at block 75*a*.

Referring now to FIG. 27, a method 70*b* is illustrated that can be carried out by an apparatus, such as the apparatus 200 or the like. In some embodiments, the method 70*b* can comprise: receiving, at an assisting node of a communications system, from a hosting node, information regarding two or more linked data radio bearers of one or more Quality of Service (QoS) flows from a same application, said information comprising a maximum delay deviation between the two or more linked data radio bearers, at block 71*b*. In some embodiments, the method 70*b* can further comprise: determining a packet transmission latency for at least one of the two or more linked data radio bearers, at block 72*b*. In some embodiments, the method 70*b* can further comprise: providing latency assistance information to the hosting node in order to facilitate deciding a split ratio between radio link control entities and/or duplication of data radio bearers, said latency assistance information comprising said packet transmission latency for said at least one of the two or more linked data radio bearers, at block 73*b*. In some embodiments, the method 70*b* can, optionally, further comprise: wherein the one or more first packets comprise a first quality of service (QoS) flow and the one or more second packets comprise a second QoS flow, the first and second QoS flows being associated with the same application, the method further comprising: determining whether at least one of the first QoS flow and the second QoS flow fails to meet a QoS requirement, at block 74*b*. In some embodiments, the method 70*b* can, optionally, further comprise: in an instance in which at least one of the first QoS flow and the second QoS flow fails to meet the QoS requirement, determining that one or more of the first QoS flow and the second QoS flow are obsolete, at block 75*b*. In some embodiments, the method 70*b* can, optionally, further comprise: determining a delay budget for one or more of the first data radio bearer and the second data radio bearer based at least on the maximum delay deviation; and, in an instance in which the delay budget for one or more of the first data radio bearer and the second data radio bearer is below a delay budget threshold, determining not to duplicate the one or more of the first data radio bearer and the second data radio bearer, at block 76*b*.

Referring now to FIG. 28, a method 70*c* is illustrated that can be carried out by an apparatus, such as the apparatus 200 or the like. In some embodiments, the method 70*c* can comprise: receiving, at an assisting node of a communications system, from a hosting node, information regarding two or more linked data radio bearers of one or more Quality of Service (QoS) flows from a same application, said information comprising a maximum delay deviation between the two or more linked data radio bearers, at block 71*c*. In some embodiments, the method 70*c* can further comprise: determining a packet transmission latency for at least one of the two or more linked data radio bearers, at block 72*c*. In some embodiments, the method 70*c* can further comprise: providing latency assistance information to the hosting node in order to facilitate deciding a split ratio between radio link control entities and/or duplication of data radio bearers, said latency assistance information comprising said packet transmission latency for said at least one of the two or more linked data radio bearers, at block 73*c*. In some embodiments, the method 70*c* can, optionally, further comprise: determining an average packet size of packets transmitted on the two or more data radio bearers during a first period of time; determining an average number of packets transmitted on the two or more data radio bearers during said first period of time; estimating, based at least upon the average packet size and the average number of packets transmitted on the two or more data radio bearers during said first period of time, an expected number of packets and an expected average packet size during a second period of time later than the first period of time, at block 74*c*. In some embodiments, the method 70*c* can, optionally, further comprise: determining a maximum number of packets to transmit on each data radio bearer of the two or more data radio bearers during said second period of time in order to achieve a delay deviation between the two or more data radio bearers that is less than or equal to the maximum delay deviation threshold; and determining, based at least on the maximum number of packets to be transmitted on each data radio bearer of the two or more data radio bearers during said second period of time, a second split ratio associated with said second period of time, at block 75*c*.

Referring now to FIG. 29, a method 70*d* is illustrated that can be carried out by an apparatus, such as the apparatus 200 or the like. In some embodiments, the method 70*d* can comprise: receiving, at an assisting node of a communications system, from a hosting node, information regarding two or more linked data radio bearers of one or more Quality of Service (QoS) flows from a same application, said information comprising a maximum delay deviation between the two or more linked data radio bearers, at block 71*d*. In some embodiments, the method 70*d* can further comprise: determining a packet transmission latency for at least one of the two or more linked data radio bearers, at block 72*d*. In some embodiments, the method 70*d* can further comprise: providing latency assistance information to the hosting node in order to facilitate deciding a split ratio between radio link control entities and/or duplication of data radio bearers, said latency assistance information comprising said packet transmission latency for said at least one of the two or more linked data radio bearers, at block 73*d*. In some embodiments, the method 70*d* can, optionally, further comprise: determining an average packet size of packets transmitted on the two or more data radio bearers during a first period of time; determining an average number of packets transmitted on the two or more data radio bearers during said first period of time; estimating, based at least upon the average packet size and the average number of packets transmitted on the two or more data radio bearers during said first period of time, an expected number of packets and an expected average packet size during a second period of time later than the first period of time, at block 74*d*. In some embodiments, the method 70*d* can, optionally, further comprise: determining a number of packets to be transmitted on each data radio bearer of the two or more data radio bearers during said second period of time in order to minimize a delay deviation between the two or more data radio bearers during said second period of time; and determining, based at least on the number of packets to be transmitted on each data radio bearer of the two or more data radio bearers during said future period of time, a second split ratio associated with said second period of time, at block 75*d*.

As described above, FIGS. 14-29 include flowcharts of methods operable to be carried out by an apparatus (e.g., the apparatus 200), e.g., according to a computer program product, in accordance with certain example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 14-29. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

A method, apparatus and computer program product are provided in accordance with an example embodiment to synchronize radio bearers carrying data from an entity or application within a communication system (e.g., 5G), towards user equipment, in order to achieve a desired Quality of Experience (QoE) for applications with multiple data streams and multiple quality of service (QoS) flows.

In one example embodiment, a method is provided that includes determining, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow. In some embodiments, the method further includes: determining whether the first QoS flow or the second QoS flow fail to meet a QoS requirement; and, in an instance in which the first QoS flow or the second QoS flow fails to meet the QoS requirement, determining that one or more of the first QoS flow and the second QoS flow are obsolete.

In another example embodiment, an apparatus is provided that includes processing circuitry and at least one memory including computer program code for one or more programs with the at least one memory and the computer program code configured to, with the processing circuitry, cause the apparatus at least to determine, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, cause a delay of one of the first one or more packets or the second one or more packets in order to synchronize the first and second data radio bearers. In some embodiments, the first one or more packets comprise a first quality of service (QoS) flow and the second one or more packets comprise a second QoS flow, and wherein the computer executable program code instructions further comprise program code instructions configured, upon execution, to: determine whether the first QoS flow or the second QoS flow fail to meet a QoS requirement; and, in an instance in which the first QoS flow or the second QoS flow fails to meet the QoS requirement, determine that one or more of the first QoS flow and the second QoS flow are obsolete.

In another example embodiment, a computer program product is provided that includes at least one non-transitory computer-readable storage medium having computer executable program code instructions stored therein with the computer executable program code instructions comprising program code instructions configured, upon execution, to determine, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, cause a delay of one of the first one or more packets or the second one or more packets in order to synchronize the first and second data radio bearers. In some embodiments, the first one or more packets comprise a first quality of service (QoS) flow and the second one or more packets comprise a second QoS flow, and wherein the computer executable program code instructions further comprise program code instructions configured, upon execution, to: determine whether the first QoS flow or the second QoS flow fail to meet a QoS requirement; and, in an instance in which the first QoS flow or the second QoS flow fails to meet the QoS requirement, determine that one or more of the first QoS flow and the second QoS flow are obsolete.

In another example embodiment, an apparatus is provided that includes means for determining, via a network entity of a communication network, a first latency associated with transmission of a first one or more packets on a first data radio bearer and a second latency associated with transmission of a second one or more packets on a second data radio bearer; and means for, in an instance in which a difference between the first latency and the second latency exceeds a predetermined threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow, the apparatus further comprising: means for determining whether the first QoS flow or the second QoS flow fail to meet a QoS requirement; and means for, in an instance in which the first QoS flow or the second QoS flow fails to meet the QoS requirement, determining that one or more of the first QoS flow and the second QoS flow are obsolete.

In yet another embodiment, an access node is provided that is part of a communications system. In some embodiments, the access node is configured to host a packet data convergence protocol entity. In some embodiments, the access node comprises processing circuitry and at least one memory including computer program code for one or more programs, the at least one memory and the computer program code configured to, with the processing circuitry, cause the access node at least to: in an instance in which the access node is configured to transmit data packets via multiple data radio bearers using a split bearer, provide information about linked data radio bearers to an assisting node of the communications system. In some embodiments, the information comprises a maximum delay deviation between two or more data radio bearers of the multiple data radio bearers. In some embodiments, the assisting node is configured to: determine a first latency associated with transmission of a first one or more packets on a first data radio bearer of the multiple data radio bearers and a second latency associated with transmission of a second one or more packets on a second data radio bearer of the multiple data radio bearers; and, in an instance in which a difference between the first latency and the second latency exceeds a predetermined threshold, cause a delay of one of the first one or more packets or the second one or more packets in order to synchronize the first and second data radio bearers.

According to still another embodiment, a method can be carried out that comprises, in an instance in which an access node of a communications system is configured to host a packet data convergence protocol entity and further is configured to transmit data packets via multiple data radio bearers using a split bearer, providing information about linked data radio bearers to an assisting node of the communications system. In some embodiments, the information comprises a maximum delay deviation between two or more data radio bearers of the multiple data radio bearers.

According to another embodiment, a computer program product can be provided that comprises at least one non-transitory computer-readable storage medium having computer executable program code instructions stored therein, the computer executable program code instructions comprising program code instructions configured, upon execution, to: in an instance in which an access node of a communications system is configured to host a packet data convergence protocol entity and further is configured to transmit data packets via multiple data radio bearers using a split bearer, provide information about linked data radio bearers to an assisting node of the communications system. In some embodiments, the information comprises a maximum delay deviation between two or more data radio bearers of the multiple data radio bearers.

According to yet another embodiment, an apparatus can be provided that comprises means for, in an instance in which an access node of a communications system is configured to host a packet data convergence protocol entity and further is configured to transmit data packets via multiple data radio bearers using a split bearer, providing information about linked data radio bearers to an assisting node of the communications system. In some embodiments, the information comprises a maximum delay deviation between two or more data radio bearers of the multiple data radio bearers.

According to still another embodiment, a method can be carried out that comprises providing, via an assisting node of a communications system, to a hosting node of the communications system, one or more of latency assistance information and a maximum delay deviation between two or more quality of service (QoS) flows transmitted on one or more data radio bearers; and determining a split ratio for radio link control entities and/or determining whether to duplicate the one or more data radio bearers. In some embodiments, the method can further comprise determining a delay budget of the one or more data radio bearers; and, in an instance in which the respective delay budget of the one or more data radio bearers is below a delay budget threshold, determining not to duplicate the respective one or more data radio bearers. In some embodiments, the method can further comprise determining a latency of one or more secondary legs of the one or more data radio bearers is above a latency threshold, and, in an instance in which the latency of at least one of the one or more secondary legs of the one or data radio bearers is above the latency threshold, determining not to duplicate the respective one or more data radio bearers. In some embodiments, the method can further comprise determining a latency of one or more secondary legs of the one or more data radio bearers is above a latency threshold, and, in an instance in which the latency of at least one of the one or more secondary legs of the one or data radio bearers is above the latency threshold, determining not to duplicate the respective one or more data radio bearers. In some embodiments, the method can further comprise determining whether the split ratio for the radio link control entities is above a threshold split ratio, and, in an instance in which the split ratio for the radio link control entities is above the threshold split ratio, determining whether to enable or disable a split within the radio link control entities and/or determining whether to duplicate data radio bearer traffic.

According to another embodiment, an apparatus can be provided that comprises means for providing, via an assisting node of a communications system, to a hosting node of the communications system, one or more of latency assistance information and a maximum delay deviation between two or more quality of service (QoS) flows transmitted on one or more data radio bearers; and means for determining a split ratio for radio link control entities and/or determining whether to duplicate the one or more data radio bearers. In some embodiments, the apparatus can further comprise means for determining a delay budget of the one or more data radio bearers; and means for, in an instance in which the respective delay budget of the one or more data radio bearers is below a delay budget threshold, determining not to duplicate the respective one or more data radio bearers. In some embodiments, the apparatus can further comprise means for determining a latency of one or more secondary legs of the one or more data radio bearers is above a latency threshold, and means for, in an instance in which the latency of at least one of the one or more secondary legs of the one or data radio bearers is above the latency threshold, determining not to duplicate the respective one or more data radio bearers. In some embodiments, the apparatus can further comprise means for determining a latency of one or more secondary legs of the one or more data radio bearers is above a latency threshold, and means for, in an instance in which the latency of at least one of the one or more secondary legs of the one or data radio bearers is above the latency threshold, determining not to duplicate the respective one or more data radio bearers. In some embodiments, the apparatus can further comprise means for determining whether the split ratio for the radio link control entities is above a threshold split ratio, and means for, in an instance in which the split ratio for the radio link control entities is above the threshold split ratio, determining whether to enable or disable a split within the radio link control entities and/or determining whether to duplicate data radio bearer traffic.

According to still another embodiment, a computer program product can be provided that comprises at least one non-transitory computer-readable storage medium having computer executable program code instructions stored therein, the computer executable program code instructions comprising program code instructions configured, upon execution, to: provide, via an assisting node of a communications system, to a hosting node of the communications system, one or more of latency assistance information and a maximum delay deviation between two or more quality of service (QoS) flows transmitted on one or more data radio bearers; and determine a split ratio for radio link control entities and/or determining whether to duplicate the one or more data radio bearers. In some embodiments, the computer executable program code instructions can further comprise program code instructions configured, upon execution, to: determine a delay budget of the one or more data radio bearers; and, in an instance in which the respective delay budget of the one or more data radio bearers is below a delay budget threshold, determine not to duplicate the respective one or more data radio bearers. In some embodiments, the computer executable program code instructions can further comprise program code instructions configured, upon execution, to: determine a latency of one or more secondary legs of the one or more data radio bearers is above a latency threshold, and, in an instance in which the latency of at least one of the one or more secondary legs of the one or data radio bearers is above the latency threshold, determine not to duplicate the respective one or more data radio bearers. In some embodiments, the computer executable program code instructions can further comprise program code instructions configured, upon execution, to: determine a latency of one or more secondary legs of the one or more data radio bearers is above a latency threshold, and, in an instance in which the latency of at least one of the one or more secondary legs of the one or data radio bearers is above the latency threshold, determine not to duplicate the respective one or more data radio bearers. In some embodiments, the computer executable program code instructions can further comprise program code instructions configured, upon execution, to: determine whether the split ratio for the radio link control entities is above a threshold split ratio, and, in an instance in which the split ratio for the radio link control entities is above the threshold split ratio, determine whether to enable or disable a split within the radio link control entities and/or determine whether to duplicate data radio bearer traffic.

According to yet another embodiment, an apparatus can be provided that comprises means for providing information about linked data radio bearers to an assisting node of the communications system, wherein said information comprises a maximum delay deviation between two or more data radio bearers of the multiple data radio bearers.

According to another embodiment, a method can be carried out that comprises providing information about linked data radio bearers to an assisting node of the communications system, wherein said information comprises a maximum delay deviation between two or more data radio bearers of the multiple data radio bearers.

According to still another embodiment, a computer program product can be provided that comprises at least one non-transitory computer-readable storage medium having computer executable program code instructions stored therein, the computer executable program code instructions comprising program code instructions configured, upon execution, to: provide information about linked data radio bearers to an assisting node of the communications system, wherein said information comprises a maximum delay deviation between two or more data radio bearers of the multiple data radio bearers.

According to yet another embodiment, an apparatus can be provided that comprises means for providing, to a network access node, information about multiple Quality of Service (QoS) flows transmitted on one or more data radio bearers, wherein said information is provided within one or more of user equipment capability information or radio resource control (RRC) messaging, and wherein said information is operable to cause synchronization of said multiple QoS flows.

According to another embodiment, a method can be carried out that comprises providing, from user equipment, to a network access node, information about multiple Quality of Service (QoS) flows transmitted on one or more data radio bearers, wherein said information is provided within one or more of user equipment capability information or radio resource control (RRC) messaging, and wherein said information is operable to cause synchronization of said multiple QoS flows.

According to still another embodiment, a computer program product can be provided that comprises at least one non-transitory computer-readable storage medium having computer executable program code instructions stored therein, the computer executable program code instructions comprising program code instructions configured, upon execution, to: provide, from user equipment, to a network access node, information about multiple Quality of Service (QoS) flows transmitted on one or more data radio bearers, wherein said information is provided within one or more of user equipment capability information or radio resource control (RRC) messaging, and wherein said information is operable to cause synchronization of said multiple QoS flows.

According to yet another embodiment, a method is provided that comprises: determining, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a latency threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow, the method further comprising: determining whether the first QoS flow or the second QoS flow fail to meet a QoS requirement; and, in an instance in which the first QoS flow or the second QoS flow fails to meet the QoS requirement, determining that one or more of the first QoS flow and the second QoS flow are obsolete. In some embodiments, the method can further comprise: determining a split ratio for a radio link control of one of the first data radio bearer and the second data radio bearer and/or determining whether to duplicate one or more of the first data radio bearer and the second data radio bearer. In some embodiments, the method can further comprise: determining a delay budget for one or more of the first data radio bearer and the second data radio bearer; and, in an instance in which the delay budget of a respective one of the first or second data radio bearer is below a delay budget threshold, determining not to duplicate the respective one of the first or second data radio bearer. In some embodiments, the method can further comprise: determining whether a latency of packets transmitted along one or more secondary legs of one of the first or second data radio bearer is above the latency threshold, and, in an instance in which the latency of packets transmitted along one or more secondary legs of one of the first or second data radio bearer is above the latency threshold, determining not to duplicate the respective one or more data radio bearers. In some embodiments, the method can further comprise: determining whether the split ratio for the radio link control of one of the first data radio bearer and the second data radio bearer is above a threshold split ratio, and, in an instance in which the split ratio for the radio link control of one of the first data radio bearer and the second data radio bearer is above the threshold split ratio, determining whether to enable or disable a split within the one of the first data radio bearer and the second data radio bearer and/or determining whether to duplicate data radio bearer traffic.

According to another embodiment, a method can be provided that comprises: in an instance in which at least one data radio bearer of two or more linked data radio bearers in a communications system are using a split bearer configuration, providing, from a hosting node of the communications system, to an assisting node of the communications system, information regarding the two or more linked data radio bearers, said information comprising a maximum delay deviation between the two or more linked data radio bearers.

According to another embodiment, a method can be provided that comprises: receiving, at an assisting node of a communications system, from a hosting node, information regarding two or more linked data radio bearers, said information comprising a maximum delay deviation between the two or more linked data radio bearers; determining a latency of packets on at least one of the two or more linked data radio bearers; and providing latency assistance information to the hosting node in order to facilitate deciding a split ratio between radio link control entities and/or duplication of data radio bearers.

According to still another embodiment, a method can be provided that comprises: determining a first latency associated with a first data flow transmitted via hosting node of a communications system, on a first data radio bearer, to a user equipment; determining a second latency associated with a second data flow transmitted via an assisting node of the communications system, on a second data radio bearer, to the user equipment; and generating latency assistance information, wherein said latency assistance information comprises one or more of expected scheduling information, over-the-air transmission delay information, and per data flow latency information. In some embodiments, the method can further comprise: transmitting the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold. In some embodiments, the method can further comprise: determining whether the first data flow or the second data flow fail to meet or exceed the quality of service threshold; and, in an instance in which the first data flow or the second data flow fails to meet or exceed the quality of service threshold, determining that one or more of the first data flow and the second data flow are obsolete. In some embodiments, the first data flow is transmitted using a first radio link control protocol and the second data flow is transmitted using a second radio link control protocol. In some embodiments, one or more of the first data flow and the second data flow comprise a data stream and a control stream.

According to yet another embodiment, a method can be provided that comprises: in a communications system, transmitting, from a hosting node, to an assisting node, a request for a first packet transmission latency for one or more first data flows on a first data radio bearer at the assisting node; determining, using the assisting node, the first packet transmission latency for the one or more first data flows on the first data radio bearer; transmitting, from the assisting node, to the hosting node, latency assistance information comprising information regarding the first packet transmission latency for the one or more first flows on the first data radio bearer; determining, using the hosting node, a second packet transmission latency for one or more second data flows on a second data radio bearer at the hosting node; and determining, using at least the latency assistance information and the second packet transmission latency, whether a difference between the first packet transmission latency and the second packet transmission latency exceeds a maximum delay deviation. In some embodiments, the method can further comprise: in an instance in which the difference between the first packet transmission latency and the second packet transmission latency exceeds the maximum delay deviation, causing a delay of at least one of the one or more first data flows or the one or more second data flows in order to synchronize the first and second data radio bearers. In some embodiments, the method can further comprise: determining a quality of service of the one or more first data flows; determining the quality of service of the one or more second data flows; and, in an instance in which the quality of service of at least one of the one or more first data flows or the one or more second data flows is lower than a predetermined quality of service threshold, determining that at least one of the one or more first data flows and the one or more second data flows are obsolete.

According to yet another embodiment, an apparatus can be provided that comprises: means for determining, via a network entity of a communication network, a first latency associated with transmission of a first one or more packets on a first data radio bearer and a second latency associated with transmission of a second one or more packets on a second data radio bearer; and means for, in an instance in which a difference between the first latency and the second latency exceeds a predetermined threshold, causing a delay of one of the first one or more packets or the second one or more packets in order to synchronize the first and second data radio bearers. In some embodiments, the first one or more packets comprise a first quality of service (QoS) flow and the second one or more packets comprise a second QoS flow. In some embodiments, the apparatus may further comprise: means for determining whether the first QoS flow or the second QoS flow fail to meet a QoS requirement; and means for, in an instance in which the first QoS flow or the second QoS flow fails to meet the QoS requirement, determining that one or more of the first QoS flow and the second QoS flow are obsolete. In some embodiments, the apparatus may further comprise: means for determining a split ratio for a radio link control of one of the first data radio bearer and the second data radio bearer and/or determining whether to duplicate one or more of the first data radio bearer and the second data radio bearer. In some embodiments, the apparatus may further comprise: means for determining a delay budget for one or more of the first data radio bearer and the second data radio bearer; and means for, in an instance in which the delay budget of a respective one of the first or second data radio bearer is below a delay budget threshold, determining not to duplicate the respective one of the first or second data radio bearer. In some embodiments, the apparatus may further comprise: means for determining whether a latency of packets transmitted along one or more secondary legs of one of the first or second data radio bearer is above the latency threshold, and means for, in an instance in which the latency of packets transmitted along one or more secondary legs of one of the first or second data radio bearer is above the latency threshold, determining not to duplicate the respective one or more data radio bearers. In some embodiments, the apparatus may further comprise: means for determining whether the split ratio for the radio link control of one of the first data radio bearer and the second data radio bearer is above a threshold split ratio; and means for, in an instance in which the split ratio for the radio link control of one of the first data radio bearer and the second data radio bearer is above the threshold split ratio, determining whether to enable or disable a split within the one of the first data radio bearer and the second data radio bearer and/or determining whether to duplicate data radio bearer traffic.

According to another embodiment, an apparatus can be provided that comprises: means for, in an instance in which at least one data radio bearer of two or more linked data radio bearers in a communications system are using a split bearer configuration, providing, from a hosting node of the communications system, to an assisting node of the communications system, information regarding the two or more linked data radio bearers, said information comprising a maximum delay deviation between the two or more linked data radio bearers.

According to yet another embodiment, an apparatus can be provided that comprises: means for receiving, at an assisting node of a communications system, from a hosting node, information regarding two or more linked data radio bearers, said information comprising a maximum delay deviation between the two or more linked data radio bearers; means for determining a latency of packets on at least one of the two or more linked data radio bearers; and means for providing latency assistance information to the hosting node in order to facilitate deciding a split ratio between radio link control entities and/or duplication of data radio bearers.

According to still another embodiment, an apparatus can be provided that comprises: means for determining a first latency associated with a first data flow transmitted via hosting node of a communications system, on a first data radio bearer, to a user equipment; means for determining a second latency associated with a second data flow transmitted via an assisting node of the communications system, on a second data radio bearer, to the user equipment; and means for generating latency assistance information, wherein said latency assistance information comprises one or more of expected scheduling information, over-the-air transmission delay information, and per data flow latency information. In some embodiments, the apparatus may further comprise: means for transmitting the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold. In some embodiments, the apparatus may further comprise: means for determining whether the first data flow or the second data flow fail to meet or exceed the quality of service threshold; and means for, in an instance in which the first data flow or the second data flow fails to meet or exceed the quality of service threshold, determining that one or more of the first data flow and the second data flow are obsolete. In some embodiments, the first data flow is transmitted using a first radio link control protocol and the second data flow is transmitted using a second radio link control protocol. In some embodiments, one or more of the first data flow and the second data flow comprise a data stream and a control stream.

According to another embodiment, an apparatus can be provided that comprises: means for, in a communications system, transmitting, from a hosting node, to an assisting node, a request for a first packet transmission latency for one or more first data flows on a first data radio bearer at the assisting node; means for determining, using the assisting node, the first packet transmission latency for the one or more first data flows on the first data radio bearer; means for transmitting, from the assisting node, to the hosting node, latency assistance information comprising information regarding the first packet transmission latency for the one or more first flows on the first data radio bearer; means for determining, using the hosting node, a second packet transmission latency for one or more second data flows on a second data radio bearer at the hosting node; and means for determining, using at least the latency assistance information and the second packet transmission latency, whether a difference between the first packet transmission latency and the second packet transmission latency exceeds a maximum delay deviation. In some embodiments, the apparatus may further comprise: means for, in an instance in which the difference between the first packet transmission latency and the second packet transmission latency exceeds the maximum delay deviation, causing a delay of at least one of the one or more first data flows or the one or more second data flows in order to synchronize the first and second data radio bearers. In some embodiments, the apparatus may further comprise: means for determining a quality of service of the one or more first data flows; means for determining the quality of service of the one or more second data flows; and means for, in an instance in which the quality of service of at least one of the one or more first data flows or the one or more second data flows is lower than a predetermined quality of service threshold, determining that at least one of the one or more first data flows and the one or more second data flows are obsolete.

According to another embodiment, a computer program product can be provided that comprises at least one non-transitory computer-readable storage medium having computer executable program code instructions stored therein, the computer executable program code instructions comprising program code instructions configured, upon execution, to: determine, via a network entity of a communication network, a first latency associated with transmission of a first one or more packets on a first data radio bearer and a second latency associated with transmission of a second one or more packets on a second data radio bearer; and, in an instance in which a difference between the first latency and the second latency exceeds a predetermined threshold, cause a delay of one of the first one or more packets or the second one or more packets in order to synchronize the first and second data radio bearers. In some embodiments, the first one or more packets comprise a first quality of service (QoS) flow and the second one or more packets comprise a second QoS flow. In some embodiments, the computer executable program code instructions may further comprise program code instructions configured, upon execution, to: determine whether the first QoS flow or the second QoS flow fail to meet a QoS requirement; and, in an instance in which the first QoS flow or the second QoS flow fails to meet the QoS requirement, determine that one or more of the first QoS flow and the second QoS flow are obsolete. In some embodiments, the computer executable program code instructions may further comprise program code instructions configured, upon execution, to: determine a split ratio for a radio link control of one of the first data radio bearer and the second data radio bearer and/or determining whether to duplicate one or more of the first data radio bearer and the second data radio bearer. In some embodiments, the computer executable program code instructions may further comprise program code instructions configured, upon execution, to: determine a delay budget for one or more of the first data radio bearer and the second data radio bearer; and, in an instance in which the delay budget of a respective one of the first or second data radio bearer is below a delay budget threshold, determine not to duplicate the respective one of the first or second data radio bearer. In some embodiments, the computer executable program code instructions may further comprise program code instructions configured, upon execution, to: determine whether a latency of packets transmitted along one or more secondary legs of one of the first or second data radio bearer is above the latency threshold, and, in an instance in which the latency of packets transmitted along one or more secondary legs of one of the first or second data radio bearer is above the latency threshold, determine not to duplicate the respective one or more data radio bearers. In some embodiments, the computer executable program code instructions may further comprise program code instructions configured, upon execution, to: determine whether the split ratio for the radio link control of one of the first data radio bearer and the second data radio bearer is above a threshold split ratio; and, in an instance in which the split ratio for the radio link control of one of the first data radio bearer and the second data radio bearer is above the threshold split ratio, determine whether to enable or disable a split within the one of the first data radio bearer and the second data radio bearer and/or determining whether to duplicate data radio bearer traffic.

According to still another embodiment, a computer program product can be provided that comprises at least one non-transitory computer-readable storage medium having computer executable program code instructions stored therein, the computer executable program code instructions comprising program code instructions configured, upon execution, to: in an instance in which at least one data radio bearer of two or more linked data radio bearers in a communications system are using a split bearer configuration, provide, from a hosting node of the communications system, to an assisting node of the communications system, information regarding the two or more linked data radio bearers, said information comprising a maximum delay deviation between the two or more linked data radio bearers.

According to an embodiment, a computer program product can be provided that comprises at least one non-transitory computer-readable storage medium having computer executable program code instructions stored therein, the computer executable program code instructions comprising program code instructions configured, upon execution, to: receive, at an assisting node of a communications system, from a hosting node, information regarding two or more linked data radio bearers, said information comprising a maximum delay deviation between the two or more linked data radio bearers; determine a latency of packets on at least one of the two or more linked data radio bearers; and provide latency assistance information to the hosting node in order to facilitate deciding a split ratio between radio link control entities and/or duplication of data radio bearers.

According to another embodiment, a computer program product can be provided that comprises at least one non-transitory computer-readable storage medium having computer executable program code instructions stored therein, the computer executable program code instructions comprising program code instructions configured, upon execution, to: determine a first latency associated with a first data flow transmitted via hosting node of a communications system, on a first data radio bearer, to a user equipment; determine a second latency associated with a second data flow transmitted via an assisting node of the communications system, on a second data radio bearer, to the user equipment; and generate latency assistance information, wherein said latency assistance information comprises one or more of expected scheduling information, over-the-air transmission delay information, and per data flow latency information. In some embodiments, the computer executable program code instructions further comprise program code instructions configured, upon execution, to: transmit the latency assistance information towards the hosting node, said latency assistance information being operable to cause the hosting node to cause delay of one of the first data flow or the second data flow in order to synchronize the first and second data radio bearers and such that a quality of service of the plurality of data flows meets or exceeds a quality of service threshold. In some embodiments, the computer executable program code instructions further comprise program code instructions configured, upon execution, to: determine whether the first data flow or the second data flow fail to meet or exceed the quality of service threshold; and, in an instance in which the first data flow or the second data flow fails to meet or exceed the quality of service threshold, determine that one or more of the first data flow and the second data flow are obsolete. In some embodiments, the first data flow is transmitted using a first radio link control protocol and the second data flow is transmitted using a second radio link control protocol. In some embodiments, one or more of the first data flow and the second data flow comprise a data stream and a control stream.

According to still another embodiment, a computer program product can be provided that comprises at least one non-transitory computer-readable storage medium having computer executable program code instructions stored therein, the computer executable program code instructions comprising program code instructions configured, upon execution, to: in a communications system, transmit, from a hosting node, to an assisting node, a request for a first packet transmission latency for one or more first data flows on a first data radio bearer at the assisting node; determine, using the assisting node, the first packet transmission latency for the one or more first data flows on the first data radio bearer; transmit, from the assisting node, to the hosting node, latency assistance information comprising information regarding the first packet transmission latency for the one or more first flows on the first data radio bearer; determine, using the hosting node, a second packet transmission latency for one or more second data flows on a second data radio bearer at the hosting node; and determine, using at least the latency assistance information and the second packet transmission latency, whether a difference between the first packet transmission latency and the second packet transmission latency exceeds a maximum delay deviation. In some embodiments, the computer executable program code instructions further comprise program code instructions configured, upon execution, to: in an instance in which the difference between the first packet transmission latency and the second packet transmission latency exceeds the maximum delay deviation, cause a delay of at least one of the one or more first data flows or the one or more second data flows in order to synchronize the first and second data radio bearers. In some embodiments, the computer executable program code instructions further comprise program code instructions configured, upon execution, to: determine a quality of service of the one or more first data flows; determine the quality of service of the one or more second data flows; and, in an instance in which the quality of service of at least one of the one or more first data flows or the one or more second data flows is lower than a predetermined quality of service threshold, determine that at least one of the one or more first data flows and the one or more second data flows are obsolete.

According to another embodiment, a method can be provided or carried out, the method comprising: receiving, at a hosting node in a communications system, from an assisting node, latency information indicative of a latency of one or more Quality of Service (QoS) flows on two or more data radio bearers; and determining, based at least upon the latency information received from the assisting node, a split ratio for packets of said one or more QoS flows on said two or more data radio bearers. In some embodiments, the method can further comprise: receiving synchronization information indicative of at least one QoS flow of the one or more QoS flows that need to be synchronized with at least one other QoS flow of the one or more QoS flows; or determining at least one QoS flow of the one or more QoS flows that need to be synchronized with at least one other QoS flow of the one or more QoS flows. In some embodiments, the method can further comprise: determining a maximum latency deviation which indicates the maximum latency difference allowed between the one or more QoS flows; and providing the maximum latency deviation to the assisting node. In some embodiments, the method can further comprise: determining whether said one or more QoS flows are generated by a same application; and determining whether to duplicate one or more of the two or more data radio bearers. In some embodiments, the method can further comprise: determining whether a latency of packets transmitted along one or more secondary legs of at least one of the two or more data radio bearers associated with the same application is above a latency threshold; and, in an instance in which the latency of packets transmitted along the one or more secondary legs of the at least one of the two or more data radio bearers associated with the same application is above the latency threshold, determining not to duplicate the at least one of the two or more data radio bearers. In some embodiments, said split ratio may be operable for radio link control of the two or more data radio bearers. In some embodiments, the method can further comprise: determining whether the split ratio is above a threshold split ratio; and at least one of: in an instance in which the split ratio for the radio link control of the two or more data radio bearers is above the threshold split ratio, determining whether to enable or disable a split within respective data radio bearers of the two or more data radio bearers, and, in an instance in which the split ratio for the radio link control of the two or more data radio bearers is above the threshold split ratio, determining whether to duplicate data radio bearer traffic. In some embodiments, the method can further comprise: providing said split ratio to one or more of the assisting node and user equipment.

According to yet another embodiment, a method can be provided or carried out, the method comprising: receiving, at an assisting node of a communications system, from a hosting node, information regarding two or more linked data radio bearers of one or more Quality of Service (QoS) flows from a same application, said information comprising a maximum delay deviation between the two or more linked data radio bearers; determining a packet transmission latency for at least one of the two or more linked data radio bearers; and providing latency assistance information to the hosting node in order to facilitate deciding a split ratio between radio link control entities and/or duplication of data radio bearers, said latency assistance information comprising said packet transmission latency for said at least one of the two or more linked data radio bearers. In some embodiments, the method can further comprise: determining, via the assisting node, a first packet transmission latency of one or more first packets on a first data radio bearer of the two or more linked data radio bearers and a second packet transmission latency of one or more second packets on a second data radio bearer of the two or more linked data radio bearers, the second packet transmission latency being larger than the first packet transmission latency; and, in an instance in which a difference between the first packet transmission latency and the second packet transmission latency exceeds the maximum delay deviation, executing an action on at least one of the first data radio bearer and the second data radio bearer, said action comprising at least one from among: increasing a scheduling priority of packets of the second data radio bearer, reducing a load of the second data radio bearer, and postponing the transmission of packets of one or more of the first and second data radio bearers in order to synchronize the packet transmission latency of the first and second data radio bearers. In some embodiments, the one or more first packets may comprise a first quality of service (QoS) flow and the one or more second packets comprise a second QoS flow, the first and second QoS flows being associated with the same application. In some embodiments, the method can further comprise: determining whether at least one of the first QoS flow and the second QoS flow fails to meet a QoS requirement; and, in an instance in which at least one of the first QoS flow and the second QoS flow fails to meet the QoS requirement, determining that one or more of the first QoS flow and the second QoS flow are obsolete. In some embodiments, the method can further comprise: determining a delay budget for one or more of the first data radio bearer and the second data radio bearer based at least on the maximum delay deviation; and, in an instance in which the delay budget for one or more of the first data radio bearer and the second data radio bearer is below a delay budget threshold, determining not to duplicate the one or more of the first data radio bearer and the second data radio bearer. In some embodiments, the method can further comprise at least one of: determining an average packet size of packets transmitted on the two or more data radio bearers during a first period of time; determining an average number of packets transmitted on the two or more data radio bearers during said first period of time; and estimating, based at least upon the average packet size and the average number of packets transmitted on the two or more data radio bearers during said first period of time, an expected number of packets and an expected average packet size during a second period of time later than the first period of time. In some embodiments, said second period of time is in the future. In some embodiments, the method can further comprise: determining a maximum number of packets to transmit on each data radio bearer of the two or more data radio bearers during said second period of time in order to achieve a delay deviation between the two or more data radio bearers that is less than or equal to the maximum delay deviation threshold; and determining, based at least on the maximum number of packets to be transmitted on each data radio bearer of the two or more data radio bearers during said second period of time, a second split ratio associated with said second period of time. In some embodiments, the method can further comprise: determining a number of packets to be transmitted on each data radio bearer of the two or more data radio bearers during said second period of time in order to minimize a delay deviation between the two or more data radio bearers during said second period of time; and determining, based at least on the number of packets to be transmitted on each data radio bearer of the two or more data radio bearers during said future period of time, a second split ratio associated with said second period of time.

According to yet another embodiment, an apparatus can be provided that comprises means, such as a processor and memory storing computer program code or the like. In some embodiments, the apparatus can comprise: means for receiving, at a hosting node in a communications system, from an assisting node, latency information indicative of a latency of one or more Quality of Service (QoS) flows on two or more data radio bearers; and means for determining, based at least upon the latency information received from the assisting node, a split ratio for packets of said one or more QoS flows on said two or more data radio bearers. In some embodiments, the apparatus can further comprise: means for receiving synchronization information indicative of at least one QoS flow of the one or more QoS flows that need to be synchronized with at least one other QoS flow of the one or more QoS flows; or means for determining at least one QoS flow of the one or more QoS flows that need to be synchronized with at least one other QoS flow of the one or more QoS flows. In some embodiments, the apparatus can further comprise: means for determining a maximum latency deviation which indicates the maximum latency difference allowed between the one or more QoS flows; and means for providing the maximum latency deviation to the assisting node. In some embodiments, the apparatus can further comprise: means for determining whether said one or more QoS flows are generated by a same application; and means for determining whether to duplicate one or more of the two or more data radio bearers. In some embodiments, the apparatus can further comprise: means for determining whether a latency of packets transmitted along one or more secondary legs of at least one of the two or more data radio bearers associated with the same application is above a latency threshold, and means for, in an instance in which the latency of packets transmitted along the one or more secondary legs of the at least one of the two or more data radio bearers associated with the same application is above the latency threshold, determining not to duplicate the at least one of the two or more data radio bearers. In some embodiments, said split ratio is for radio link control of the two or more data radio bearers. In some embodiments, the apparatus can further comprise: means for determining whether the split ratio is above a threshold split ratio; and at least one of: means for, in an instance in which the split ratio for the radio link control of the two or more data radio bearers is above the threshold split ratio, determining whether to enable or disable a split within respective data radio bearers of the two or more data radio bearers, and means for, in an instance in which the split ratio for the radio link control of the two or more data radio bearers is above the threshold split ratio, determining whether to duplicate data radio bearer traffic. In some embodiments, the apparatus can further comprise:

means for providing said split ratio to one or more of the assisting node and user equipment.

According to still another embodiment, an apparatus can be provided that comprises means, such as a processor and a memory storing computer program code. In some embodiments, the apparatus can comprise: means for receiving, at an assisting node of a communications system, from a hosting node, information regarding two or more linked data radio bearers of one or more Quality of Service (QoS) flows from a same application, said information comprising a maximum delay deviation between the two or more linked data radio bearers; means for determining a packet transmission latency for at least one of the two or more linked data radio bearers; and means for providing latency assistance information to the hosting node in order to facilitate deciding a split ratio between radio link control entities and/or duplication of data radio bearers, said latency assistance information comprising said packet transmission latency for said at least one of the two or more linked data radio bearers. In some embodiments, the apparatus can further comprise: means for determining, via the assisting node, a first packet transmission latency of one or more first packets on a first data radio bearer of the two or more linked data radio bearers and a second packet transmission latency of one or more second packets on a second data radio bearer of the two or more linked data radio bearers, the second packet transmission latency being larger than the first packet transmission latency; and means for, in an instance in which a difference between the first packet transmission latency and the second packet transmission latency exceeds the maximum delay deviation, executing an action on at least one of the first data radio bearer and the second data radio bearer, said action comprising at least one from among: increasing a scheduling priority of packets of the second data radio bearer, reducing a load of the second data radio bearer, and postponing the transmission of packets of one or more of the first data radio bearer and second data radio bearers in order to synchronize the packet transmission latency of the first and second data radio bearers. In some embodiments, the one or more first packets comprise a first quality of service (QoS) flow and the one or more second packets comprise a second QoS flow, the first and second QoS flows being associated with the same application. In some embodiments, the apparatus can further comprise: means for determining whether at least one of the first QoS flow and the second QoS flow fails to meet a QoS requirement; and means for, in an instance in which at least one of the first QoS flow and the second QoS flow fails to meet the QoS requirement, determining that one or more of the first QoS flow and the second QoS flow are obsolete. In some embodiments, the apparatus can further comprise: means for determining a delay budget for one or more of the first data radio bearer and the second data radio bearer based at least on the maximum delay deviation; and means for, in an instance in which the delay budget for one or more of the first data radio bearer and the second data radio bearer is below a delay budget threshold, determining not to duplicate the one or more of the first data radio bearer and the second data radio bearer. In some embodiments, the apparatus can further comprise at least one of: means for determining an average packet size of packets transmitted on the two or more data radio bearers during a first period of time; means for determining an average number of packets transmitted on the two or more data radio bearers during said first period of time; and means for estimating, based at least upon the average packet size and the average number of packets transmitted on the two or more data radio bearers during said first period of time, an expected number of packets and an expected average packet size during a second period of time. In some embodiments, said second period of time is in the future. In some embodiments, the apparatus can further comprise: means for determining a maximum number of packets to transmit on each data radio bearer of the two or more data radio bearers during said second period of time in order to achieve a delay deviation between the two or more data radio bearers that is less than or equal to the maximum delay deviation threshold; and means for determining, based at least on the maximum number of packets to be transmitted on each data radio bearer of the two or more data radio bearers during said second period of time, a second split ratio associated with said second period of time. In some embodiments, the apparatus can further comprise: means for determining a number of packets to be transmitted on each data radio bearer of the two or more data radio bearers during said second period of time in order to minimize a delay deviation between the two or more data radio bearers during said second period of time; and means for determining, based at least on the number of packets to be transmitted on each data radio bearer of the two or more data radio bearers during said second period of time, a second split ratio associated with second period of time.

According to another embodiment, a computer program product can be provided that comprises at least one non-transitory computer-readable storage medium having computer executable program code instructions stored therein, the computer executable program code instructions comprising program code instructions configured, upon execution, to: receiving, at a hosting node in a communications system, from an assisting node, latency information indicative of a latency of one or more Quality of Service (QoS) flows on two or more data radio bearers. In some embodiments, the computer executable program code instructions can further comprise program code instructions configured, upon execution, to: determine, based at least upon the latency information received from the assisting node, a split ratio for packets of said one or more QoS flows on said two or more data radio bearers. In some embodiments, the computer executable program code instructions can further comprise program code instructions configured, upon execution, to: receive synchronization information indicative of at least one QoS flow of the one or more QoS flows that need to be synchronized with at least one other QoS flow of the one or more QoS flows; or determine at least one QoS flow of the one or more QoS flows that need to be synchronized with at least one other QoS flow of the one or more QoS flows. In some embodiments, the computer executable program code instructions can further comprise program code instructions configured, upon execution, to: determine a maximum latency deviation which indicates the maximum latency difference allowed between the one or more QoS flows; and provide the maximum latency deviation to the assisting node. In some embodiments, the computer executable program code instructions can further comprise program code instructions configured, upon execution, to: determine whether said one or more QoS flows are generated by a same application; and determine whether to duplicate one or more of the two or more data radio bearers. In some embodiments, the computer executable program code instructions can further comprise program code instructions configured, upon execution, to: determine whether a latency of packets transmitted along one or more secondary legs of at least one of the two or more data radio bearers associated with the same application is above a latency threshold, and, in an instance in which the latency of packets transmitted along the one or more secondary legs of the at least one of the two or more data radio bearers associated with the same application is above the latency threshold, determine not to duplicate the at least one of the two or more data radio bearers. In some embodiments, the split ratio is operable for radio link control of the two or more data radio bearers. In some embodiments, the computer executable program code instructions can further comprise program code instructions configured, upon execution, to: determine whether the split ratio is above a threshold split ratio; and at least one of: in an instance in which the split ratio for the radio link control of the two or more data radio bearers is above the threshold split ratio, determine whether to enable or disable a split within respective data radio bearers of the two or more data radio bearers, and, in an instance in which the split ratio for the radio link control of the two or more data radio bearers is above the threshold split ratio, determine whether to duplicate data radio bearer traffic. In some embodiments, the computer executable program code instructions can further comprise program code instructions configured, upon execution, to: provide said split ratio to one or more of the assisting node and user equipment.

According to yet another embodiment, a computer program product can be provided that comprises at least one non-transitory computer-readable storage medium having computer executable program code instructions stored therein, the computer executable program code instructions comprising program code instructions configured, upon execution, to: receive, at an assisting node of a communications system, from a hosting node, information regarding two or more linked data radio bearers of one or more Quality of Service (QoS) flows from a same application, said information comprising a maximum delay deviation between the two or more linked data radio bearers. In some embodiments, the computer executable program code instructions can further comprise program code instructions configured, upon execution, to: determine a packet transmission latency of packets on at least one of the two or more linked data radio bearers. In some embodiments, the computer executable program code instructions can further comprise program code instructions configured, upon execution, to: provide latency assistance information to the hosting node in order to facilitate deciding a split ratio between radio link control entities and/or duplication of data radio bearers. In some embodiments, the computer executable program code instructions can further comprise program code instructions configured, upon execution, to: determine, via the assisting node, a first packet transmission latency of one or more first packets on a first data radio bearer of the two or more linked data radio bearers and a second packet transmission latency of one or more second packets on a second data radio bearer of the two or more linked data radio bearers, the second packet transmission latency being larger than the first packet transmission latency; and, in an instance in which a difference between the first packet transmission latency and the second packet transmission latency exceeds the maximum delay deviation, execute an action on at least one of the first data radio bearer and the second data radio bearer, said action comprising at least one from among: increasing a scheduling priority of packets of the second data radio bearer, reducing a load of the second data radio bearer, and postponing the transmission of packets of one or more of the first and second data radio bearers in order to synchronize the packet transmission latency of the first and second data radio bearers. In some embodiments, the one or more first packets comprise a first QoS flow and the one or more second packets comprise a second QoS flow. In some embodiments, the first and second QoS flows are associated with the same application. In some embodiments, the computer executable program code instructions can further comprise program code instructions configured, upon execution, to: determine whether at least one of the first QoS flow and the second QoS flow fails to meet a QoS requirement; and, in an instance in which at least one of the first QoS flow and the second QoS flow fails to meet the QoS requirement, determine that one or more of the first QoS flow and the second QoS flow are obsolete. In some embodiments, the computer executable program code instructions can further comprise program code instructions configured, upon execution, to: determine a delay budget for one or more of the first data radio bearer and the second data radio bearer based at least on the maximum delay deviation; and, in an instance in which the delay budget for one or more of the first data radio bearer and the second data radio bearer is below a delay budget threshold, determine not to duplicate the one or more of the first data radio bearer and the second data radio bearer. In some embodiments, the computer executable program code instructions can further comprise program code instructions configured, upon execution, to: determine an average packet size of packets transmitted on the two or more data radio bearers during a first period of time; determine an average number of packets transmitted on the two or more data radio bearers during said first period of time; and estimate, based at least upon the average packet size and the average number of packets transmitted on the two or more data radio bearers during said first period of time, an expected number of packets and an expected average packet size during a second period of time. In some embodiments, the second period of time is in the future. In some embodiments, the computer executable program code instructions can further comprise program code instructions configured, upon execution, to: determine a maximum number of packets to transmit on each data radio bearer of the two or more data radio bearers during said second period of time in order to achieve a delay deviation between the two or more data radio bearers that is less than or equal to the maximum delay deviation threshold; and determine, based at least on the maximum number of packets to be transmitted on each data radio bearer of the two or more data radio bearers during said second period of time, a second split ratio associated with said second period of time. In some embodiments, the computer executable program code instructions can further comprise program code instructions configured, upon execution, to: determine a number of packets to be transmitted on each data radio bearer of the two or more data radio bearers during said second period of time in order to minimize a delay deviation between the two or more data radio bearers during said second period of time; and determine, based at least on the number of packets to be transmitted on each data radio bearer of the two or more data radio bearers during said second period of time, a second split ratio associated with said second period of time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising
at least one processor,
at least one memory including computer program code,
the at least one memory and the computer program code configured, with the at least one processor, to cause the apparatus to:
   receive, from a hosting node of a communications system, information regarding two or more linked data radio bearers of one or more Quality of Service (QOS) flows from a same application, said information comprising a maximum delay deviation between the two or more linked data radio bearers;
   determine a packet transmission latency for at least one of the two or more linked data radio bearers;
   provide latency assistance information to the hosting node in order to facilitate deciding a split ratio between radio link control entities and/or duplication of data radio bearers, said latency assistance information comprising said packet transmission latency for said at least one of the two or more linked data radio bearers;
   determine a delay budget for one or more of the first data radio bearer and the second data radio bearer based at least on the maximum delay deviation; and
   determine, in an instance in which the delay budget for one or more of the first data radio bearer and the second data radio bearer is below a delay budget threshold, not to duplicate the one or more of the first data radio bearer and the second data radio bearer.

* * * * *